(12) United States Patent
Miyazaki

(10) Patent No.: US 7,724,447 B2
(45) Date of Patent: May 25, 2010

(54) ZOOM LENS SYSTEM AND IMAGING OPTICAL DEVICE EMPLOYING THE SAME

(75) Inventor: Kyoichi Miyazaki, Osaka (JP)

(73) Assignee: Panasonic Corporation, Osaka (JP)

( * ) Notice: Subject to any disclaimer, the term of this patent is extended or adjusted under 35 U.S.C. 154(b) by 168 days.

(21) Appl. No.: 11/996,047

(22) PCT Filed: Jul. 14, 2006

(86) PCT No.: PCT/JP2006/314078

§ 371 (c)(1),
(2), (4) Date: Jan. 17, 2008

(87) PCT Pub. No.: WO2007/010862

PCT Pub. Date: Jan. 25, 2007

(65) Prior Publication Data

US 2009/0251793 A1    Oct. 8, 2009

(30) Foreign Application Priority Data

Jul. 19, 2005    (JP) .............................. 2005-208893

(51) Int. Cl.
*G02B 15/14*    (2006.01)
*G02B 27/64*    (2006.01)
(52) U.S. Cl. ................. 359/680; 359/557; 359/684
(58) Field of Classification Search ............... 359/557, 359/680, 682, 684, 691
See application file for complete search history.

(56) References Cited

U.S. PATENT DOCUMENTS 5,559,635 A    9/1996    Sato
5,715,097 A *  2/1998    Shibayama et al. ......... 359/691
5,963,379 A * 10/1999    Sato et al. .................. 359/691

(Continued)

FOREIGN PATENT DOCUMENTS

JP    7-064025    3/1995

(Continued)

OTHER PUBLICATIONS

International Preliminary Report on Patentability (PCT/IB/373) for International Patent Application PCT/JP2006/314078, prepared Jan. 22, 2008.*

*Primary Examiner*—David N Spector
(74) *Attorney, Agent, or Firm*—McDermott Will & Emery LLP

(57) ABSTRACT

The present zoom lens system comprises a plurality of lens units including at least: a front lens unit having negative optical power; and a rear lens unit having positive optical power, arranged on the image side of the front lens unit, and composed of a plurality of lens elements; wherein magnification change is performed by changing an interval between the individual lens units, wherein the rear lens unit comprises: a rear A lens unit capable of moving in a direction perpendicular to an optical axis; and a rear B lens unit that is arranged on the image side of the rear A lens unit and that can move in an optical axis direction in such a manner that an interval relative to the rear A lens unit in the optical axis direction is changed, and wherein focusing adjustment during variation of the object distance is achieved by changing the interval between the rear A lens unit and the rear B lens unit.

9 Claims, 39 Drawing Sheets

U.S. PATENT DOCUMENTS

| | | | |
|---|---|---|---|
| 6,046,852 A | 4/2000 | Konno et al. | |
| 6,266,189 B1 | 7/2001 | Konno et al. | |
| 6,285,502 B1 | 9/2001 | Konno et al. | |
| 2004/0136086 A1 | 7/2004 | Ohtake | |
| 2004/0246593 A1 | 12/2004 | Yamada et al. | |
| 2005/0068634 A1* | 3/2005 | Miyatake et al. | 359/676 |
| 2007/0058265 A1* | 3/2007 | Nishimura | 359/680 |

FOREIGN PATENT DOCUMENTS

| | | |
|---|---|---|
| JP | 09-230236 | 9/1997 |
| JP | 09-230237 | 9/1997 |
| JP | 2002-072086 | 3/2002 |
| JP | 2003-228001 | 8/2003 |
| JP | 2004-212618 | 7/2004 |

* cited by examiner

SPHERICAL ABERRATION (mm) | ASTIGMATISM (mm) | DISTORTION (%) | AXIAL CHROMATIC ABERRATION (mm) | MAGNIFICATION CHROMATIC ABERRATION (mm)

ZOOM LENS SYSTEM AND IMAGING OPTICAL DEVICE EMPLOYING THE SAME

RELATED APPLICATIONS

This application is the U.S. National Phase under 35 U.S.C. §371 of International Application No. PCT/JP2006/314078, filed on Jul. 14, 2006, which in turn claims the benefit of Japanese Application No. 2005-208893, filed on Jul. 19, 2005, the disclosures of which Applications are incorporated by reference herein.

TECHNICAL FIELD

The present invention relates to a zoom lens system and an imaging optical device employing the same. In particular, the present invention relates to a zoom lens system suitable for an imaging optical device such as a digital still camera or a digital video camera, as well as to an imaging optical device employing this zoom lens system.

BACKGROUND ART

In recent years, imaging optical devices represented by digital still cameras and digital video cameras (simply referred to as "digital cameras", hereinafter) have spread rapidly. For example, a large number of such digital cameras are commercialized that have the number of recorded-image pixels greater than 5 million. Among these, digital cameras of reduced size and weight are desired in particular.

Further, recently, digital cameras are strongly desired that have a blur compensation function for compensating blur at the time of image shooting. Thus, simultaneous realization of the installation of a blur compensation function and the size and weight reduction is a large issue of development.

In the case of an imaging optical device for shooting a still image, in general, drive control is performed such that at least a part of the lens system is moved in a direction perpendicular to the optical axis so as to deflect the shooting view angle such as to cancel the deflection of the shooting view angle caused by blur. As a result, blur compensation is achieved.

When a blur compensation function is to be provided in a lens system, degradation need be avoided in the optical image formation performance when a part of lens units of the lens system is moved in a direction perpendicular to the optical axis. Then, in order that the avoidance of degradation is achieved in the optical image formation performance, the aberration of each lens unit in an isolated state need be compensated satisfactorily. This causes a tendency of size increase in the lens system.

As an example of a lens system having such a blur compensation function, the following lens systems are proposed (Japanese Laid-Open Patent Publication No. 2002-72086 and Japanese Laid-Open Patent Publication No. 2003-228001).

Each of the lens systems described in Japanese Laid-Open Patent Publication No. 2002-72086 and Japanese Laid-Open Patent Publication No. 2003-228001 is a zoom lens system, in order from the object side to the image side, comprises: a first lens unit having positive optical power; a second lens unit having negative optical power; a third lens unit having positive optical power; and a fourth lens unit having positive optical power. Then, the zoom lens system described in Japanese Laid-Open Patent Publication No. 2002-72086 has a blur compensation function of moving the entire third lens unit in a direction perpendicular to the optical axis. Further, in the zoom lens system described in Japanese Laid-Open Patent Publication No. 2003-228001, the third lens unit is divided into two. Then, a blur compensation function is provided such that one of the two lens units is moved in a direction perpendicular to the optical axis.

The zoom lens system described in Japanese Laid-Open Patent Publication No. 2002-72086 is a zoom lens system comprising a plurality of lens units, wherein magnification change is performed by changing an interval between individual lens units. Among the plurality of lens units, one lens unit moves in a direction perpendicular to the optical axis so as to serve as a blur compensation lens unit. Then, in each lens unit in the zoom lens system, for the purpose of satisfactory image formation performance in a range from a wide-angle limit to a telephoto limit, the aberration of each lens unit in an isolated state is compensated comparatively satisfactorily. This satisfactorily suits aberration compensation for achieving a blur compensation function. Accordingly, the zoom lens system described in Japanese Laid-Open Patent Publication No. 2002-72086 is provided with a blur compensation function without the necessity of a remarkable size increase.

Nevertheless, in the zoom lens system described in Japanese Laid-Open Patent Publication No. 2002-72086, the blur compensation lens unit is constructed from a large number of lens elements, and has a heavy mass. Thus, in order to achieve satisfactory blur compensation drive, the driving force of a blur compensation driving actuator need be increased. Then, when the driving force of the blur compensation driving actuator is increased as such, its volume is also increased. This causes a problem that size and weight reduction becomes difficult to be achieved in the entire imaging optical device.

Thus, in view of this problem, in the zoom lens system described in Japanese Laid-Open Patent Publication No. 2003-228001, one lens unit is divided into two, and then one of the two lens units serves as a blur compensation lens unit. By virtue of this, in the blur compensation lens unit, size and weight reduction is achieved, while reduction of the movement amplitude in a direction perpendicular to the optical axis is achieved. As a result, a comparatively small and lightweight imaging optical device is realized.

Patent Document 1: Japanese Laid-Open Patent Publication No. 2002-72086

Patent Document 2: Japanese Laid-Open Patent Publication No. 2003-228001

DISCLOSURE OF THE INVENTION

Problems to be Solved by the Invention

Nevertheless, in the zoom lens system described in Japanese Laid-Open Patent Publication No. 2003-228001, the other lens unit in the two divided lens units which is different from the blur compensation lens unit is employed only for the purpose of size and weight reduction of the blur compensation lens unit. This restricts the possibility of reduction in the number of lens elements in the entire lens system, and also generates newly the necessity of satisfactory aberration compensation for the two divided lens units each in an isolated state. This causes the problem that size and weight reduction and cost reduction are not achieved in the entire lens system.

The present invention has been made in order to resolve the problems in the prior art. Objects of the present invention are: to provide a zoom lens system that achieves high image formation performance, permits size and weight reduction and cost reduction, and has a blur compensation function; and to provide an imaging optical device employing the same.

Solution to the Problems

One of the above-mentioned objects is achieved by the following zoom lens system. That is, the present invention relates to a zoom lens system comprising a plurality of lens units including at least: a front lens unit having negative optical power; and a rear lens unit having positive optical power, arranged on an image side of the front lens unit, and composed of a plurality of lens elements; wherein magnification change is performed by changing an interval between the individual lens units, wherein the rear lens unit comprises: a rear A lens unit capable of moving in a direction perpendicular to an optical axis; and a rear B lens unit that is arranged on the image side of the rear A lens unit and that can move in an optical axis direction in such a manner that an interval relative to the rear A lens unit in the optical axis direction is changed, and wherein focusing adjustment during variation of the object distance is achieved by changing the interval between the rear A lens unit and the rear B lens unit.

Further one of the above-mentioned objects is achieved by the following imaging optical device. That is, the present invention relates to an imaging optical device comprising: an imaging optical system for forming an optical image of an object; and an image sensor for converting the optical image formed by the imaging optical system into an electric image signal; wherein the imaging optical system is a zoom lens system comprising a plurality of lens units including at least: a front lens unit having negative optical power; and a rear lens unit having positive optical power, arranged on the image side of the front lens unit, and composed of a plurality of lens elements; wherein magnification change is performed by changing an interval between the individual lens units, and wherein the rear lens unit comprises: a rear A lens unit capable of moving in a direction perpendicular to an optical axis; and a rear B lens unit that is arranged on the image side of the rear A lens unit and that can move in an optical axis direction in such a manner that an interval relative to the rear A lens unit in the optical axis direction is changed, and wherein focusing adjustment during variation of the object distance is achieved by changing the interval between the rear A lens unit and the rear B lens unit.

EFFECT OF THE INVENTION

The present invention realizes a zoom lens system that has a reduced number of lens elements and a simple construction so as to achieve size and weight reduction, and still has high image formation performance and a blur compensation function.

The present invention further realizes an imaging optical device that has reduced size and weight as well as a high-performance imaging function.

DESCRIPTION OF THE REFERENCE CHARACTERS

Figure 1:
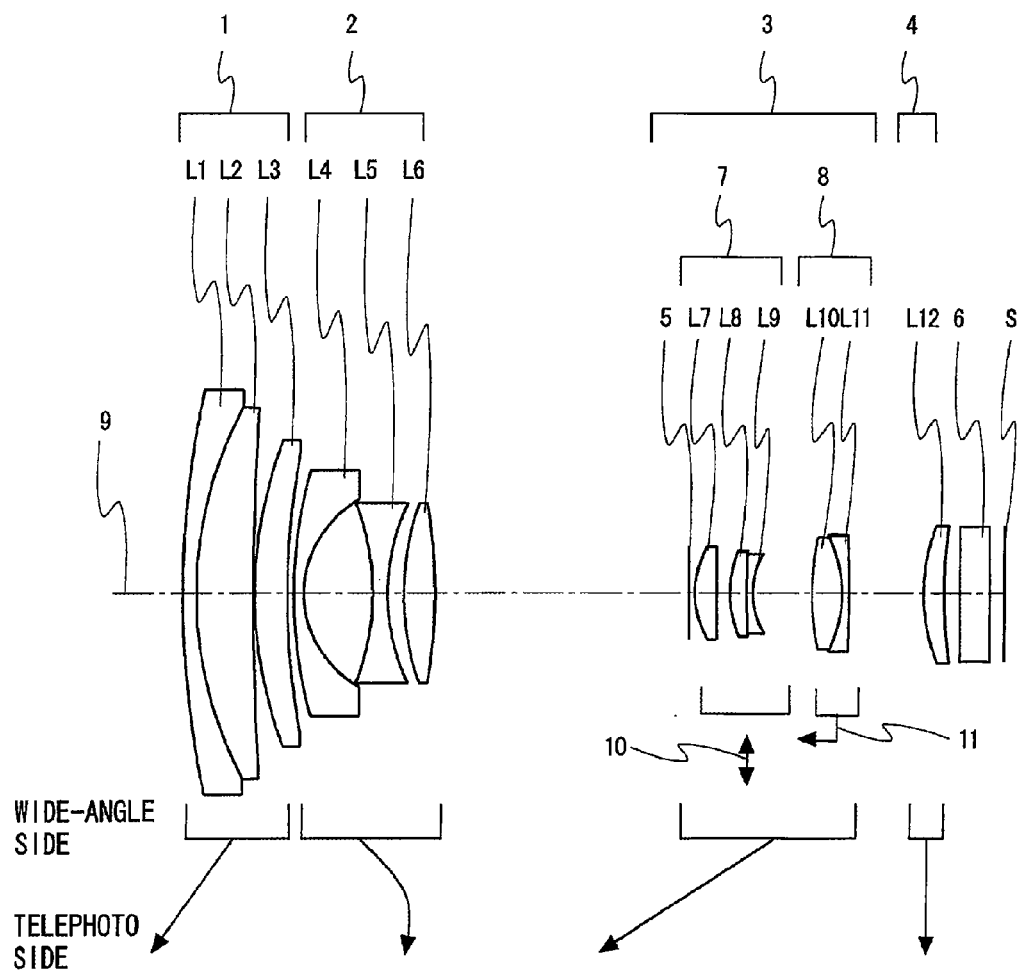
FIG. 1 is an arrangement diagram showing a lens configuration of a zoom lens system according to Embodiment 1 at a wide-angle limit in a normal state.

S Image surface
1 Front additional lens unit
2 Front lens unit
3 Rear lens unit
4 Rear additional lens unit
5 Aperture diaphragm
6 Optical low-pass filter
7 Rear A lens unit
8 Rear B lens unit
9 Optical axis
12 Shutter driving actuator
13 Aperture diameter control driving actuator
14 ND filter driving actuator
15 Focal driving actuator
16 Blur compensation driving actuator
17 Lens barrel
18 Imaging optical device
19 Stroboscope
20 Optical viewfinder

BEST MODE FOR CARRYING OUT THE INVENTION

The present invention is described below in further detail with reference to embodiments.

Embodiment 1

FIG. 1 is an arrangement diagram showing a lens configuration of a zoom lens system according to Embodiment 1 at a wide-angle limit in a normal state.

As shown in FIG. 1, the zoom lens system according to Embodiment 1, in order from the object side (left-hand side in FIG. 1) to the image side (image surface S side), comprises: a front additional lens unit 1 having positive optical power; a front lens unit 2 having negative optical power; a rear lens unit 3 having positive optical power; and a rear additional lens unit 4 having positive optical power. Then, at least the rear lens unit 3 is moved in the direction of an optical axis 9 (the "optical axis" indicates the "optical axis 9", hereinafter), so that magnification change is performed. On the most object side of the rear lens unit 3, an aperture diaphragm 5 is arranged for restricting the optical path. Further, near the image surface S located between the rear additional lens unit 4 and the image surface S, an optical low-pass filter 6 is arranged. This optical low-pass filter 6 reduces a folded image generated by sampling of an image sensor such as a CCD or a CMOS arranged on the image surface S, and is formed from transparent parallel plates such as quartz plates. In FIG. 1, each arrow extending from each lens unit indicates a moving path of each lens unit during changing the magnification from the wide-angle side to the telephoto side. Here, the arrow extending from the rear additional lens unit 4 indicates that the rear additional lens unit 4 is fixed relative to the image surface S during changing the magnification.

The rear lens unit 3, in order from the object side to the image side, comprises a rear A lens unit 7 having positive optical power and a rear B lens unit 8. Here, the rear A lens unit 7 is a blur compensation lens unit capable of moving (being decentered) in a direction (the direction indicated by an arrow 10) perpendicular to the optical axis for the purpose of blur compensation. Further, the rear B lens unit 8 is a focusing lens unit capable of moving in the optical axis direction (the direction indicated by an arrow 11) with changing the interval relative to the rear A lens unit 7 in the optical axis direction for the purpose of focusing adjustment.

As such, in the zoom lens system according to Embodiment 1, the rear lens unit 3 is divided into two lens units consisting of the rear A lens unit 7 and the rear B lens unit 8. Then, a blur compensation function is imparted to the rear A lens unit 7, while a focal function is imparted to the rear B lens unit 8. By virtue of this, a blur compensation drive section and a focusing drive section can be collected that need be controlled with electric power supply. This allows members such as driving actuators to be arranged compactly and efficiently.

Further, in inspection at the time of assembling, the inspection of electric components is collected, so that reduction in the assembling cost is achieved.

Further, in aberration compensation concerning image formation performance, a long overall length is constructed in the rear lens unit 3, so that effective vignetting is achieved. In particular, a satisfactory effect is obtained in aberration compensation, for example, in the case of a zoom lens system that requires a wide view angle at least that corresponding to 28 mm in 35-mm film equivalence.

Further, at the time of accommodation of the lens barrel that holds the lens elements, the interval between the rear A lens unit 7 and the rear B lens unit 8 vanishes approximately, so that thickness reduction at the time of accommodation is achieved in the zoom lens system.

Here, the rear lens unit 3 may include a lens element other than the rear A lens unit 7 serving as a blur compensation lens unit and the rear B lens unit 8 serving as a focusing lens unit. However, from the perspective of size and weight reduction in the zoom lens system, it is preferable that the rear lens unit 3 is constructed only from the rear A lens unit 7 and the rear B lens unit 8.

Similarly to the rear A lens unit 7 and the rear B lens unit 8, the aperture diaphragm 5 is included in the rear lens unit 3. Then, during changing the magnification, the aperture diaphragm 5, the rear A lens unit 7 and the rear B lens unit 8 move in the optical axis direction approximately collectively. However, in the zoom lens system according to the present Embodiment 1, the aperture diaphragm 5 is not included in the rear A lens unit 7, and does not move in a direction perpendicular to the optical axis at the time of blur compensation.

As such, when the aperture diaphragm 5 is included in the rear lens unit 3, the control section for the control of the shutter and the aperture diameter concerning the imaging by the zoom lens system can also be collected in the rear lens unit 3. This realizes more compact construction of the zoom lens system, and reduces the assembling cost. Further, from the perspective of reduction in the outer diameter of the rear A lens unit 7 serving as a blur compensation lens unit and size and weight reduction in the rear A lens unit 7, it is preferable that the aperture diaphragm 5 is arranged near the rear A lens unit 7. Further, from the perspective of satisfactory compensation of astigmatism, it is more preferable that the aperture diaphragm 5 is arranged on the object side of the rear A lens unit 7.

In the present invention, a construction may be adopted that the aperture diaphragm is included in the rear A lens unit. However, in general, the aperture diaphragm includes a member having a heavy mass such as a shutter driving actuator. Thus, it is more preferable that the aperture diaphragm is not included in the rear A lens unit serving as a blur compensation lens unit, as in the zoom lens system according to the present Embodiment 1.

As described above, in the zoom lens system according to Embodiment 1, a front additional lens unit 1 having positive optical power is further provided on the object side relative to the front lens unit 2. Then, during changing the magnification from the wide-angle side to the telephoto side, the interval between the front lens unit 2 and the front additional lens unit 1 is changed in the optical axis direction. At the same time, the interval between the rear lens unit 3 and the image surface S is changed in the optical axis direction. Thus, the variable magnification effect is shared, while the movement of the image surface S is reduced. Further, movement of the image surface S that cannot be compensated in this state is compensated by changing the interval between the rear B lens unit 8 and the rear A lens unit 7 in the optical axis direction. By virtue of this, the position of the image surface S is fixed.

Further, during changing the magnification from the wide-angle side to the telephoto side, the front additional lens unit 1 moves in the optical axis direction in such a manner that the interval relative to the front lens unit 2 is increased in the optical axis direction. Thus, for example, even in a high magnification zoom lens system having a variable magnification ratio of four or greater, more satisfactory image formation performance is achieved.

Further, as described above, in the zoom lens system according to Embodiment 1, the rear additional lens unit 4 having positive optical power is further provided on the image side relative to the rear lens unit 3, while during changing the magnification from the wide-angle side to the telephoto side, the interval in the optical axis direction increases between the rear lens unit 3 and the rear additional lens unit 4. In this case, the rear additional lens unit 4 serves as a condenser lens for achieving telecentricity to the image sensor arranged on the image surface S. This reduces shading and realizes a bright image even in the periphery. Further, the effect of focusing is unnecessary. Thus, during changing the magnification from the wide-angle side to the telephoto side, the rear additional lens unit 4 is fixed relative to the image surface S. Thus, as the structure between the rear additional lens unit 4 and the image sensor, a dust-protective airtight structure can be adopted that does not permit easy entering of impurities such as fine dust and particles that cause a trouble when adhering near the image sensor. This avoids the problem of impurities that generate shadows in the shot image.

Here, focusing adjustment in a case that the object distance varies from the infinite distance to a proximal distance is achieved by changing the interval between the rear B lens unit 8 and the rear A lens unit 7 in the optical axis direction.

Next, specific configurations of individual lens units are described below in detail.

As shown in FIG. 1, the front additional lens unit 1, in order from the object side to the image side, comprises three lens elements consisting of: a meniscus lens element ("negative meniscus lens element", hereinafter) L1 that has a convex surface facing the object side and that has negative optical power; a meniscus lens element ("positive meniscus lens element", hereinafter) L2 that has a convex surface facing the object side and that has positive optical power; and a positive meniscus lens element L3 with the convex surface facing the object side. The negative meniscus lens element L1 and the positive meniscus lens element L2 are cemented with each other.

Here, when the highest priority is imparted to size and weight reduction in the zoom lens system, it is preferable that the front additional lens unit is constructed from a single lens element (see Embodiment 3 described later). Nevertheless, in this case, a tendency arises that compensation of chromatic aberration and spherical aberration becomes insufficient in the front additional lens unit in an isolated state. Thus, a comparatively large (dark) F-number is preferable on the telephoto side. Thus, the number of lens elements constituting the front additional lens unit is selected appropriately in accordance with the requirement for the F-number on the telephoto side. When the front additional lens unit is constructed from two lens elements (see Embodiment 2 described later) or three lens elements (the present Embodiment 1), satisfactory compensation of chromatic aberration and spherical aberration is achieved in the front additional lens unit in an isolated state. Thus, a zoom lens system is realized that has a small (bright) F-number even on the telephoto side and a comparatively high resolution. As such, it is preferable that the front additional lens unit is constructed from one through three lens elements depending on the required specification.

The front lens unit 2, in order from the object side to the image side, comprises: a negative meniscus lens element L4 with the convex surface facing the object side; a bi-concave shaped lens element ("bi-concave negative lens element", hereinafter) L5 having negative optical power; and a bi-convex shaped lens element ("bi-convex positive lens element", hereinafter) L6 having positive optical power. Here, the negative meniscus lens element L4 is necessary for the purpose of satisfactory compensation of distortion at a wide-angle limit. Further, in the bi-concave negative lens element L5, the image side surface 9 is aspheric for the purpose of satisfactory compensation of spherical aberration and coma aberration of the front lens unit 2. Further, the bi-convex positive lens element L6 compensates chromatic aberration and astigmatism of the front lens unit 2. In particular, in the zoom lens system according to the present Embodiment 1, for the purpose of satisfactory compensation of aberration as well as reduction of performance degradation sensitivity due to decentering of the lens elements constituting the front lens unit 2, the negative meniscus lens element L4 and the bi-convex positive lens element L6 are formed from a high refractive index material having a refractive index Nd to the d-line of 1.8 or higher (see Table 2).

The rear lens unit 3 comprises an aperture diaphragm 5, a rear A lens unit 7, and a rear B lens unit 8. In the rear lens unit 3, driving actuators serving as drive mechanisms are integrated into there.

Figure 2:
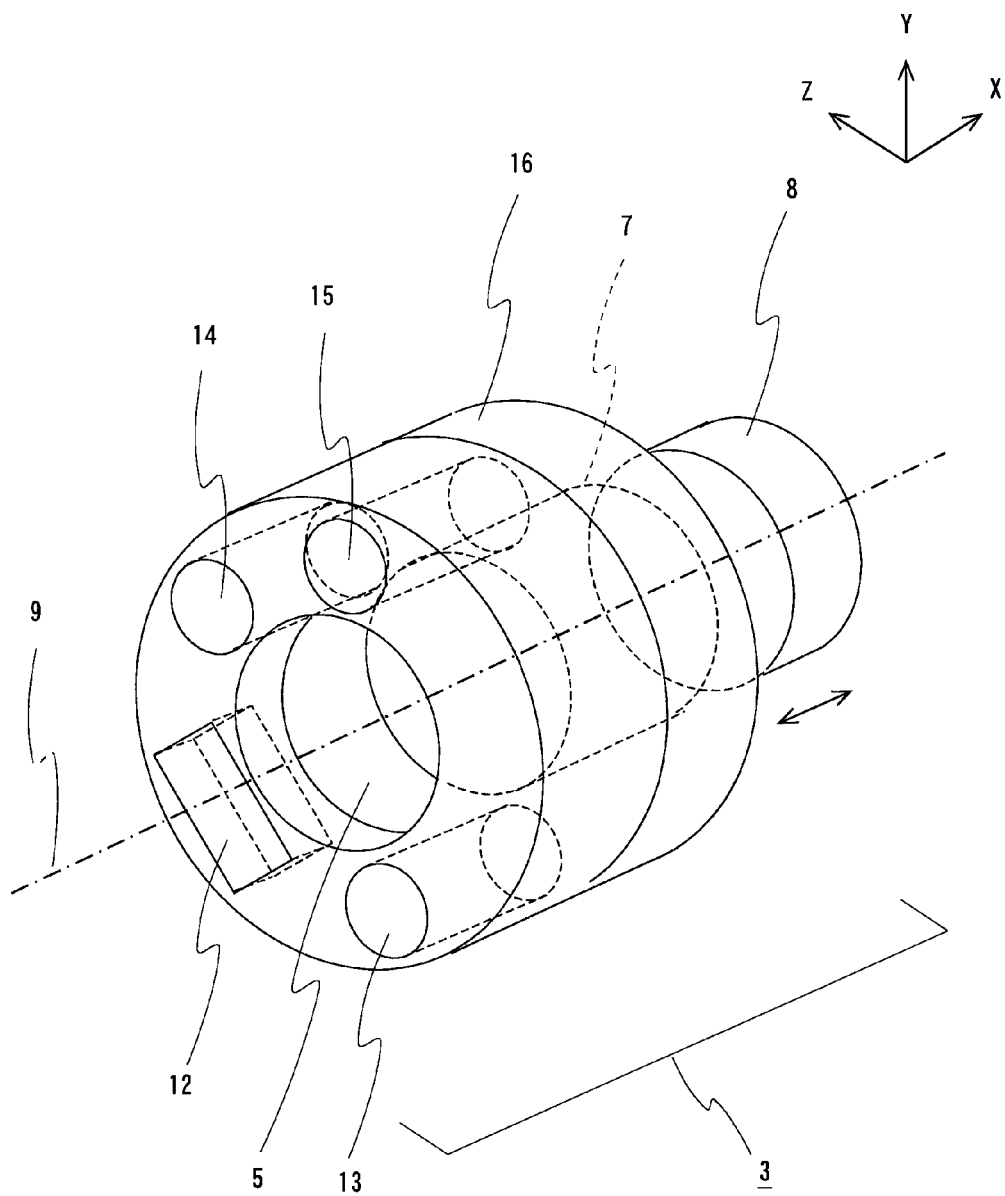
FIG. 2 is a schematic perspective view showing a configuration of a rear lens unit of a zoom lens system according to Embodiment 1.

Here, a detailed configuration of the rear lens unit 3 is described below. FIG. 2 is a schematic perspective view showing a configuration of the rear lens unit 3. Numeral 12 indicates a shutter driving actuator. Numeral 13 indicates an aperture diameter control driving actuator for controlling and driving the aperture diameter of the aperture diaphragm 5. Numeral 14 indicates an ND filter driving actuator for driving an ND filter (amount-of-light attenuating filter) inserted into the aperture diaphragm 5. Numeral 15 indicates a focal driving actuator for driving the rear B lens unit 8 serving as a focusing lens unit. Numeral 16 indicates a blur compensation driving actuator for driving the rear A lens unit 7 serving as a blur compensation lens unit. As shown in FIG. 2, when the individual driving actuators are collected into the same part, the driving actuators are arranged compactly and efficiently.

The rear A lens unit 7 serving as a blur compensation lens unit, in order from the object side to the image side, comprises: a positive meniscus lens element L7 in which the convex surface is facing the object side and the object side surface 13 is aspheric; a positive meniscus lens element L8 with the convex surface facing the object side; and a negative meniscus lens element L9 with the convex surface facing the object side. The positive meniscus lens element L8 and the negative meniscus lens element L9 are cemented with each other. Further, in particular, the convex aspheric surface 13 located on the most object side and the concave surface 17 located on the most image side in the rear A lens unit 7 satisfactorily compensate axial chromatic aberration, spherical aberration, coma aberration and astigmatism of the rear A lens unit 7. This realizes an excellent blur compensation function in which degradation in the image formation performance is reduced. Further, the rear A lens unit 7, in order from the object side to the image side, includes a positive lens element (L7) and a cemented lens element composed of a positive lens element (L8) and a negative lens element (L9). This reduces the sensitivity of image formation performance with respect to movement (decentering) in a direction perpendicular to the optical axis of each lens element, and hence reduces performance degradation caused by a fabrication error.

The rear B lens unit 8 serving as a focusing lens unit, in order from the object side to the image side, comprises: a bi-convex positive lens element L10; and a negative meniscus lens element L11 with the convex surface facing the image side. Then, the bi-convex positive lens element L10 and the negative meniscus lens element L11 are cemented with each other. For the purpose of satisfactory compensation of astigmatism and reduction of performance degradation sensitivity due to decentering in the rear B lens unit 8, the object side surface 18 of the bi-convex positive lens element L10 is aspheric. As such, the rear B lens unit 8 includes a lens element having an aspheric surface. This permits satisfactory compensation of spherical aberration and coma aberration of the rear B lens unit 8, and realizes satisfactory focusing performance in which a change in spherical aberration caused by the object distance is reduced. Further, the rear B lens unit 8 includes a positive lens element (L10) and a negative lens element (L11). Thus, axial chromatic aberration is satisfactorily compensated in the rear B lens unit 8. This reduces degradation in the image formation performance caused by decentering.

The rear additional lens unit 4 is constructed only from a positive meniscus lens element L12 with the convex surface facing the object side.

Embodiment 2

Figure 3:
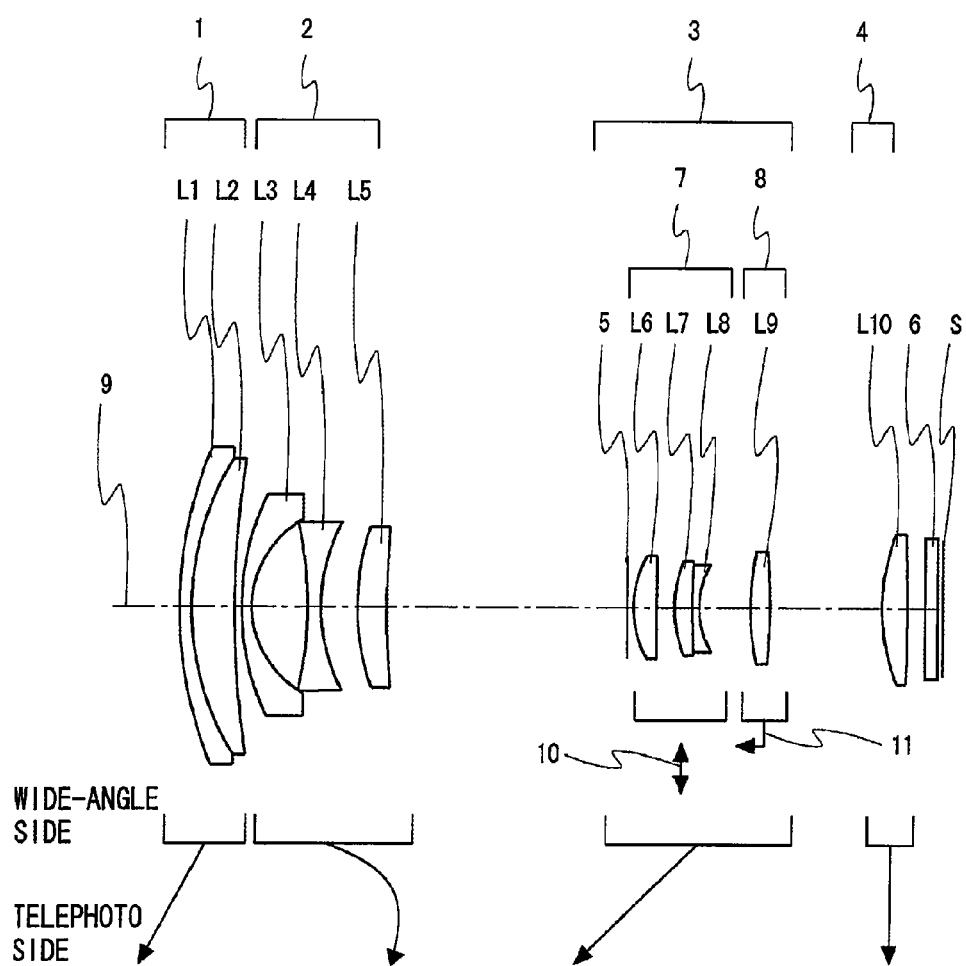
FIG. 3 is an arrangement diagram showing a lens configuration of a zoom lens system according to Embodiment 2 at a wide-angle limit in a normal state.

FIG. 3 is an arrangement diagram showing a lens configuration of a zoom lens system according to Embodiment 2 at a wide-angle limit in a normal state. The zoom lens system according to Embodiment 2, in order from the object side (left-hand side in FIG. 3) to the image side, comprises: a front additional lens unit 1 having positive optical power; a front lens unit 2 having negative optical power; a rear lens unit 3 having positive optical power; and a rear additional lens unit 4 having positive optical power. Its basic configuration and the like are the same as those of the zoom lens system according to Embodiment 1. Thus, specific configurations of the individual lens units are solely described below in details.

As shown in FIG. 3, the front additional lens unit 1, in order from the object side to the image side, comprises two lens elements consisting of: a negative meniscus lens element L1 with the convex surface facing the object side; and a positive meniscus lens element L2 with the convex surface facing the object side. The negative meniscus lens element L1 and the positive meniscus lens element L2 are cemented with each other. As such, the front additional lens unit 1 is constructed from two lens elements. Thus, satisfactory compensation of chromatic aberration and spherical aberration is achieved in the front additional lens unit 1 in an isolated state. Thus, a zoom lens system is realized that has a small (bright) F-number even on the telephoto side and a comparatively high resolution.

The front lens unit 2, in order from the object side to the image side, comprises: a negative meniscus lens element L3 with the convex surface facing the object side; a bi-concave negative lens element L4; and a positive meniscus lens element L5 with the convex surface facing the object side. Here, the negative meniscus lens element L3 is necessary for the purpose of satisfactory compensation of distortion at a wide-angle limit. Further, in the bi-concave negative lens element L4, the image side surface 7 is aspheric for the purpose of satisfactory compensation of spherical aberration and coma aberration of the front lens unit 2. Further, the positive meniscus lens element L5 compensates chromatic aberration and astigmatism of the front lens unit 2. In particular, in the zoom lens system according to the present Embodiment 2, for the purpose of satisfactory compensation of aberration as well as reduction of performance degradation sensitivity due to decentering of the lens elements constituting the front lens unit 2, the negative meniscus lens element L3 and the positive meniscus lens element L5 are formed from a high refractive index material having a refractive index Nd to the d-line of 1.8 or higher (see Table 5).

The rear lens unit 3 comprises an aperture diaphragm 5, a rear A lens unit 7 and a rear B lens unit 8. Similarly to the zoom lens system according to Embodiment 1, individual driving actuators serving as drive mechanisms are integrated into the rear lens unit 3.

The rear A lens unit 7 serving as a blur compensation lens unit, in order from the object side to the image side, comprises: a planer-convex lens element L6 in which the convex surface is facing the object side and the object side surface 11 is aspheric and which has positive optical power; a bi-convex positive lens element L7; and a bi-concave negative lens element L8. The bi-convex positive lens element L7 and the bi-concave negative lens element L8 are cemented with each other. Further, in particular, the convex aspheric surface 11 located on the most object side and the concave surface 15 located on the most image side in the rear A lens unit 7 satisfactorily compensate axial chromatic aberration, spherical aberration, coma aberration and astigmatism of the rear A lens unit 7. This realizes an excellent blur compensation function in which degradation in the image formation performance is reduced. Further, the rear A lens unit 7, in order from the object side to the image side, includes a positive lens element (L6) and a cemented lens element composed of a positive lens element (L7) and a negative lens element (L8). This reduces the sensitivity of image formation performance with respect to movement (decentering) in a direction perpendicular to the optical axis of each lens element, and hence reduces performance degradation caused by a fabrication error.

The rear B lens unit 8 serving as a focusing lens unit is constructed only from a bi-convex positive lens element L9. For the purpose of satisfactory compensation of astigmatism and reduction of performance degradation sensitivity due to decentering in the rear B lens unit 8, the object side surface 16 of the bi-convex positive lens element L9 is aspheric. As such, the rear B lens unit 8 includes a lens element having an aspheric surface. This permits satisfactory compensation of spherical aberration and coma aberration of the rear B lens unit 8, and realizes satisfactory focusing performance in which a change in spherical aberration caused by the object distance is reduced.

The rear additional lens unit 4 is constructed only from a bi-convex positive lens element L10.

Embodiment 3

Figure 4:
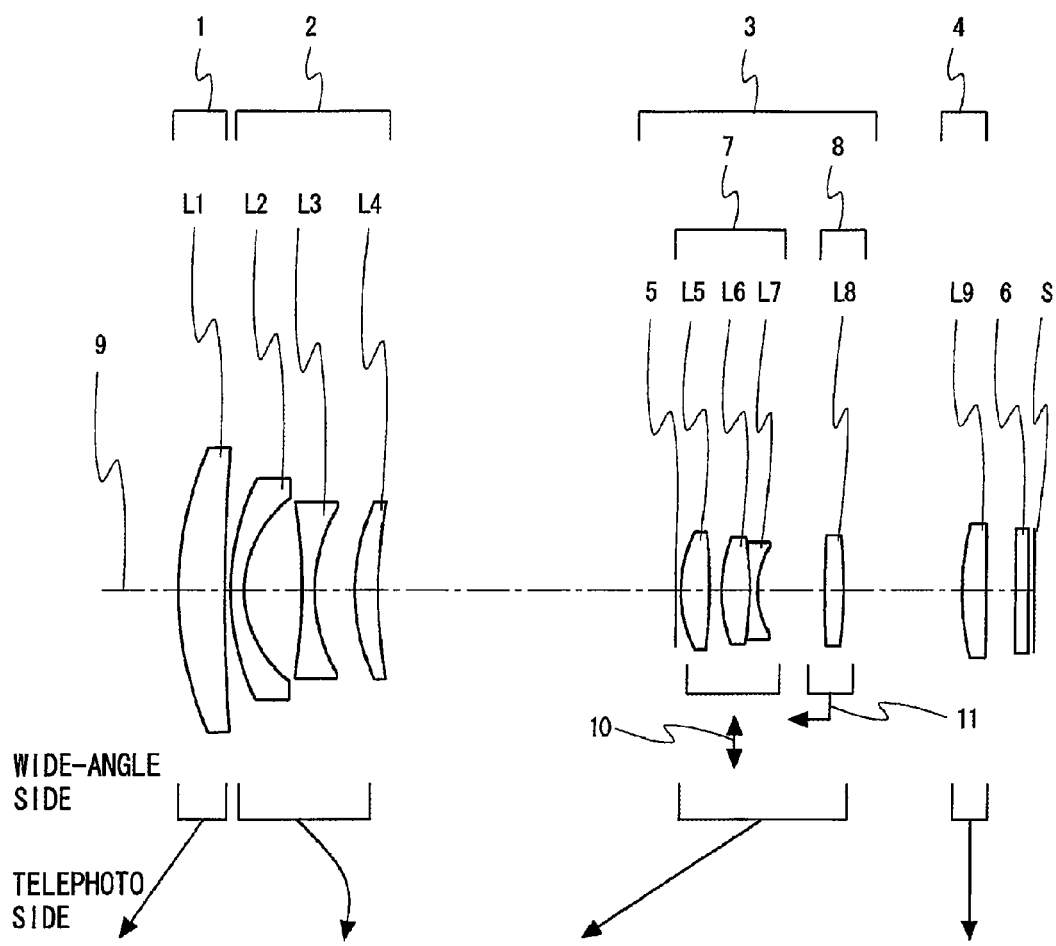
FIG. 4 is an arrangement diagram showing a lens configuration of a zoom lens system according to Embodiment 3 at a wide-angle limit in a normal state.

FIG. 4 is an arrangement diagram showing a lens configuration of a zoom lens system according to Embodiment 3 at a wide-angle limit in a normal state. The zoom lens system according to Embodiment 3, in order from the object side (left-hand side in FIG. 4) to the image side, comprises: a front additional lens unit 1 having positive optical power; a front lens unit 2 having negative optical power; a rear lens unit 3 having positive optical power; and a rear additional lens unit 4 having positive optical power. Its basic configuration and the like are the same as those of the zoom lens system according to Embodiment 1. Thus, specific configurations of the individual lens units are solely described below in details.

As shown in FIG. 4, the front additional lens unit 1 is constructed only from a positive meniscus lens element L1 with the convex surface facing the object side. Thus, size and weight reduction is achieved in the lens system.

The front lens unit 2, in order from the object side to the image side, comprises: a negative meniscus lens element L2 with the convex surface facing the object side; a bi-concave negative lens element L3; and a positive meniscus lens element L4 with the convex surface facing the object side. Here, the negative meniscus lens element L2 is necessary for the purpose of satisfactory compensation of distortion at a wide-angle limit. Further, in the bi-concave negative lens element L3, the image side surface 6 is aspheric for the purpose of satisfactory compensation of spherical aberration and coma aberration of the front lens unit 2. Further, the positive meniscus lens element L4 compensates chromatic aberration and astigmatism of the front lens unit 2. In particular, in the zoom lens system according to the present Embodiment 3, for the purpose of satisfactory compensation of aberration as well as reduction of performance degradation sensitivity due to decentering of the lens elements constituting the front lens unit 2, the negative meniscus lens element L2 and the positive meniscus lens element L4 are formed from a high refractive index material having a refractive index Nd to the d-line of 1.8 or higher (see Table 8).

The rear lens unit 3 comprises an aperture diaphragm 5, a rear A lens unit 7 and a rear B lens unit 8. Similarly to the zoom lens system according to Embodiment 1, individual driving actuators serving as drive mechanisms are integrated into the rear lens unit 3.

The rear A lens unit 7 serving as a blur compensation lens unit, in order from the object side to the image side, comprises: a bi-convex positive lens element L5 in which the object side surface 10 is aspheric; a bi-convex positive lens element L6; and a bi-concave negative lens element L7. The bi-convex positive lens element L6 and the bi-concave negative lens element L7 are cemented with each other. Further, in particular, the convex aspheric surface 10 located on the most object side and the concave surface 14 located on the most image side in the rear A lens unit 7 satisfactorily compensate axial chromatic aberration, spherical aberration, coma aberration and astigmatism of the rear A lens unit 7. This realizes an excellent blur compensation function in which degradation in the image formation performance is reduced. Further, the rear A lens unit 7, in order from the object side to the image side, includes a positive lens element (L5) and a cemented lens element composed of a positive lens element (L6) and a negative lens element (L7). This reduces the sensitivity of image formation performance with respect to movement (decentering) in a direction perpendicular to the optical axis of each lens element, and hence reduces performance degradation caused by a fabrication error.

The rear B lens unit 8 serving as a focusing lens unit is constructed only from a bi-convex positive lens element L8. For the purpose of satisfactory compensation of astigmatism and reduction of performance degradation sensitivity due to decentering in the rear B lens unit 8, the object side surface 15 of the bi-convex positive lens element L8 is aspheric. As such, the rear B lens unit 8 includes a lens element having an aspheric surface. This permits satisfactory compensation of spherical aberration and coma aberration of the rear B lens unit 8, and realizes satisfactory focusing performance in which a change in spherical aberration caused by the object distance is reduced.

The rear additional lens unit 4 is constructed only from a bi-convex positive lens element L9.

Embodiment 4

Figure 5:
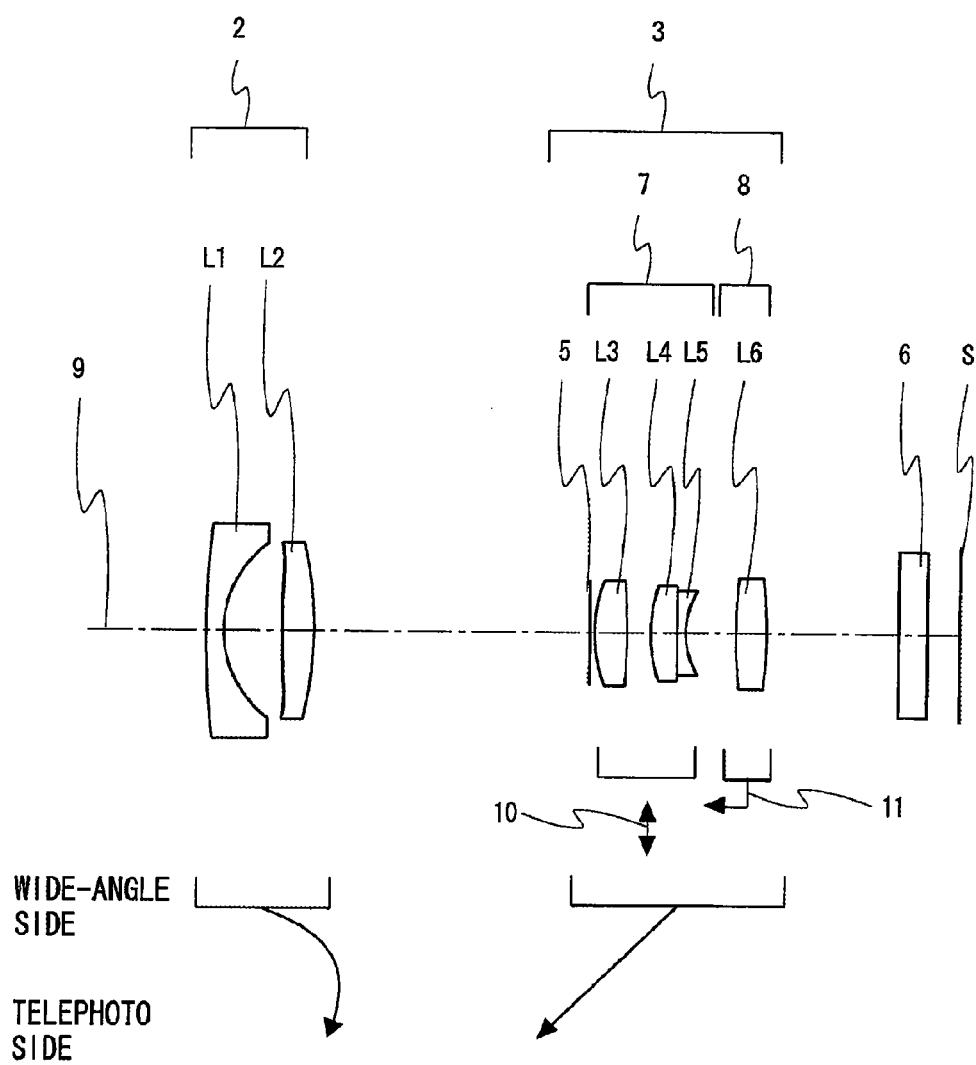
FIG. 5 is an arrangement diagram showing a lens configuration of a zoom lens system according to Embodiment 4 at a wide-angle limit in a normal state.

FIG. 5 is an arrangement diagram showing a lens configuration of a zoom lens system according to Embodiment 4 at a wide-angle limit in a normal state.

As shown in FIG. 5, the zoom lens system according to Embodiment 4, in order from the object side (left-hand side in FIG. 5) to the image side, comprises: a front lens unit 2 having negative optical power; and a rear lens unit 3 having positive optical power. Then, at least the rear lens unit 3 is moved in the direction of the optical axis, so that magnification change is performed. On the most object side of the rear lens unit 3, an aperture diaphragm 5 is arranged for restricting the optical path. Further, near the image surface S located between the rear lens unit 3 and the image surface S, an optical low-pass filter 6 is arranged. The optical low-pass filter 6 is similar to the filter employed in Embodiment 1. In FIG. 5, each arrow extending from each lens unit indicates a moving path of each lens unit during changing the magnification from the wide-angle side to the telephoto side.

The rear lens unit 3, in order from the object side to the image side, comprises a rear A lens unit 7 having positive optical power and a rear B lens unit 8. Here, the rear A lens unit 7 is a blur compensation lens unit capable of moving (being decentered) in a direction (the direction indicated by an arrow 10) perpendicular to the optical axis for the purpose of blur compensation. Further, the rear B lens unit 8 is a focusing lens unit capable of moving in the optical axis direction (the direction indicated by an arrow 11) with changing the interval relative to the rear A lens unit 7 in the optical axis direction for the purpose of focusing adjustment.

As such, in the zoom lens system according to Embodiment 4, the rear lens unit 3 is divided into two lens units consisting of the rear A lens unit 7 and the rear B lens unit 8. Then, a blur compensation function is imparted to the rear A lens unit 7, while a focal function is imparted to the rear B lens unit 8. By virtue of this, a blur compensation drive section and a focusing drive section can be collected that need be controlled with electric power supply. This allows members such as driving actuators to be arranged compactly and efficiently.

Further, in inspection at the time of assembling, the inspection of electric components is collected, so that reduction in the assembling cost is achieved.

Further, in aberration compensation concerning image formation performance, a long overall length is constructed in the rear lens unit 3, so that effective vignetting is achieved. In particular, a satisfactory effect is obtained in aberration compensation, for example, in the case of a zoom lens system that requires a wide view angle at least that corresponding to 28 mm in 35-mm film equivalence.

Further, at the time of accommodation of the lens barrel that holds the lens elements, the interval between the rear A lens unit 7 and the rear B lens unit 8 vanishes approximately, so that thickness reduction at the time of accommodation is achieved in the zoom lens system.

Here, the rear lens unit 3 may include a lens element other than the rear A lens unit 7 serving as a blur compensation lens unit and the rear B lens unit 8 serving as a focusing lens unit. However, from the perspective of size and weight reduction in the zoom lens system, it is preferable that the rear lens unit 3 is constructed only from the rear A lens unit 7 and the rear B lens unit 8.

Similarly to the rear A lens unit 7 and the rear B lens unit 8, the aperture diaphragm 5 is included in the rear lens unit 3.

Then, during changing the magnification, the aperture diaphragm 5, the rear A lens unit 7 and the rear B lens unit 8 move in the optical axis direction approximately collectively. However, in the zoom lens system according to the present Embodiment 4, the aperture diaphragm 5 is not included in the rear A lens unit 7, and does not move in a direction perpendicular to the optical axis at the time of blur compensation.

As such, when the aperture diaphragm 5 is included in the rear lens unit 3, the control section for the control of the shutter and the aperture diameter concerning the imaging by the zoom lens system can also be collected in the rear lens unit 3. This realizes more compact construction of the zoom lens system, and reduces the assembling cost. Further, from the perspective of reduction in the outer diameter of the rear A lens unit 7 serving as a blur compensation lens unit and size and weight reduction in the rear A lens unit 7, it is preferable that the aperture diaphragm 5 is arranged near the rear A lens unit 7. Further, from the perspective of satisfactory compensation of astigmatism, it is more preferable that the aperture diaphragm 5 is arranged on the object side of the rear A lens unit 7.

In the present invention, a construction may be adopted that the aperture diaphragm is included in the rear A lens unit. However, in general, the aperture diaphragm includes a member having a heavy mass such as a shutter driving actuator. Thus, it is more preferable that the aperture diaphragm is not included in the rear A lens unit serving as a blur compensation lens unit, as in the zoom lens system according to the present Embodiment 4.

In the zoom lens system according to Embodiment 4, movement of the image surface S during changing the magnification from the wide-angle side to the telephoto side is compensated by changing the interval between the rear B lens unit 8 and the rear A lens unit 7 in the optical axis direction. Thus, the position of the image surface S is fixed.

Further, focusing adjustment in a case that the object distance varies from the infinite distance to a proximal distance is achieved by changing the interval between the rear B lens unit 8 and the rear A lens unit 7 in the optical axis direction.

Next, specific configurations of individual lens units are described below in detail.

As shown in FIG. 5, the front lens unit 2, in order from the object side to the image side, comprises: a negative meniscus lens element L1 with the convex surface facing the object side; and a positive meniscus lens element L2 with the convex surface facing the object side. Here, the negative meniscus lens element L1 is necessary for the purpose of satisfactory compensation of distortion at a wide-angle limit. Further, for the purpose of more satisfactory compensation of distortion, the image side surface 2 is aspheric. Here, the positive meniscus lens element L2 is formed with a plastic material such as polycarbonate resin. Further, for the purpose of cost reduction in a state that satisfactory aberration compensation is achieved, the two surfaces 3 and 4 are aspheric.

The rear lens unit 3 comprises an aperture diaphragm 5, a rear A lens unit 7 and a rear B lens unit 8. Similarly to the zoom lens system according to Embodiment 1, individual driving actuators serving as drive mechanisms are integrated into the rear lens unit 3.

The rear A lens unit 7 serving as a blur compensation lens unit, in order from the object side to the image side, comprises: a bi-convex positive lens element L3 in which the object side surface 6 is aspheric; a positive meniscus lens element L4 with the convex surface facing the object side; and a negative meniscus lens element L5 with the convex surface facing the object side. The positive meniscus lens element L4 and the negative meniscus lens element L5 are cemented with each other. Further, in particular, the convex aspheric surface 6 located on the most object side and the concave surface 10 located on the most image side in the rear A lens unit 7 satisfactorily compensate axial chromatic aberration, spherical aberration, coma aberration and astigmatism of the rear A lens unit 7. This realizes an excellent blur compensation function in which degradation in the image formation performance is reduced. Further, the rear A lens unit 7, in order from the object side to the image side, includes a positive lens element (L3) and a cemented lens element composed of a positive lens element (L4) and a negative lens element (L5). This reduces the sensitivity of image formation performance with respect to movement (decentering) in a direction perpendicular to the optical axis of each lens element, and hence reduces performance degradation caused by a fabrication error.

The rear B lens unit 8 serving as a focusing lens unit is constructed only from a bi-convex positive lens element L6. For the purpose of satisfactory compensation of astigmatism and reduction of performance degradation sensitivity due to decentering in the rear B lens unit 8, the object side surface 11 of the bi-convex positive lens element L6 is aspheric. As such, the rear B lens unit 8 includes a lens element having an aspheric surface. This permits satisfactory compensation of spherical aberration and coma aberration of the rear B lens unit 8, and realizes satisfactory focusing performance in which a change in spherical aberration caused by the object distance is reduced.

Embodiment 5

Figure 6:
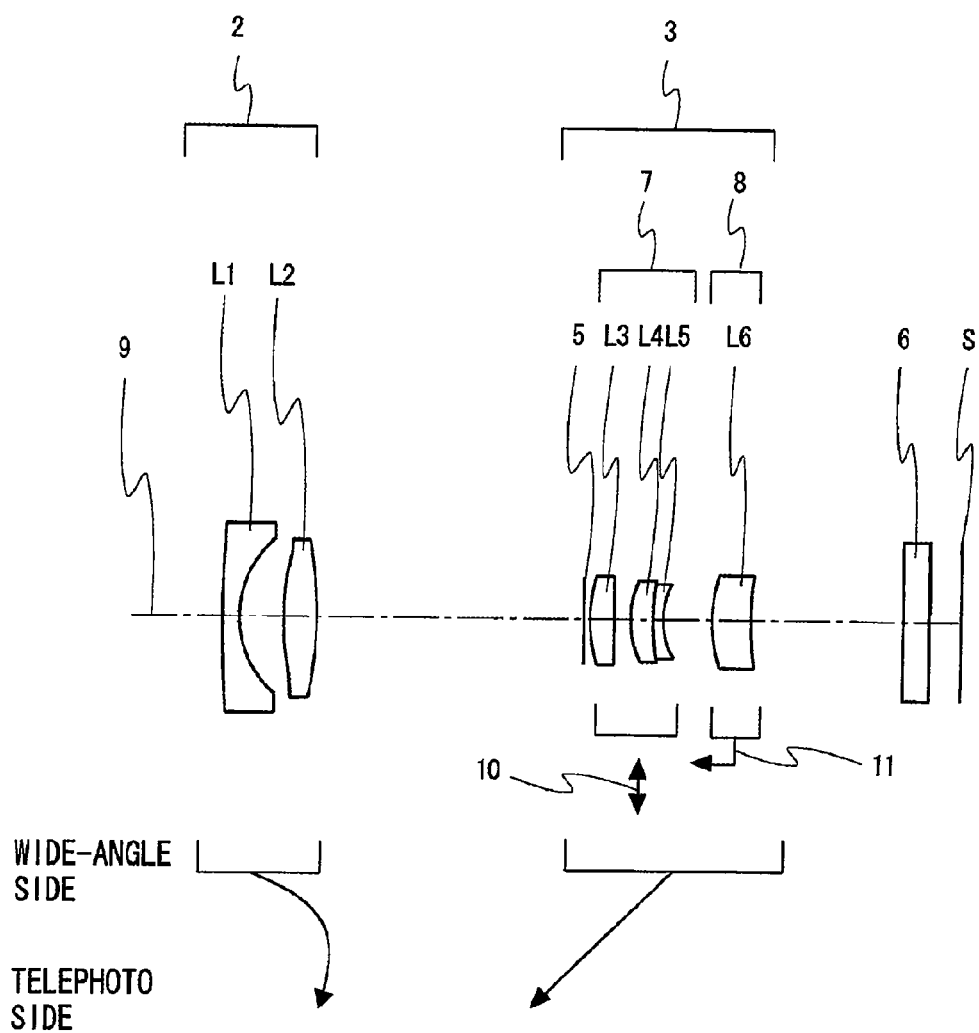
FIG. 6 is an arrangement diagram showing a lens configuration of a zoom lens system according to Embodiment 5 at a wide-angle limit in a normal state.

FIG. 6 is an arrangement diagram showing a lens configuration of a zoom lens system according to Embodiment 5 at a wide-angle limit in a normal state. The zoom lens system according to Embodiment 5, in order from the object side (left-hand side in FIG. 6) to the image side, comprises: a front lens unit 2 having negative optical power; and a rear lens unit 3 having positive optical power. Its basic configuration and the like are the same as those of the zoom lens system according to Embodiment 4. Thus, specific configurations of the individual lens units are solely described below in details.

As shown in FIG. 6, the front lens unit 2, in order from the object side to the image side, comprises: a negative meniscus lens element L1 with the convex surface facing the object side; and a positive meniscus lens element L2 with the convex surface facing the object side. Here, the negative meniscus lens element L1 is necessary for the purpose of satisfactory compensation of distortion at a wide-angle limit. Further, for the purpose of more satisfactory compensation of distortion, the image side surface 2 is aspheric. Here, the positive meniscus lens element L2 is formed with a plastic material such as polycarbonate resin. Further, for the purpose of cost reduction in a state that satisfactory aberration compensation is achieved, the two surfaces 3 and 4 are aspheric.

The rear lens unit 3 comprises an aperture diaphragm 5, a rear A lens unit 7 and a rear B lens unit 8. Similarly to the zoom lens system according to Embodiment 1, individual driving actuators serving as drive mechanisms are integrated into the rear lens unit 3.

The rear A lens unit 7 serving as a blur compensation lens unit, in order from the object side to the image side, comprises: a positive meniscus lens element L3 in which the convex surface is facing the object side and the object side surface 6 is aspheric; a positive meniscus lens element L4 with the convex surface facing the object side; and a negative meniscus lens element L5 with the convex surface facing the object side. The positive meniscus lens element L4 and the negative meniscus lens element L5 are cemented with each other. Further, in particular, the convex aspheric surface 6 located on the most object side and the concave surface 10 located on the most image side in the rear A lens unit 7 satisfactorily compensate axial chromatic aberration, spherical aberration, coma aberration and astigmatism of the rear A lens unit 7. This realizes an excellent blur compensation function in which degradation in the image formation performance is reduced. Further, the rear A lens unit 7, in order from the object side to the image side, includes a positive lens element (L3) and a cemented lens element composed of a positive lens element (L4) and a negative lens element (L5). This reduces the sensitivity of image formation performance with respect to movement (decentering) in a direction perpendicular to the optical axis of each lens element, and hence reduces performance degradation caused by a fabrication error.

The rear B lens unit 8 serving as a focusing lens unit is constructed only from a positive meniscus lens element L6 with the convex surface facing the object side. For the purpose of satisfactory compensation of astigmatism and reduction of performance degradation sensitivity due to decentering in the rear B lens unit 8, the two surfaces 11 and 12 of the positive meniscus lens element L6 are aspheric. As such, the rear B lens unit 8 includes a lens element having an aspheric surface. This permits satisfactory compensation of spherical aberration and coma aberration of the rear B lens unit 8, and realizes satisfactory focusing performance in which a change in spherical aberration caused by the object distance is reduced.

Embodiment 6

Figure 7:
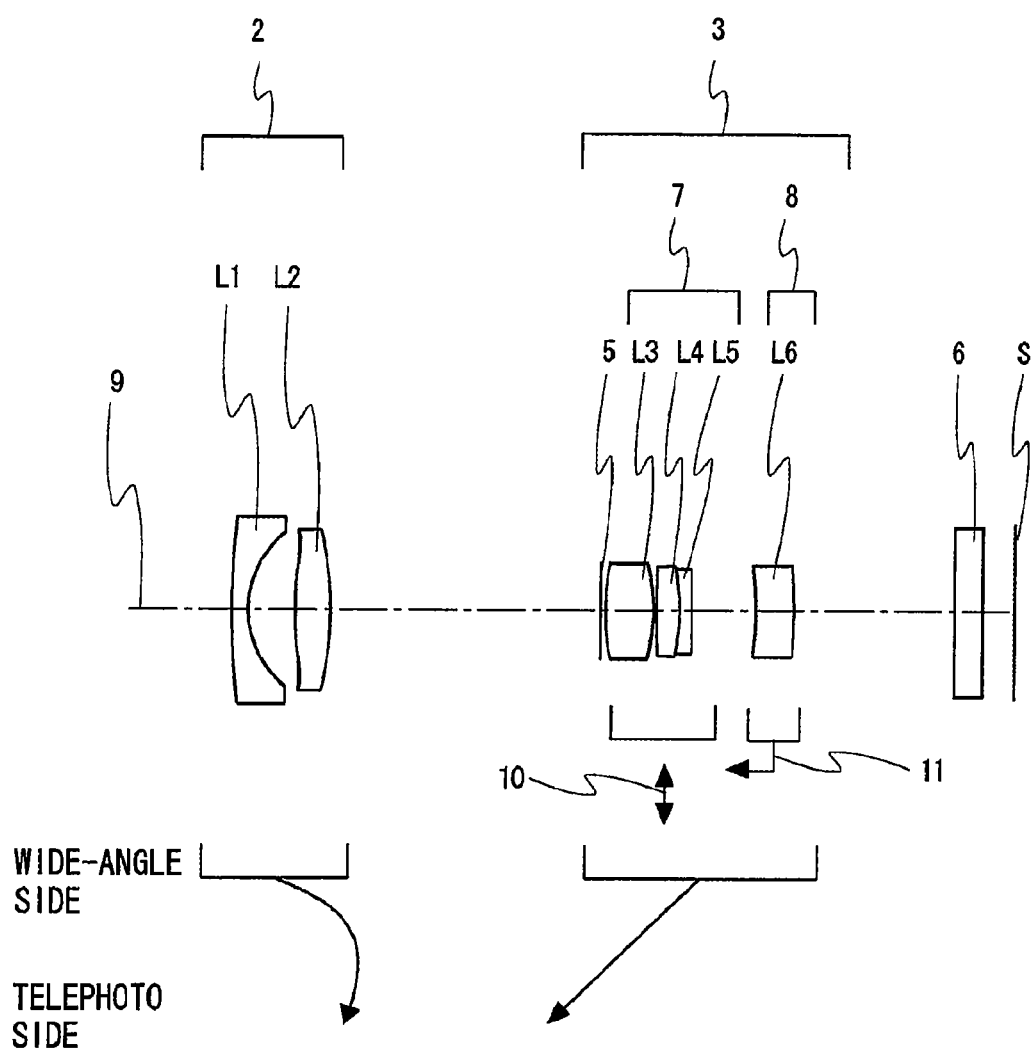
FIG. 7 is an arrangement diagram showing a lens configuration of a zoom lens system according to Embodiment 6 at a wide-angle limit in a normal state.

FIG. 7 is an arrangement diagram showing a lens configuration of a zoom lens system according to Embodiment 6 at a wide-angle limit in a normal state. The zoom lens system according to Embodiment 6, in order from the object side (left-hand side in FIG. 7) to the image side, comprises: a front lens unit 2 having negative optical power; and a rear lens unit 3 having positive optical power. Its basic configuration and the like are the same as those of the zoom lens system according to Embodiment 4. Thus, specific configurations of the individual lens units are solely described below in details.

As shown in FIG. 7, the front lens unit 2, in order from the object side to the image side, comprises: a negative meniscus lens element L1 with the convex surface facing the object side; and a bi-convex positive lens element L2. Here, the negative meniscus lens element L1 is necessary for the purpose of satisfactory compensation of distortion at a wide-angle limit. Further, for the purpose of more satisfactory compensation of distortion, the image side surface 2 is aspheric. Here, the bi-convex positive lens element L2 is formed with a plastic material such as polycarbonate resin. Further, for the purpose of cost reduction in a state that satisfactory aberration compensation is achieved, the two surfaces 3 and 4 are aspheric.

The rear lens unit 3 comprises an aperture diaphragm 5, a rear A lens unit 7 and a rear B lens unit 8. Similarly to the zoom lens system according to Embodiment 1, individual driving actuators serving as drive mechanisms are integrated into the rear lens unit 3.

The rear A lens unit 7 serving as a blur compensation lens unit, in order from the object side to the image side, comprises: a bi-convex positive lens element L3 in which the object side surface 6 is aspheric; a bi-convex positive lens element L4; and a bi-concave negative lens element L5. The bi-convex positive lens element L4 and the bi-concave negative lens element L5 are cemented with each other. Further, in particular, the convex aspheric surface 6 located on the most object side and the concave surface 10 located on the most image side in the rear A lens unit 7 satisfactorily compensate axial chromatic aberration, spherical aberration, coma aberration and astigmatism of the rear A lens unit 7. This realizes an excellent blur compensation function in which degradation in the image formation performance is reduced. Further, the rear A lens unit 7, in order from the object side to the image side, includes a positive lens element (L3) and a cemented lens element composed of a positive lens element (L4) and a negative lens element (L5). This reduces the sensitivity of image formation performance with respect to movement (decentering) in a direction perpendicular to the optical axis of each lens element, and hence reduces performance degradation caused by a fabrication error.

The rear B lens unit 8 serving as a focusing lens unit is constructed only from a negative meniscus lens element L6 with the convex surface facing the image side. For the purpose of satisfactory compensation of astigmatism and reduction of performance degradation sensitivity due to decentering in the rear B lens unit 8, the two surfaces 11 and 12 of the negative meniscus lens element L6 are aspheric. As such, the rear B lens unit 8 includes a lens element having an aspheric surface. This permits satisfactory compensation of spherical aberration and coma aberration of the rear B lens unit 8, and realizes satisfactory focusing performance in which a change in spherical aberration caused by the object distance is reduced.

Next, preferable conditions are described below that are to be satisfied by a zoom lens system like that of Embodiments 1 to 6, the zoom lens system comprising a plurality of lens units including at least: a front lens unit having negative optical power; and a rear lens unit that has positive optical power, is arranged on the image side of the front lens unit, and includes a plurality of lens elements; wherein magnification change is performed by changing the interval between the individual lens units, wherein the rear lens unit comprises: a rear A lens unit capable of moving in a direction perpendicular to an optical axis; and a rear B lens unit that is arranged on the image side of the rear A lens unit and that can move in an optical axis direction in such a manner that the interval relative to the rear A lens unit in the optical axis direction is changed, and wherein focusing adjustment during variation of the object distance is achieved by changing the interval between the rear A lens unit and the rear B lens unit. Here, for the zoom lens system according to Embodiments 1 to 6, a plurality of conditions may be set forth, for example, other than the following condition (1). The construction that satisfies all the conditions is most desirable for the zoom lens system. However, when an individual condition is satisfied, a zoom lens system providing the corresponding effect can be obtained.

In the zoom lens system according to Embodiments 1 to 6, for example, it is preferable that the following condition (1) is satisfied.

$$0.5 < \phi 21/\phi 2 < 1.5 \tag{1}$$

where;

$\phi 2$ is the optical power of the rear lens unit, and $\phi 21$ is the optical power of the rear A lens unit.

When the condition (1) is satisfied, the amount of movement (the amount of decentering) in a direction perpendicular to the optical axis of the rear A lens unit at the time of blur compensation is set at an appropriate value. This realizes a zoom lens system that has more satisfactory blur compensation performance.

When the value goes below the lower limit of the condition (1), the optical power of the rear A lens unit decreases. Thus, the amount of movement (the amount of decentering) at the time of blur compensation increases. This causes a difficulty in drive control, and hence causes a difficulty in achieving satisfactory blur compensation. Further, the optical power of the rear B lens unit increases. This causes an increase in degradation of image formation performance caused by decentering error of the rear B lens unit. On the other hand, when the value exceeds the upper limit of the condition (1), the optical power of the rear A lens unit increases excessively. This causes a difficulty in achieving satisfactory astigmatism compensation in the rear A lens unit. As a result, an increase is caused in degradation of image formation performance caused by the movement (decentering) in a direction perpendicular to the optical axis of the rear A lens unit. This causes a difficulty in achieving satisfactory blur compensation.

Here, the zoom lens system according to Embodiments 1 to 6, it is more preferable that at least one of the following conditions (1a) and (1b) is satisfied.

$$0.7 < \phi 21/\phi 2 \tag{1a}$$

$$\phi 21/\phi 2 < 0.9 \tag{1b}$$

When the condition (1a) is satisfied, drive control becomes easier at the time of blur compensation, and hence more satisfactory blur compensation is achieved. Further, this avoids the possibility of degradation of image formation performance caused by decentering error of the rear B lens unit.

On the other hand, when the condition (1b) is satisfied, the angle of the incident light on the image formation surface at the periphery view angle decreases so that approximate telecentricity is achieved. Image sensors represented by a CCD and the like have shading characteristics in which the sensitivity increases corresponding to incident angle. Usually, the incident angle is adjusted within 10 to 15°. The value exceeds the upper limit of the condition (1b), the optical power of the rear B lens unit decreases. Thus, telecentricity is not satisfied in some cases.

Embodiment 7

Figure 8:
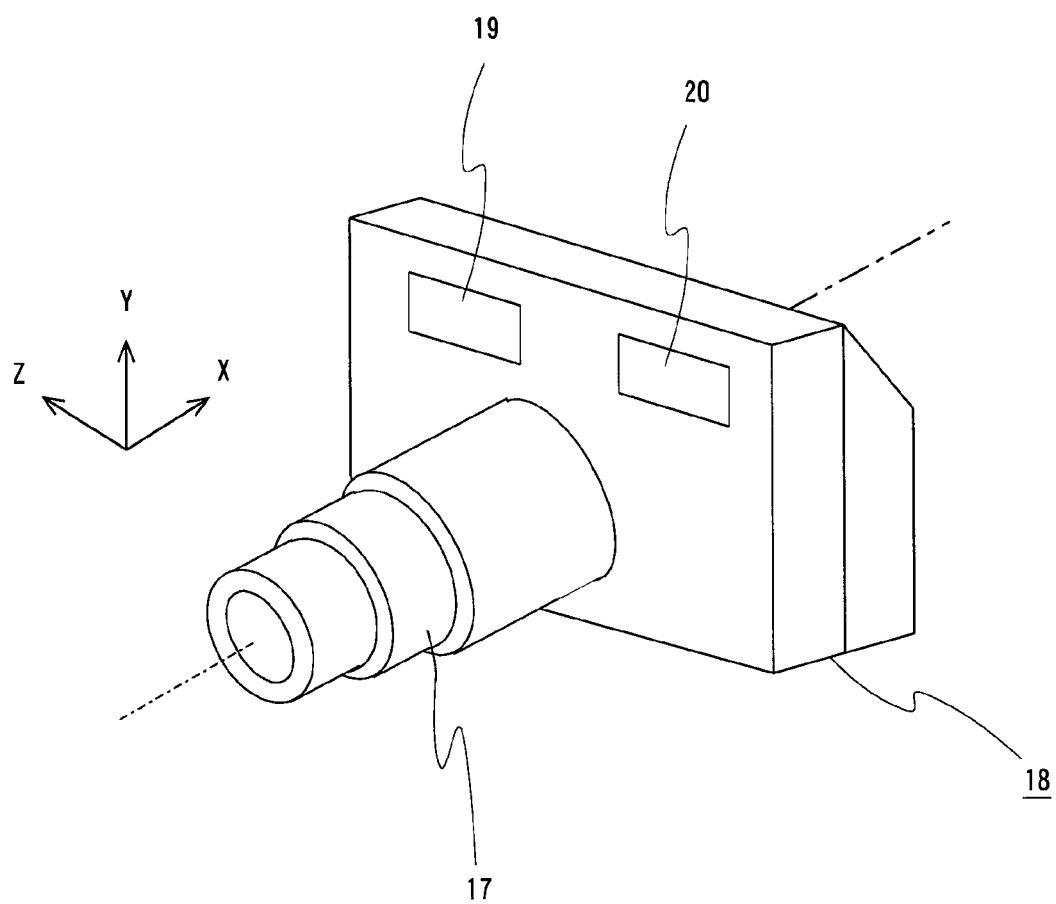
FIG. 8 is a schematic perspective view showing an example of a configuration of an imaging optical device according to Embodiment 7.

FIG. 8 is a schematic perspective view showing an example of a configuration of an imaging optical device according to Embodiment 7.

As shown in FIG. 8, the imaging optical device 18 comprises: a lens barrel 17; an image sensor (not shown) such as a CCD or a CMOS; a stroboscope 19; and an optical viewfinder 20. The lens barrel 17 holds any one of the zoom lens systems (not shown) according to Embodiments 1 to 6.

As such, the imaging optical device 18 employs any one of the zoom lens systems according to Embodiments 1 to 6. Thus, the imaging optical device 18 is provided with reduced size and weight as well as a high imaging function.

In addition to the application to a digital camera capable of shooting high resolution still images and moving images, the imaging optical device according to Embodiment 7 is applicable to, for example, a portable telephone device, a PDA (Personal Digital Assistance), a surveillance camera in a surveillance system, a Web camera, a vehicle-mounted camera and the like.

The zoom lens system according to Embodiments 1 to 6 is described below in further detail with reference to specific examples. In the examples, the units of the length in the tables are all "mm". In the tables, CR denotes the radius of curvature of the optical surface (this notation is the same also in the following formula). T denotes the optical surface interval. Nd denotes the refractive index to the d-line of the lens element. Vd denotes the Abbe number to the d-line of the lens element. Further, in the tables, "*" is given to the optical surface having an aspheric surface. The shape of the aspheric surface is defined by the following formula when the X-axis is defined toward the image side from the object side on the optical axis.

$$X = \frac{(1/CR) \cdot H^2}{1 + \sqrt{1 - (1+K) \cdot (1/CR)^2 \cdot H^2}} + \sum_n An \cdot H^n$$

$$H^2 = Y^2 + Z^2$$

Here, K denotes the conic constant, and An denotes the n-th-order aspherical coefficient.

Figure 9:
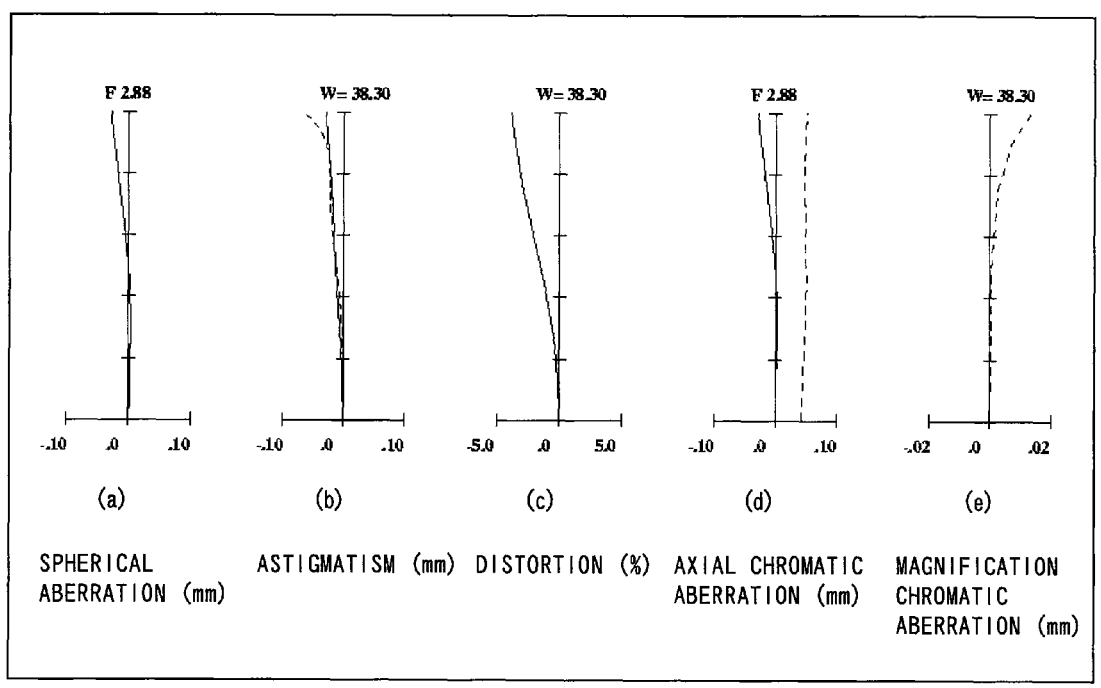
FIG. 9 is a longitudinal aberration diagram of a zoom lens system of Example 1 at an infinite object point at a wide-angle limit in a normal state.
Figure 10:
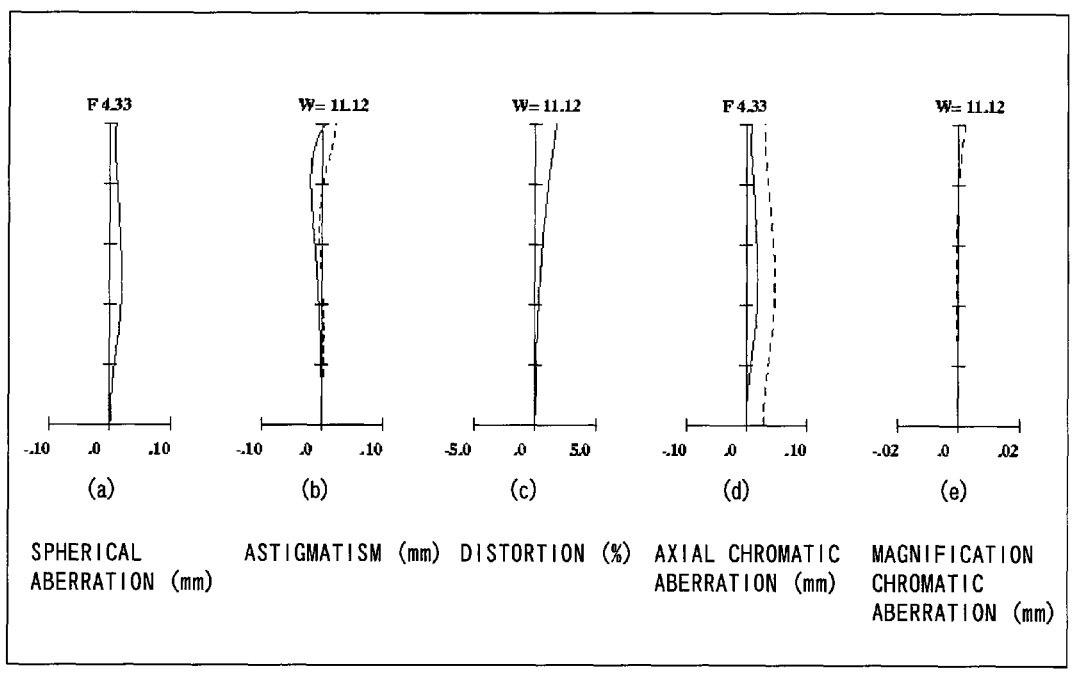
FIG. 10 is a longitudinal aberration diagram of a zoom lens system of Example 1 at an infinite object point at a telephoto limit in a normal state.
Figure 15:
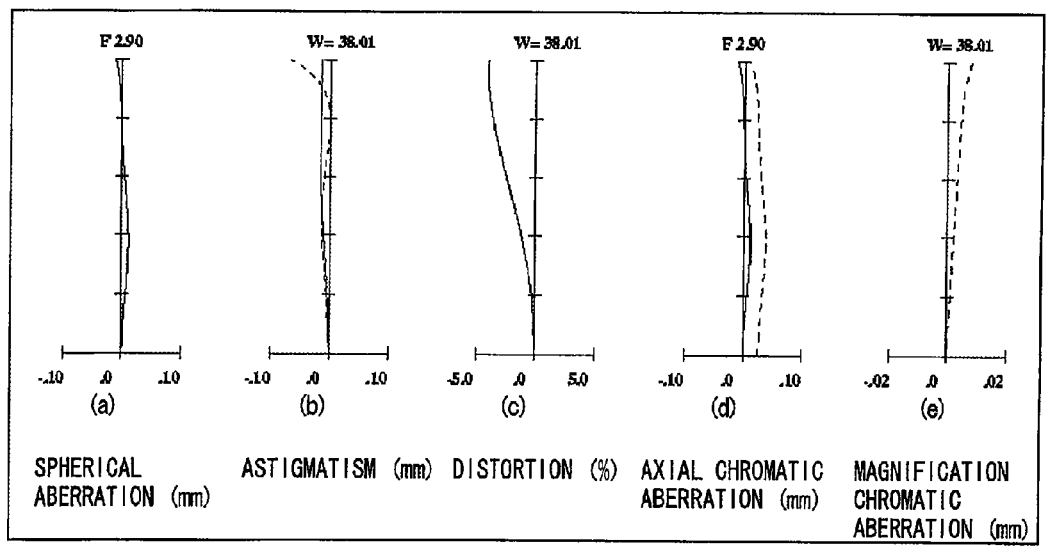
FIG. 15 is a longitudinal aberration diagram of a zoom lens system of Example 2 at an infinite object point at a wide-angle limit in a normal state.
Figure 16:
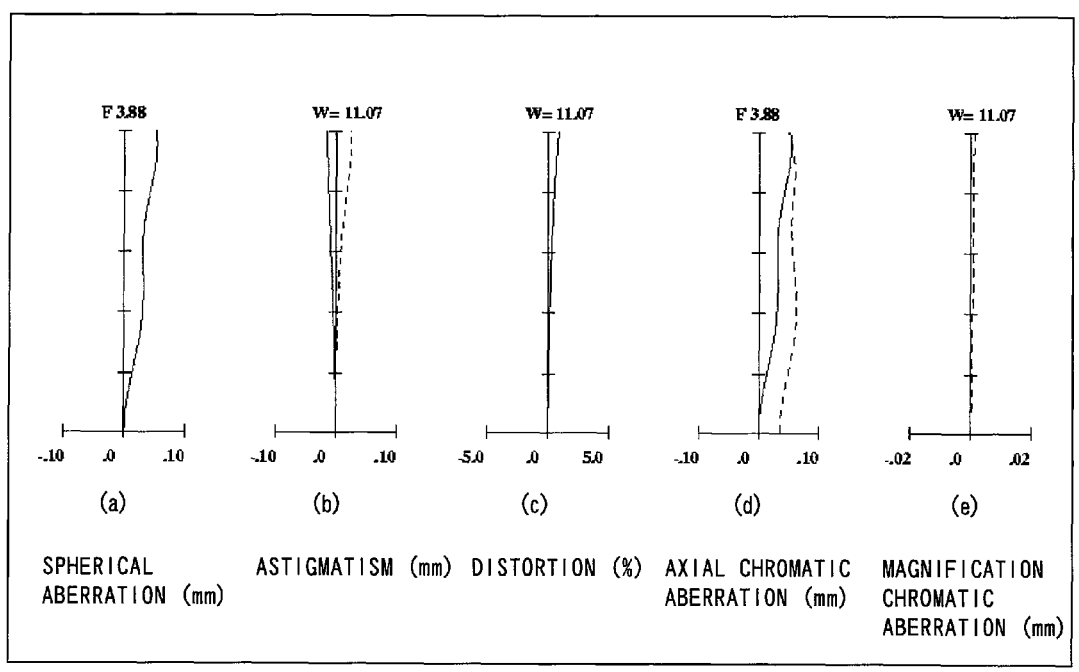
FIG. 16 is a longitudinal aberration diagram of a zoom lens system of Example 2 at an infinite object point at a telephoto limit in a normal state.
Figure 21:
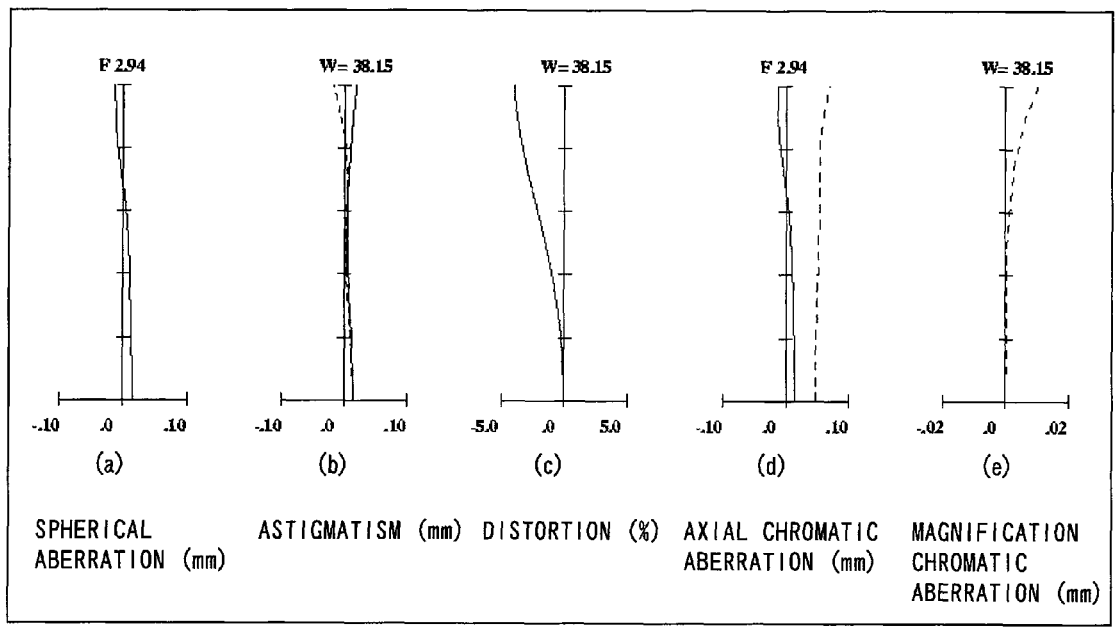
FIG. 21 is a longitudinal aberration diagram of a zoom lens system of Example 3 at an infinite object point at a wide-angle limit in a normal state.
Figure 22:
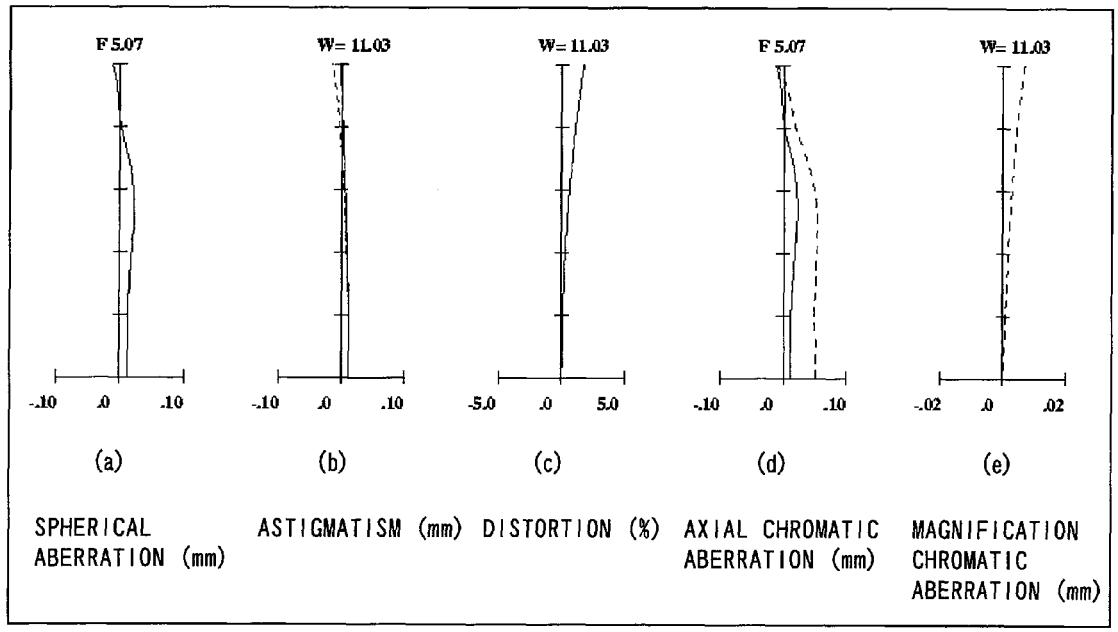
FIG. 22 is a longitudinal aberration diagram of a zoom lens system of Example 3 at an infinite object point at a telephoto limit in a normal state.
Figure 27:
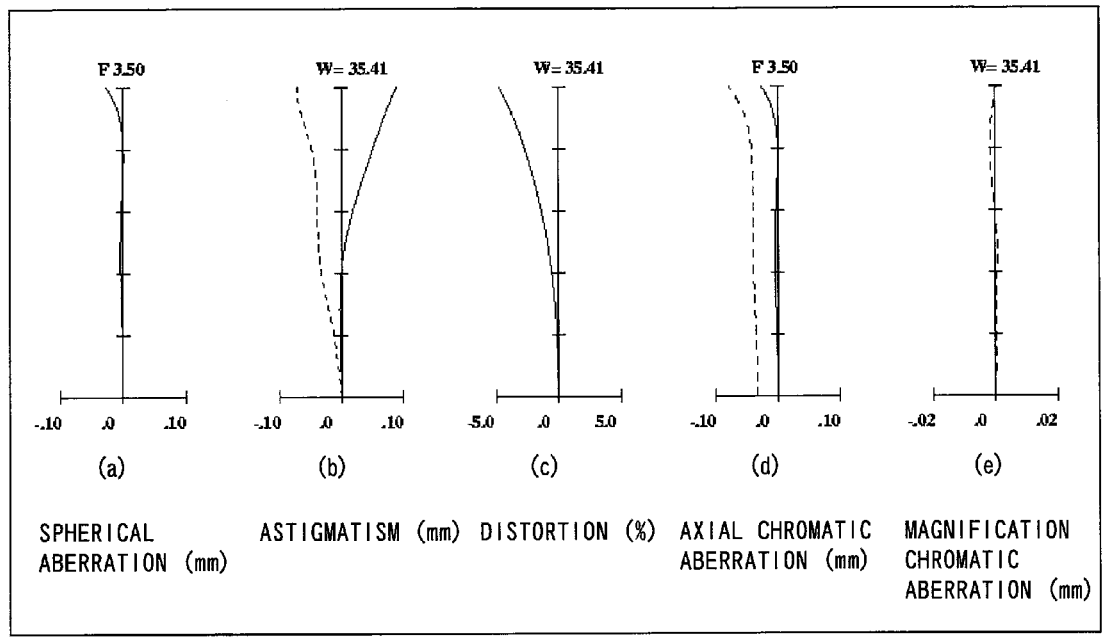
FIG. 27 is a longitudinal aberration diagram of a zoom lens system of Example 4 at an infinite object point at a wide-angle limit in a normal state.
Figure 28:
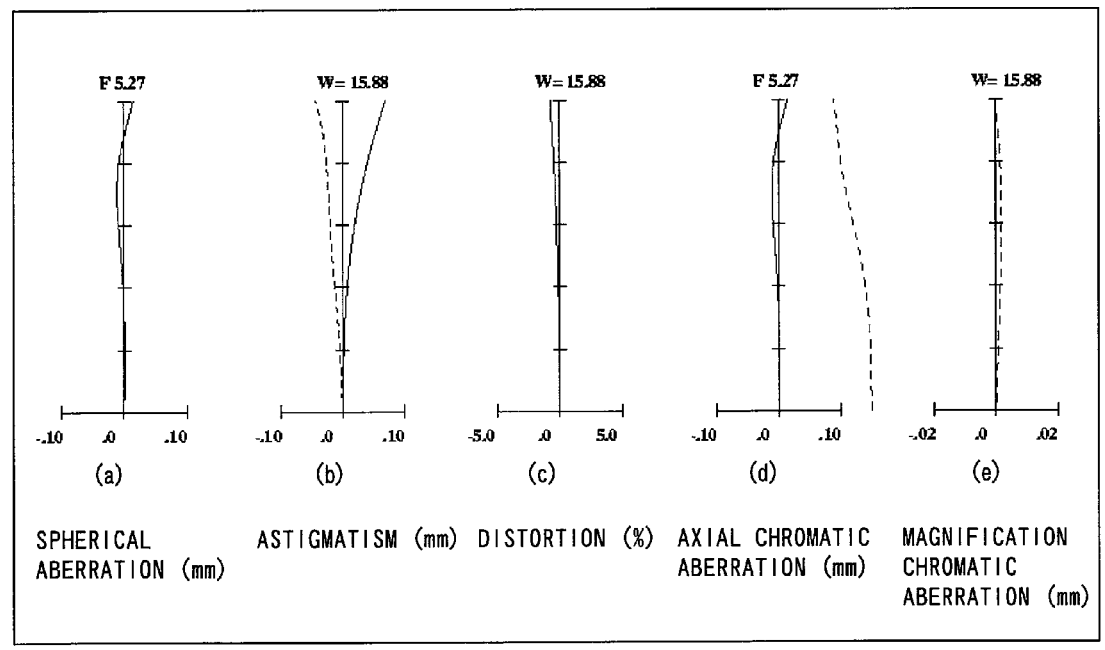
FIG. 28 is a longitudinal aberration diagram of a zoom lens system of Example 4 at an infinite object point at a telephoto limit in a normal state.
Figure 33:
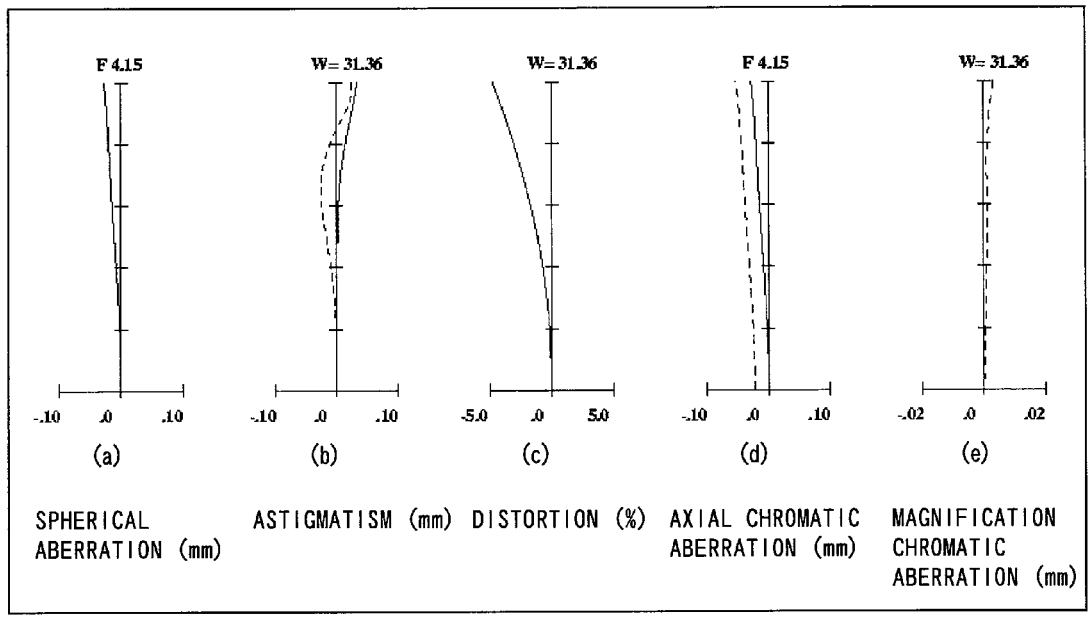
FIG. 33 is a longitudinal aberration diagram of a zoom lens system of Example 5 at an infinite object point at a wide-angle limit in a normal state.
Figure 34:
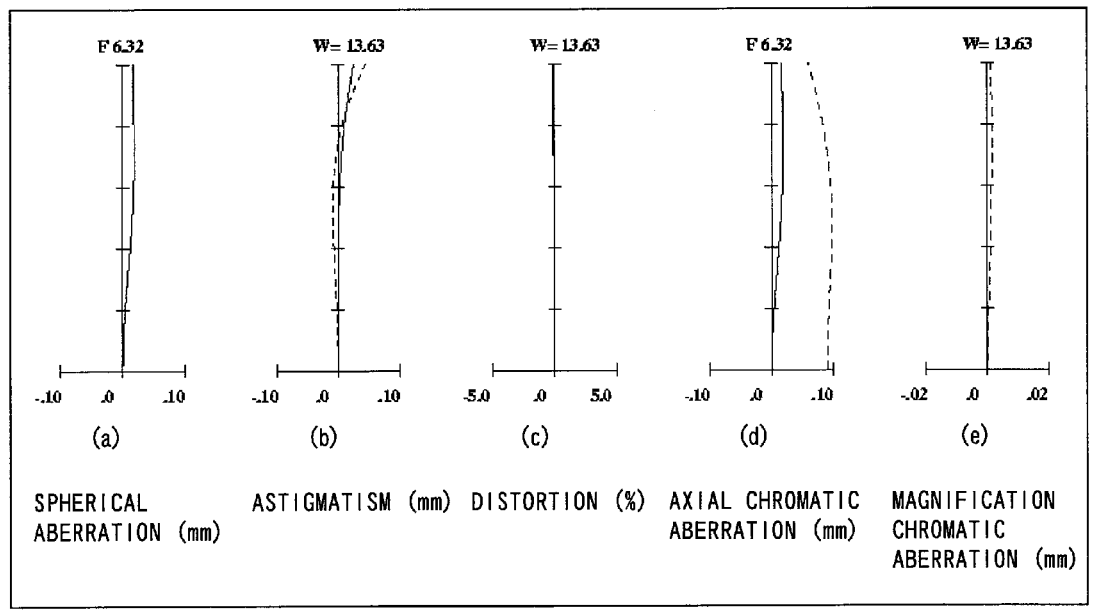
FIG. 34 is a longitudinal aberration diagram of a zoom lens system of Example 5 at an infinite object point at a telephoto limit in a normal state.
Figure 39:
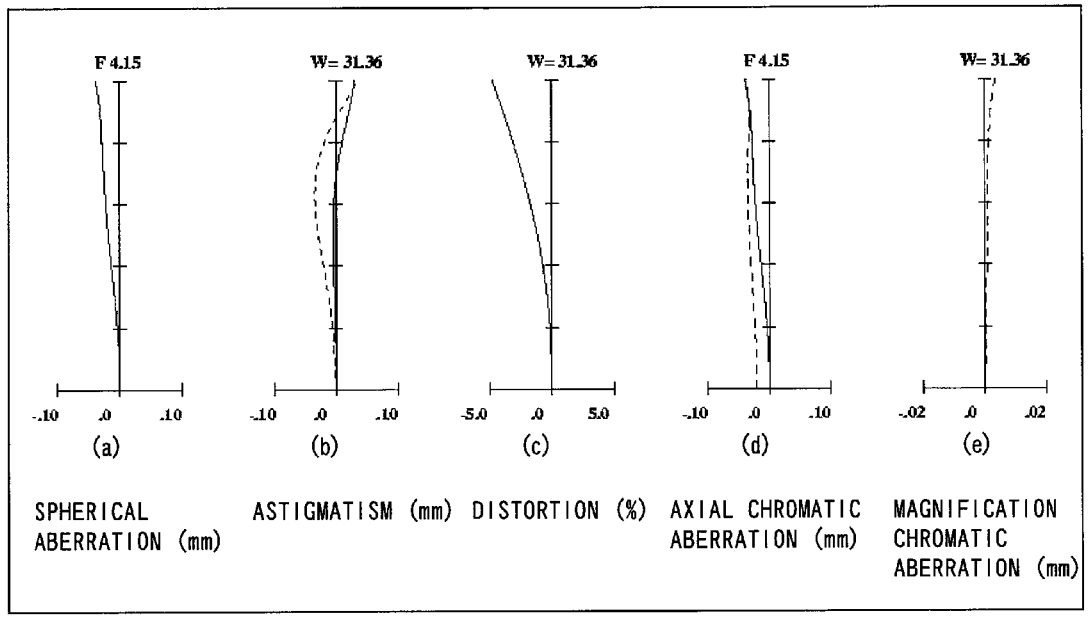
FIG. 39 is a longitudinal aberration diagram of a zoom lens system of Example 6 at an infinite object point at a wide-angle limit in a normal state.
Figure 40:
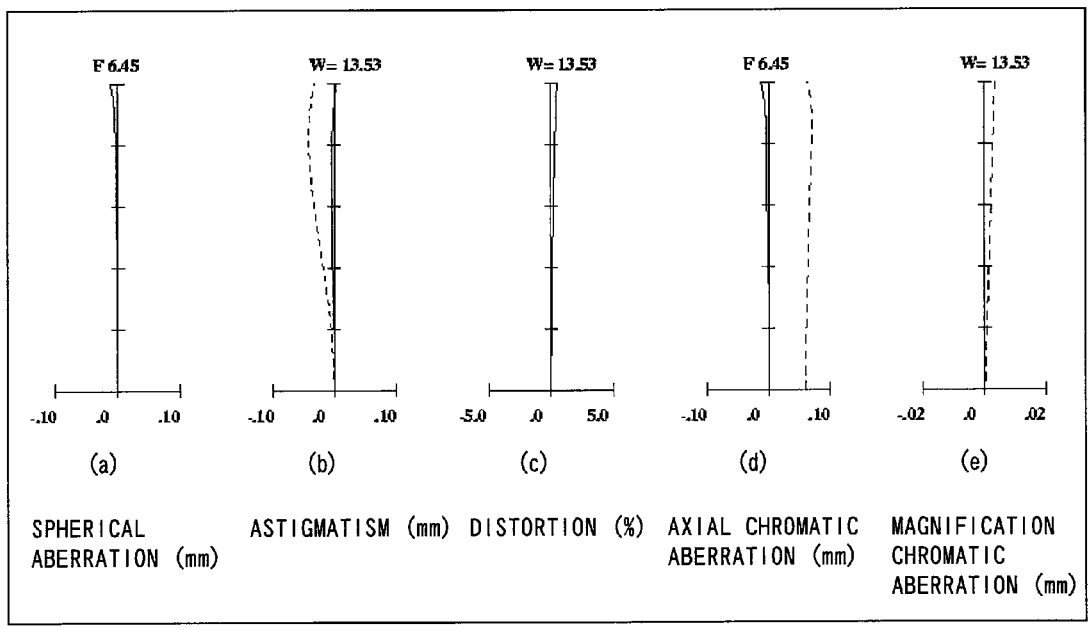
FIG. 40 is a longitudinal aberration diagram of a zoom lens system of Example 6 at an infinite object point at a telephoto limit in a normal state.

FIG. 9 is a longitudinal aberration diagram of a zoom lens system of Example 1 at an infinite object point at a wide-angle limit in a normal state. FIG. 10 is a longitudinal aberration diagram of a zoom lens system of Example 1 at an infinite object point at a telephoto limit in a normal state. FIG. 15 is a longitudinal aberration diagram of a zoom lens system of Example 2 at an infinite object point at a wide-angle limit in a normal state. FIG. 16 is a longitudinal aberration diagram of a zoom lens system of Example 2 at an infinite object point at a telephoto limit in a normal state. FIG. 21 is a longitudinal aberration diagram of a zoom lens system of Example 3 at an infinite object point at a wide-angle limit in a normal state. FIG. 22 is a longitudinal aberration diagram of a zoom lens system of Example 3 at an infinite object point at a telephoto limit in a normal state. FIG. 27 is a longitudinal aberration diagram of a zoom lens system of Example 4 at an infinite object point at a wide-angle limit in a normal state. FIG. 28 is a longitudinal aberration diagram of a zoom lens system of Example 4 at an infinite object point at a telephoto limit in a normal state. FIG. 33 is a longitudinal aberration diagram of a zoom lens system of Example 5 at an infinite object point at a wide-angle limit in a normal state. FIG. 34 is a longitudinal aberration diagram of a zoom lens system of Example 5 at an infinite object point at a telephoto limit in a normal state. FIG. 39 is a longitudinal aberration diagram of a zoom lens system of Example 6 at an infinite object point at a wide-angle limit in a normal state. FIG. 40 is a longitudinal aberration diagram of a zoom lens system of Example 6 at an infinite object point at a telephoto limit in a normal state.

In each longitudinal aberration diagram, part (a) shows spherical aberration, part (b) shows astigmatism, part (c) shows distortion, part (d) shows axial chromatic aberration, and part (e) shows magnification chromatic aberration. In the spherical aberration diagram, the vertical axis indicates the F-number, and the solid line indicates the characteristics to the d-line. In the astigmatism diagram, the vertical axis indicates the half view angle, and the solid line and the dashed line indicate the characteristics to the sagittal image plane and the meridional image plane, respectively. In the distortion diagram, the vertical axis indicates the half view angle, and the solid line indicates the characteristics to the d-line. In the axial chromatic aberration diagram, the vertical axis indicates the F-number, the solid line indicates the characteristics to the d-line, and the dashed line indicates the characteristics to the g-line. In the magnification chromatic aberration diagram, the vertical axis indicates the half view angle ω, and the dashed line indicates the characteristics to the g-line over the d-line.

Figure 11:
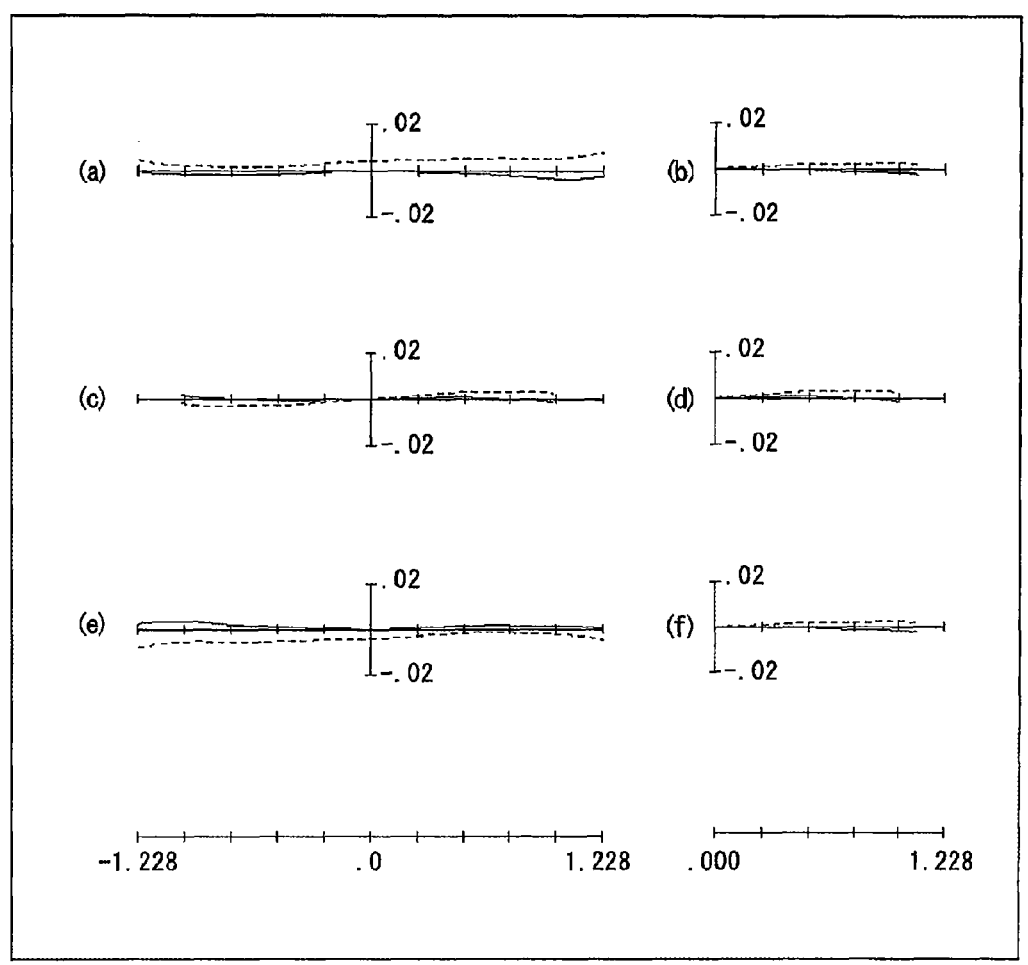
FIG. 11 is a lateral aberration diagram of a zoom lens system of Example 1 at an infinite object point at a wide-angle limit in a normal state.
Figure 12:
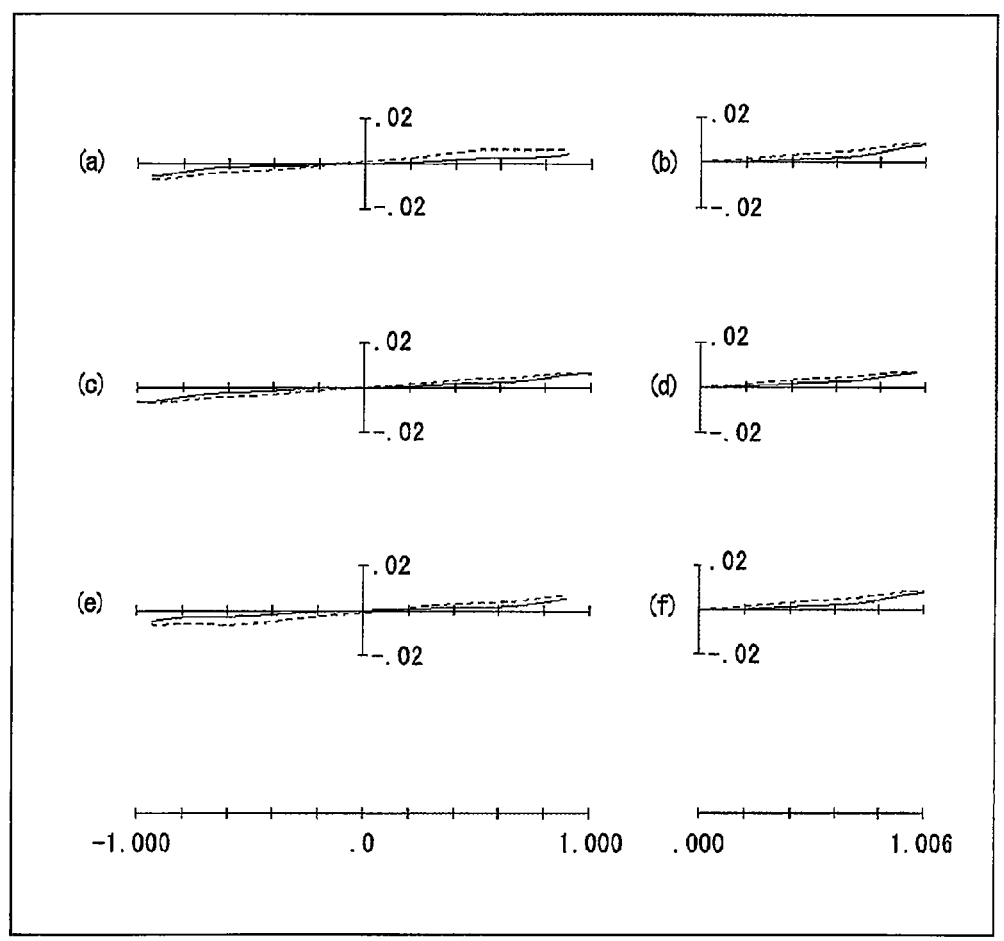
FIG. 12 is a lateral aberration diagram of a zoom lens system of Example 1 at an infinite object point at a telephoto limit in a normal state.
Figure 13:
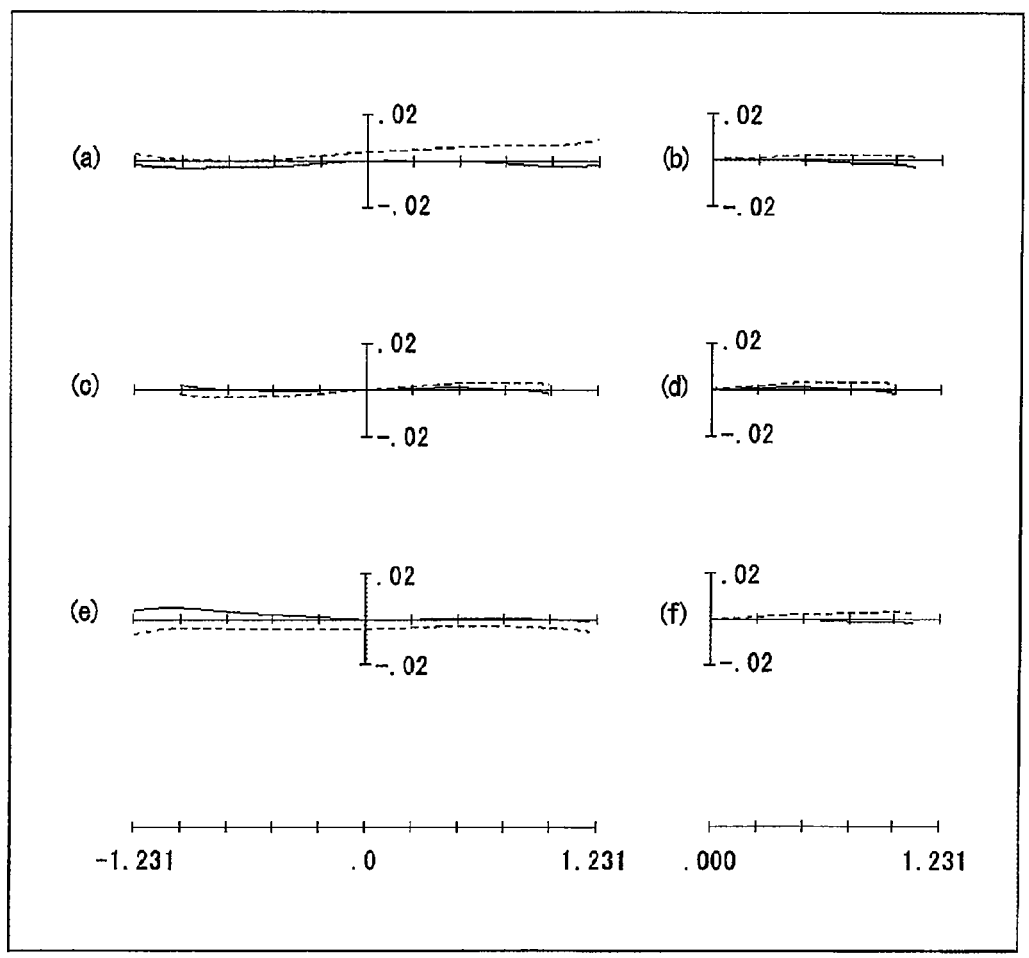
FIG. 13 is a lateral aberration diagram of a zoom lens system of Example 1 at an infinite object point at a wide-angle limit at the time of view-angle blur compensation of $0.6°$.
Figure 14:
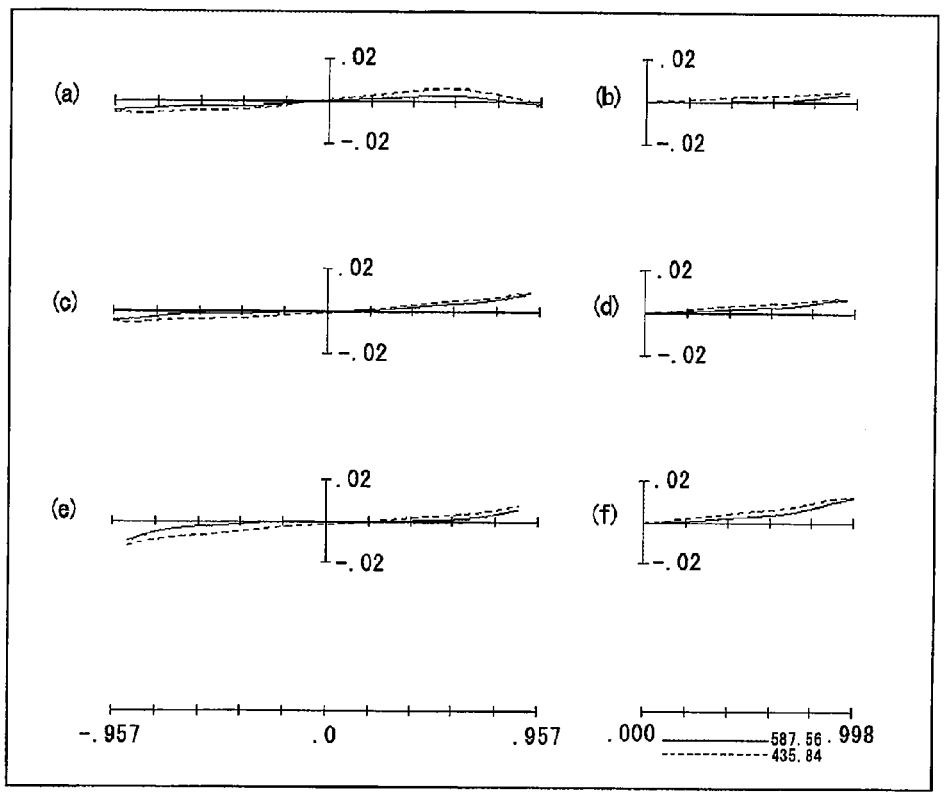
FIG. 14 is a lateral aberration diagram of a zoom lens system of Example 1 at an infinite object point at a telephoto limit at the time of view-angle blur compensation of $0.6°$.

FIG. 11 is a lateral aberration diagram of a zoom lens system of Example 1 at an infinite object point at a wide-angle limit in a normal state. FIG. 12 is a lateral aberration diagram of a zoom lens system of Example 1 at an infinite object point at a telephoto limit in a normal state. FIG. 13 is a lateral aberration diagram of a zoom lens system of Example 1 at an infinite object point at a wide-angle limit at the time of view-angle blur compensation of 0.6°. FIG. 14 is a lateral aberration diagram of a zoom lens system of Example 1 at an infinite object point at a telephoto limit at the time of view-angle blur compensation of 0.6°.

Figure 17:
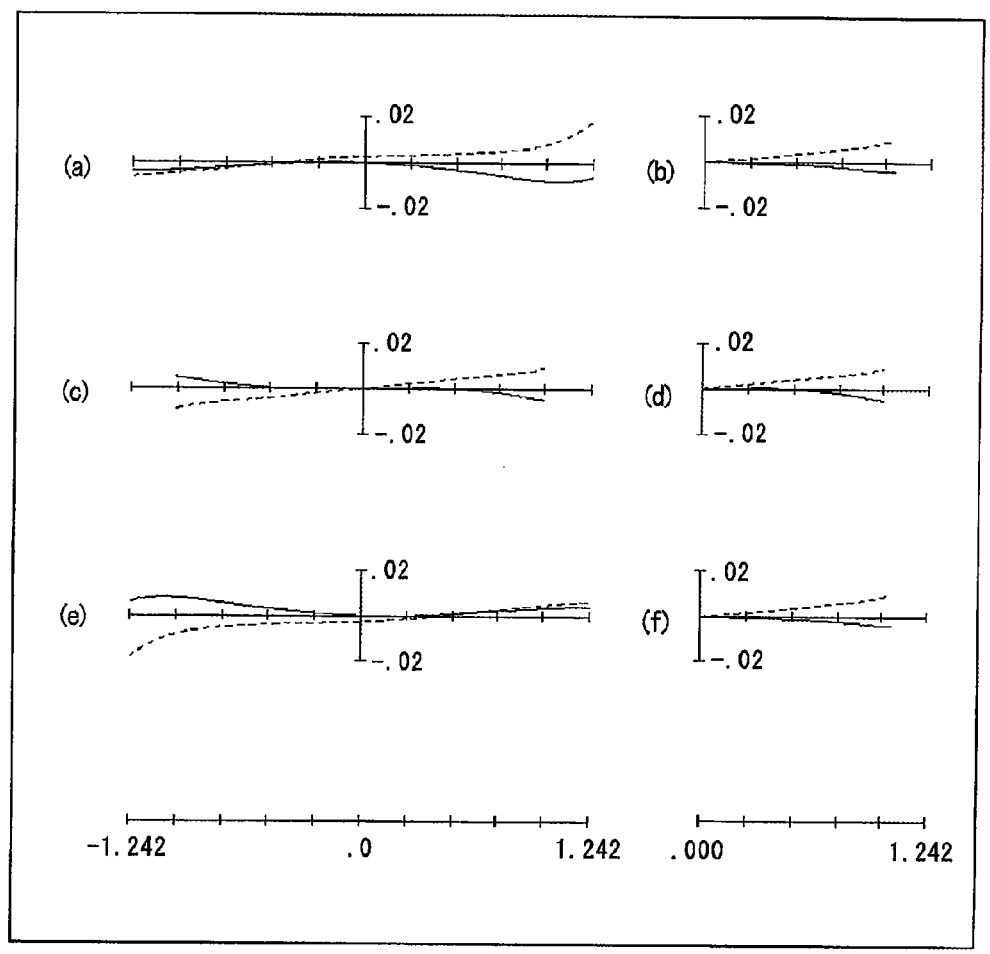
FIG. 17 is a lateral aberration diagram of a zoom lens system of Example 2 at an infinite object point at a wide-angle limit in a normal state.
Figure 18:
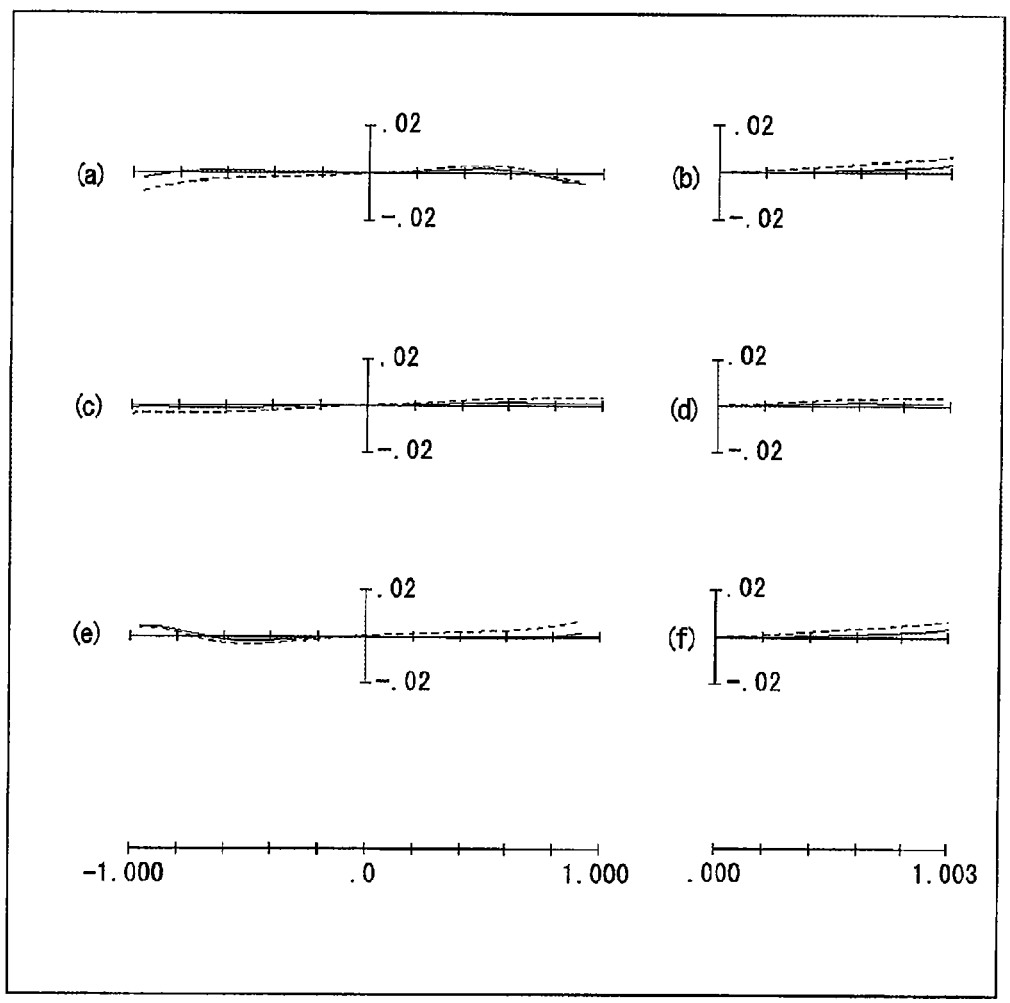
FIG. 18 is a lateral aberration diagram of a zoom lens system of Example 2 at an infinite object point at a telephoto limit in a normal state.
Figure 19:
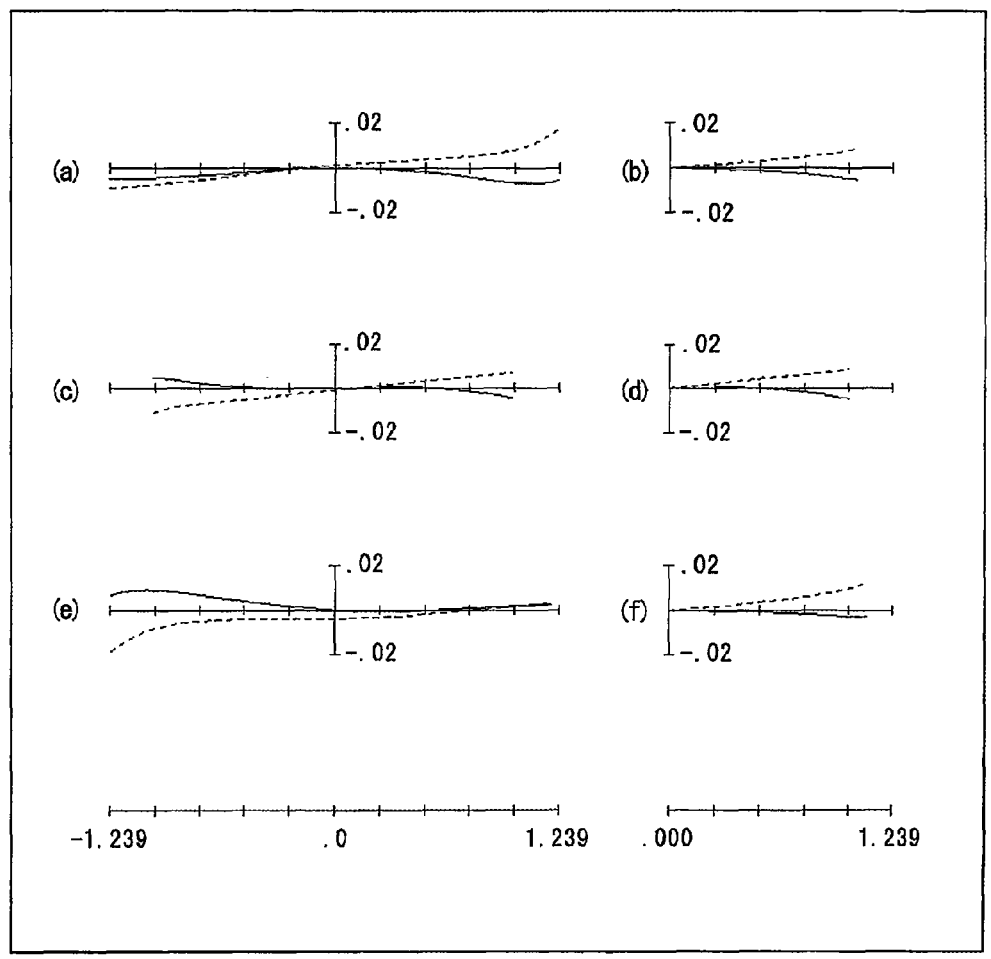
FIG. 19 is a lateral aberration diagram of a zoom lens system of Example 2 at an infinite object point at a wide-angle limit at the time of view-angle blur compensation of $0.6°$.
Figure 20:
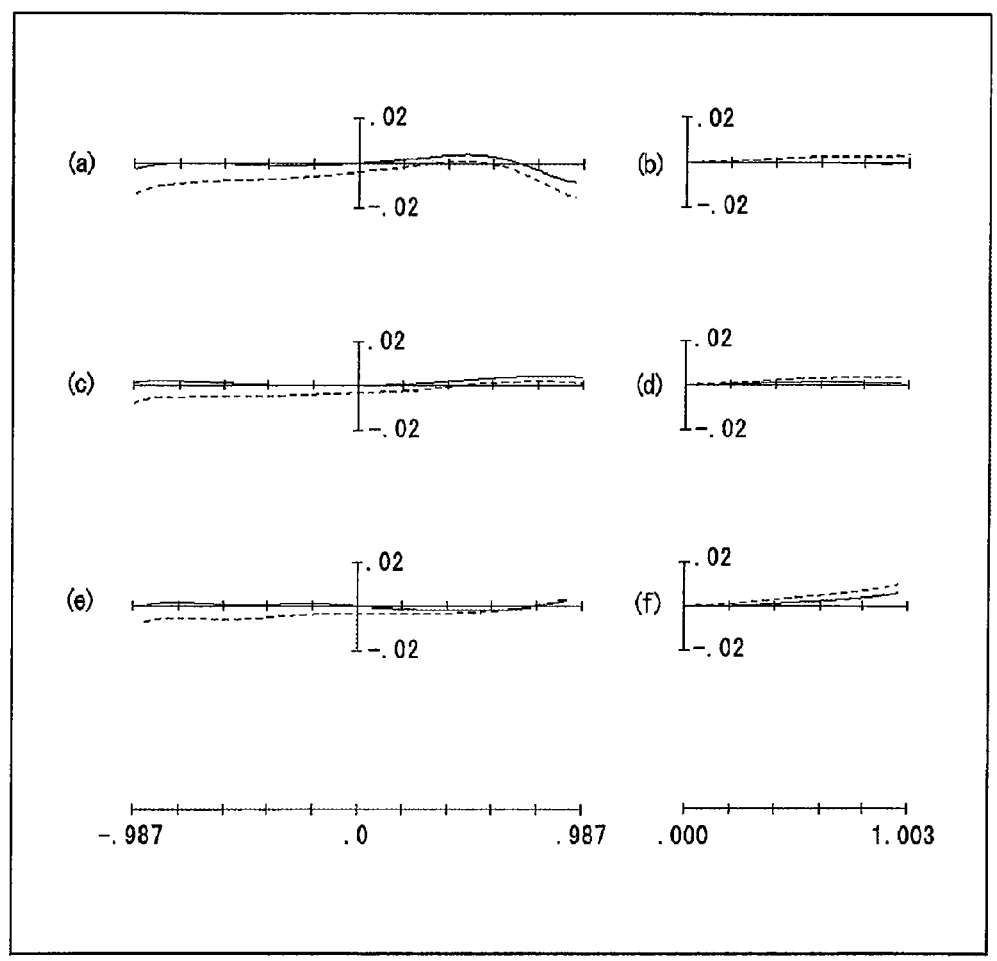
FIG. 20 is a lateral aberration diagram of a zoom lens system of Example 2 at an infinite object point at a telephoto limit at the time of view-angle blur compensation of $0.6°$.

FIG. 17 is a lateral aberration diagram of a zoom lens system of Example 2 at an infinite object point at a wide-angle limit in a normal state. FIG. 18 is a lateral aberration diagram of a zoom lens system of Example 2 at an infinite object point at a telephoto limit in a normal state. FIG. 19 is a lateral aberration diagram of a zoom lens system of Example 2 at an infinite object point at a wide-angle limit at the time of view-angle blur compensation of 0.6°. FIG. 20 is a lateral aberration diagram of a zoom lens system of Example 2 at an infinite object point at a telephoto limit at the time of view-angle blur compensation of 0.6°.

Figure 23:
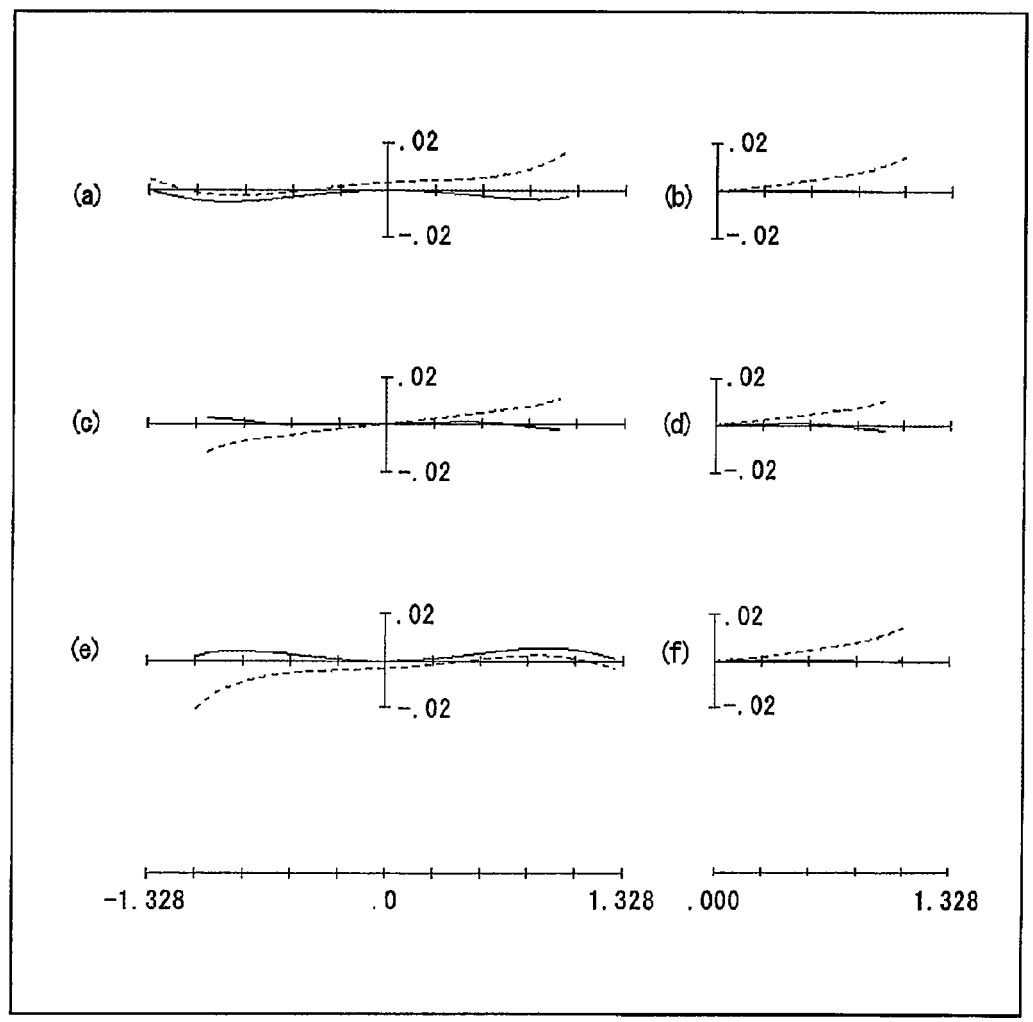
FIG. 23 is a lateral aberration diagram of a zoom lens system of Example 3 at an infinite object point at a wide-angle limit in a normal state.
Figure 24:
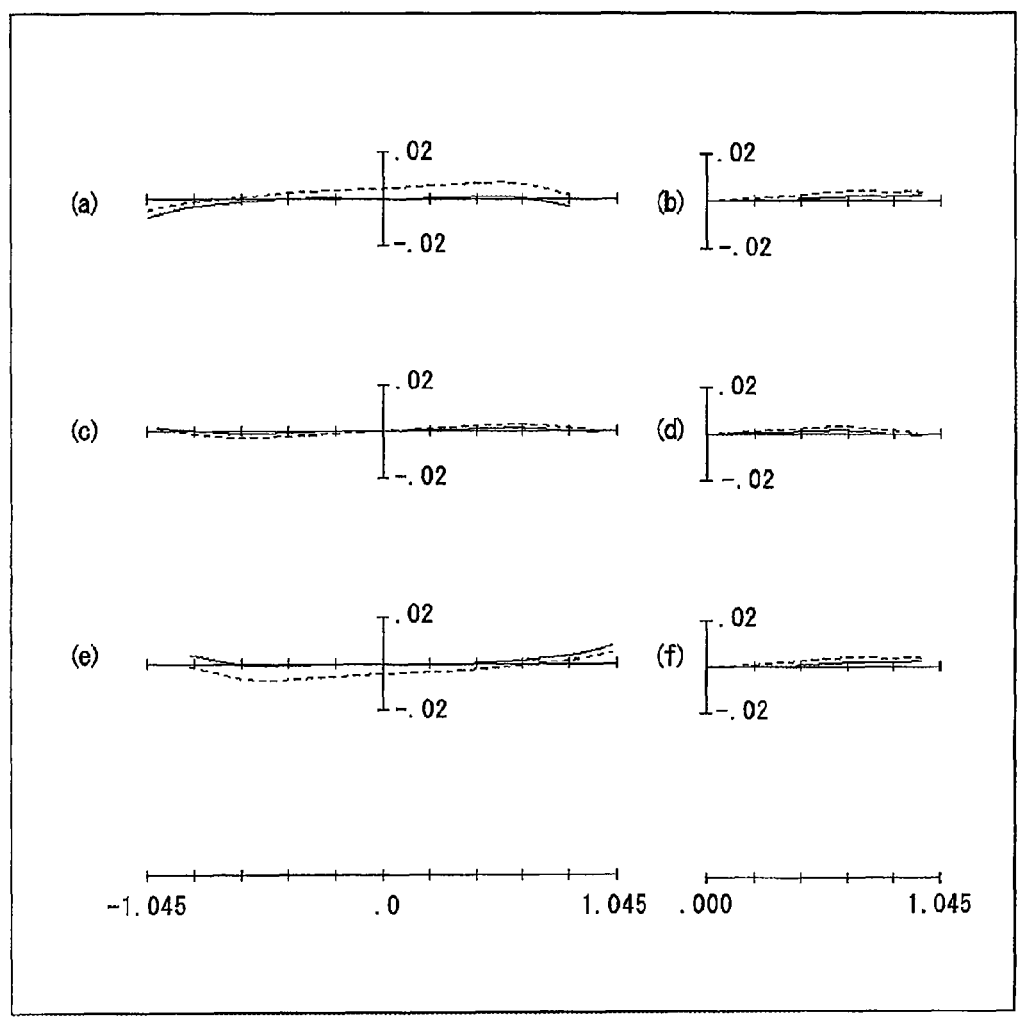
FIG. 24 is a lateral aberration diagram of a zoom lens system of Example 3 at an infinite object point at a telephoto limit in a normal state.
Figure 25:
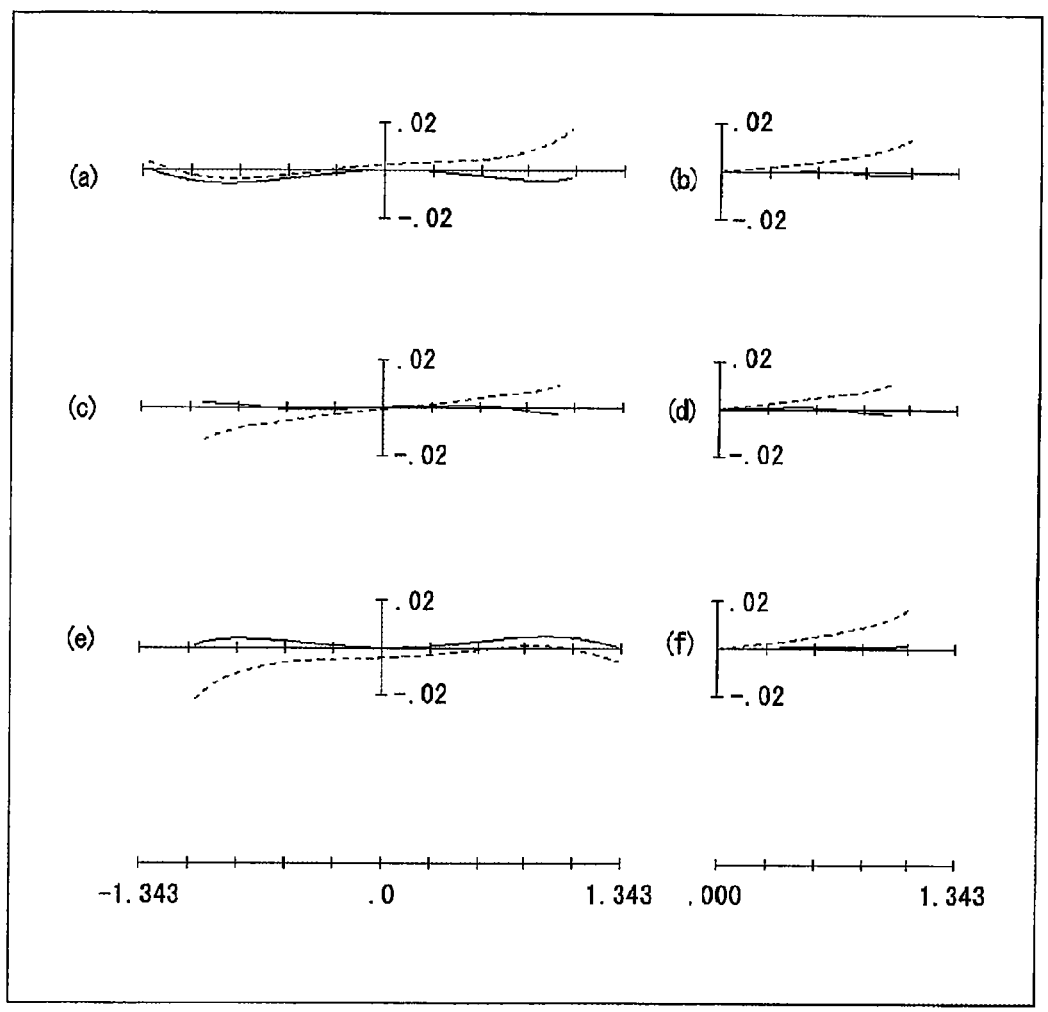
FIG. 25 is a lateral aberration diagram of a zoom lens system of Example 3 at an infinite object point at a wide-angle limit at the time of view-angle blur compensation of $0.6°$.
Figure 26:
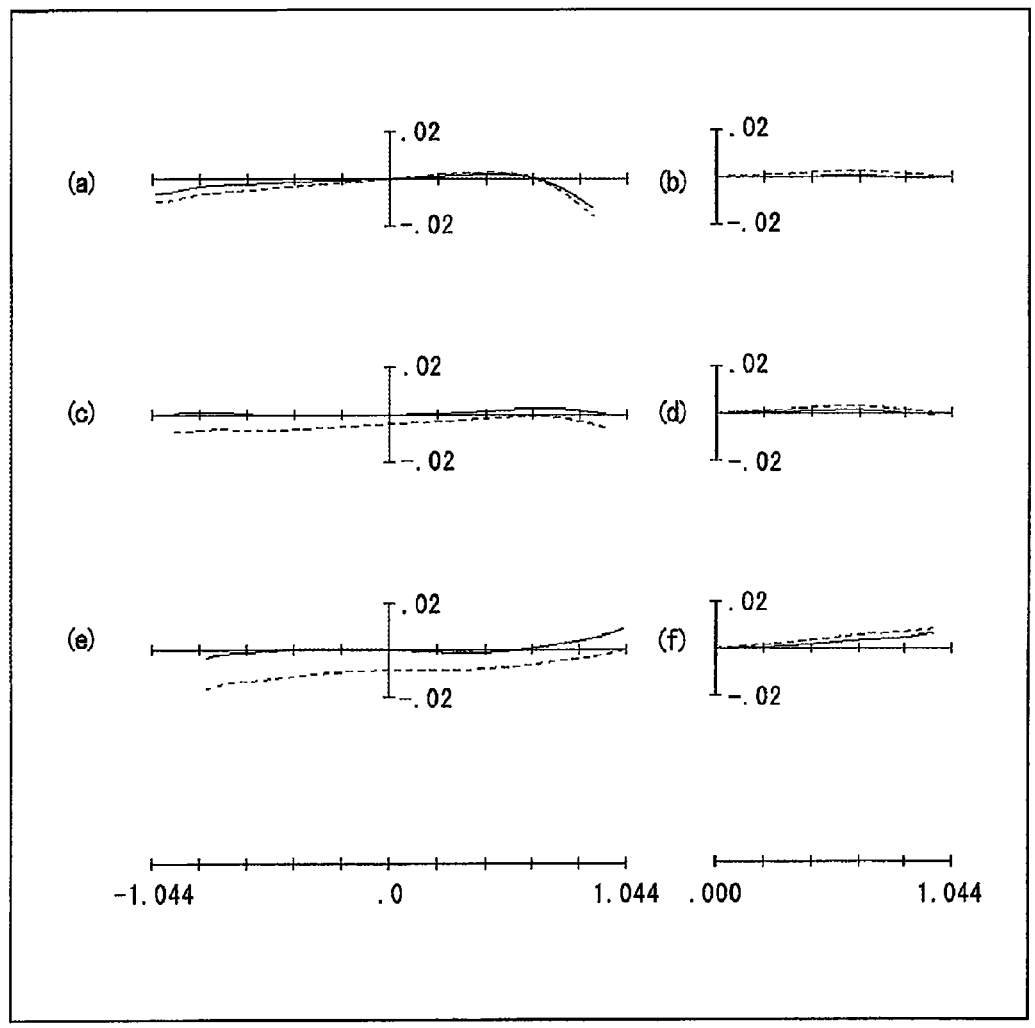
FIG. 26 is a lateral aberration diagram of a zoom lens system of Example 3 at an infinite object point at a telephoto limit at the time of view-angle blur compensation of 0.6°.

FIG. 23 is a lateral aberration diagram of a zoom lens system of Example 3 at an infinite object point at a wide-angle limit in a normal state. FIG. 24 is a lateral aberration diagram of a zoom lens system of Example 3 at an infinite object point at a telephoto limit in a normal state. FIG. 25 is a lateral aberration diagram of a zoom lens system of Example 3 at an infinite object point at a wide-angle limit at the time of view-angle blur compensation of 0.6°. FIG. 26 is a lateral aberration diagram of a zoom lens system of Example 3 at an infinite object point at a telephoto limit at the time of view-angle blur compensation of 0.6°.

Figure 29:
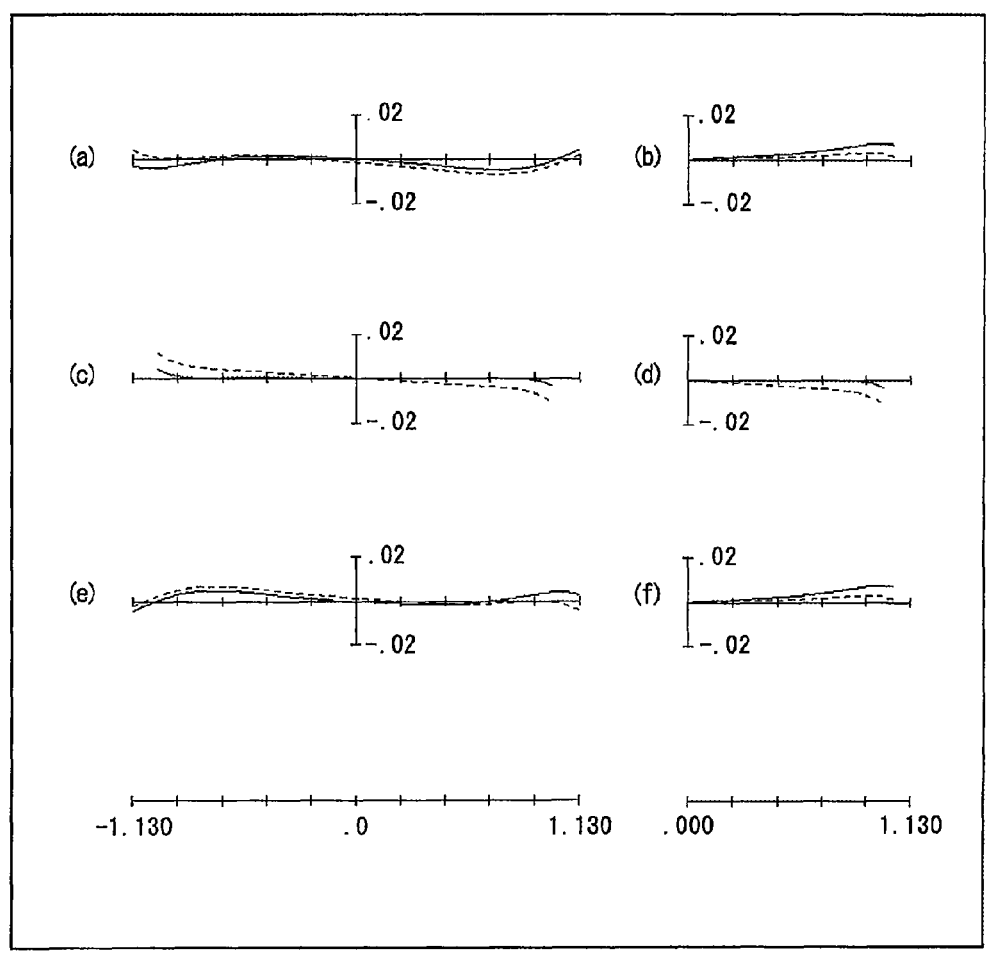
FIG. 29 is a lateral aberration diagram of a zoom lens system of Example 4 at an infinite object point at a wide-angle limit in a normal state.
Figure 30:
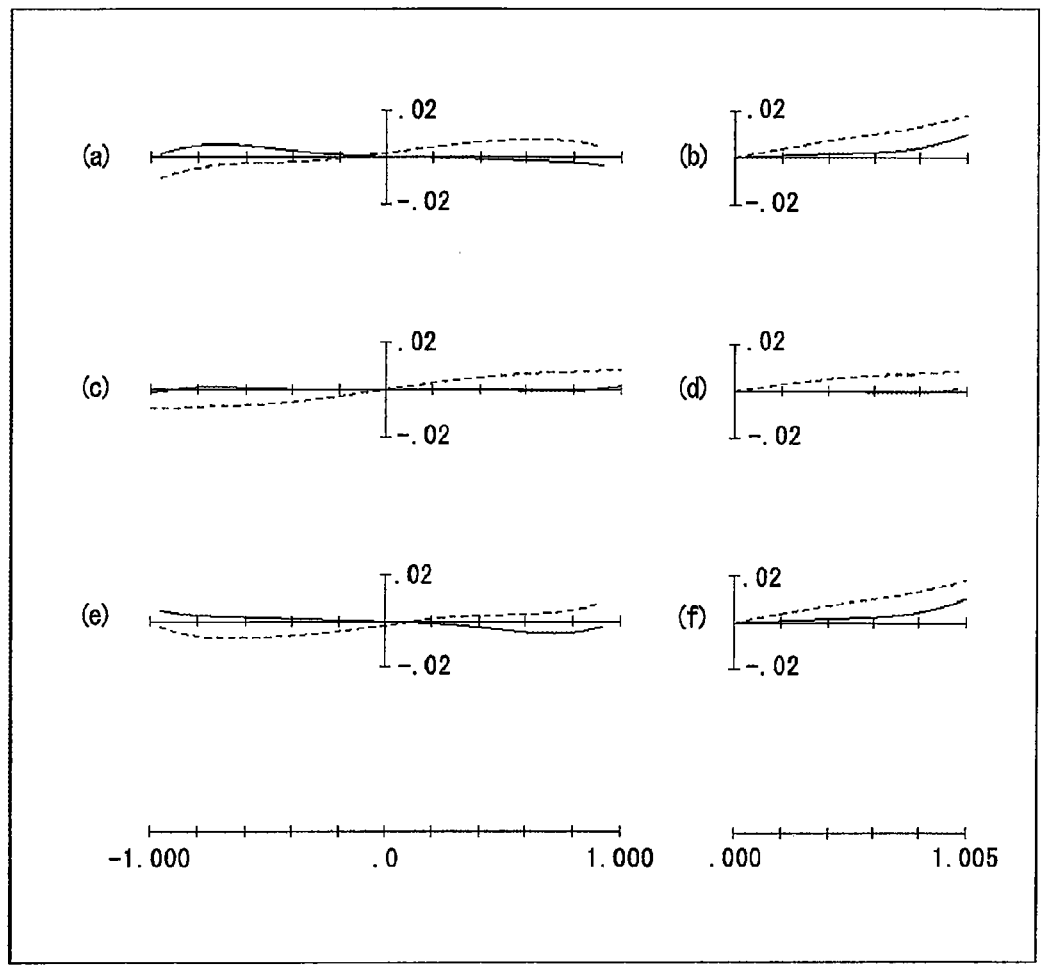
FIG. 30 is a lateral aberration diagram of a zoom lens system of Example 4 at an infinite object point at a telephoto limit in a normal state.
Figure 31:
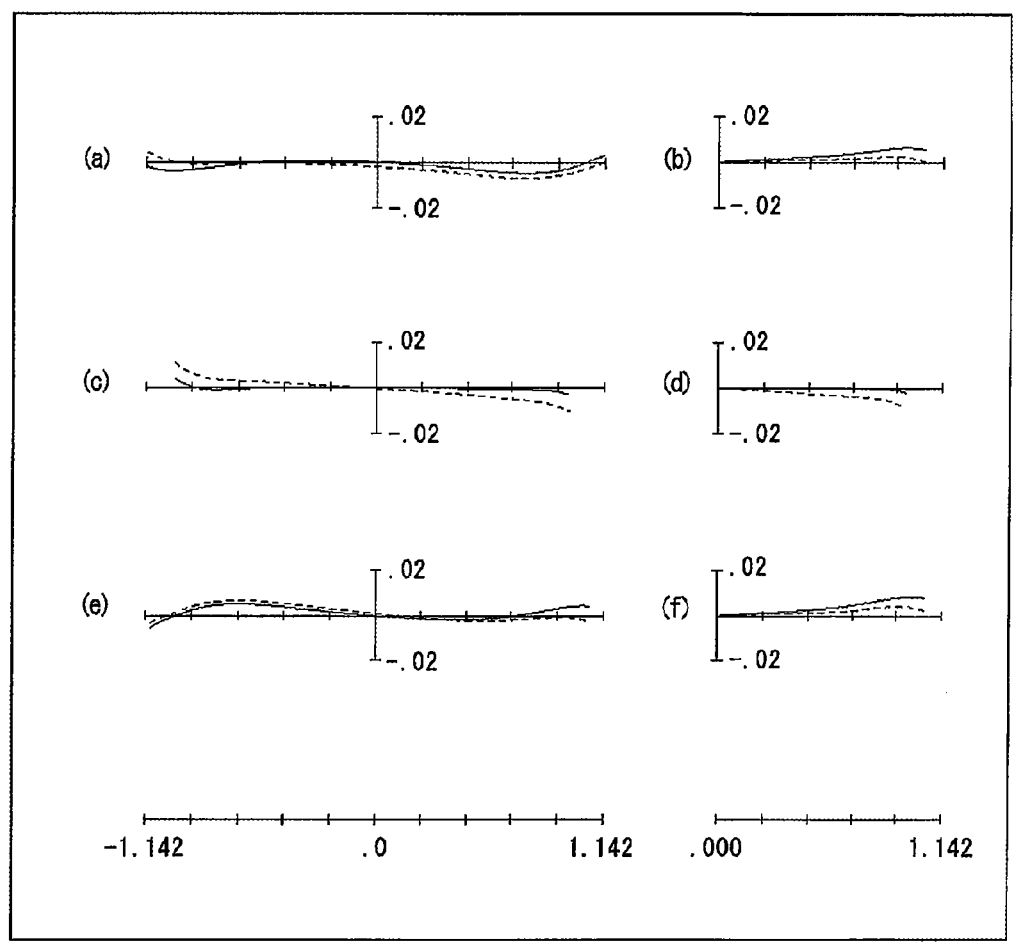
FIG. 31 is a lateral aberration diagram of a zoom lens system of Example 4 at an infinite object point at a wide-angle limit at the time of view-angle blur compensation of 0.6°.
Figure 32:
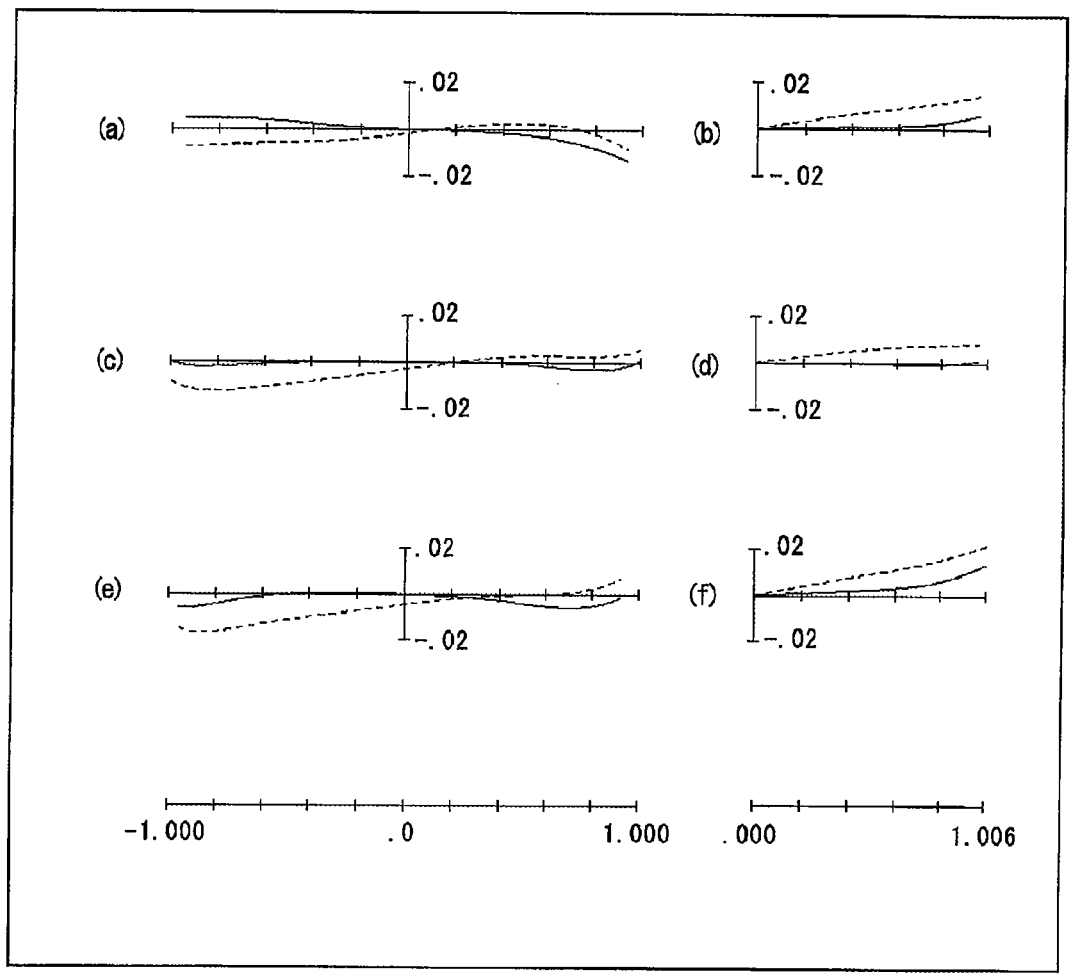
FIG. 32 is a lateral aberration diagram of a zoom lens system of Example 4 at an infinite object point at a telephoto limit at the time of view-angle blur compensation of 0.6°.

FIG. 29 is a lateral aberration diagram of a zoom lens system of Example 4 at an infinite object point at a wide-angle limit in a normal state. FIG. 30 is a lateral aberration diagram of a zoom lens system of Example 4 at an infinite object point at a telephoto limit in a normal state. FIG. 31 is a lateral aberration diagram of a zoom lens system of Example 4 at an infinite object point at a wide-angle limit at the time of view-angle blur compensation of 0.6°. FIG. 32 is a lateral aberration diagram of a zoom lens system of Example 4 at an infinite object point at a telephoto limit at the time of view-angle blur compensation of 0.6°.

Figure 35:
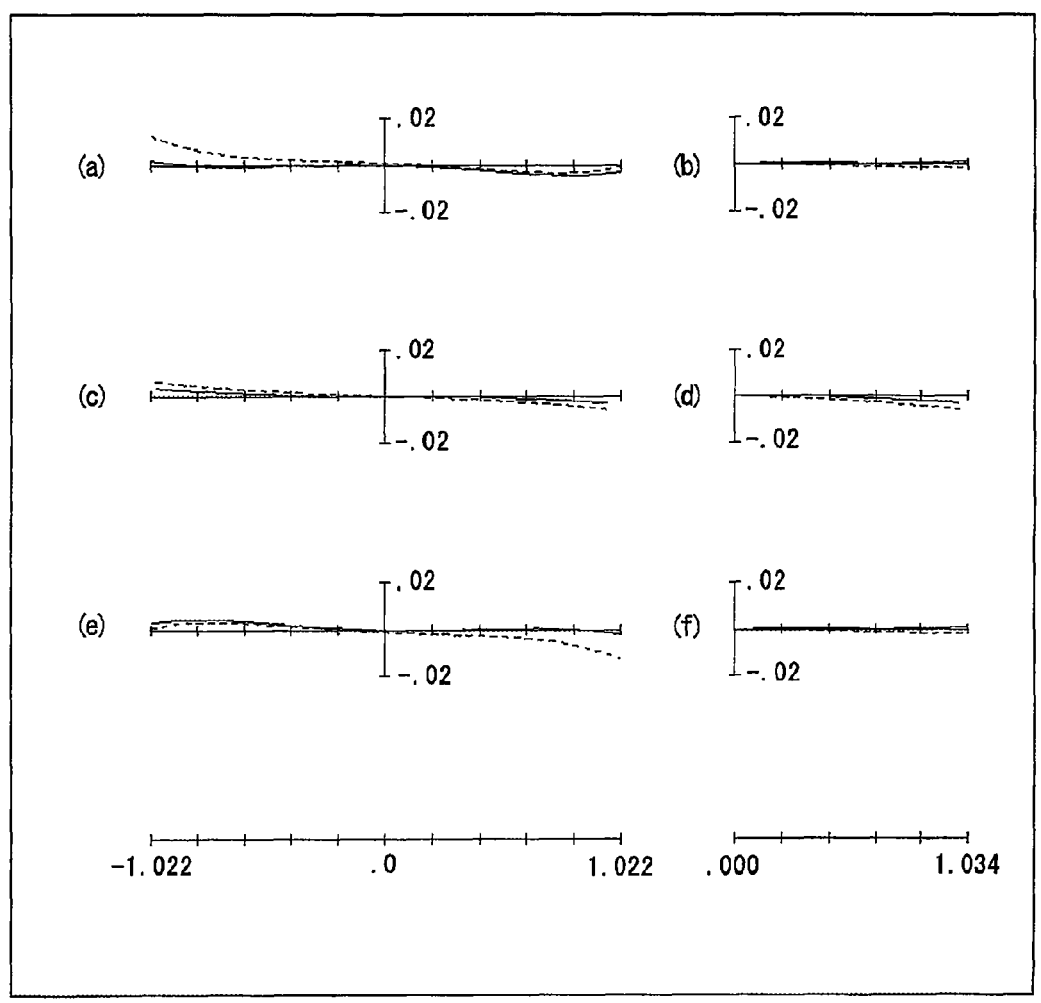
FIG. 35 is a lateral aberration diagram of a zoom lens system of Example 5 at an infinite object point at a wide-angle limit in a normal state.
Figure 36:
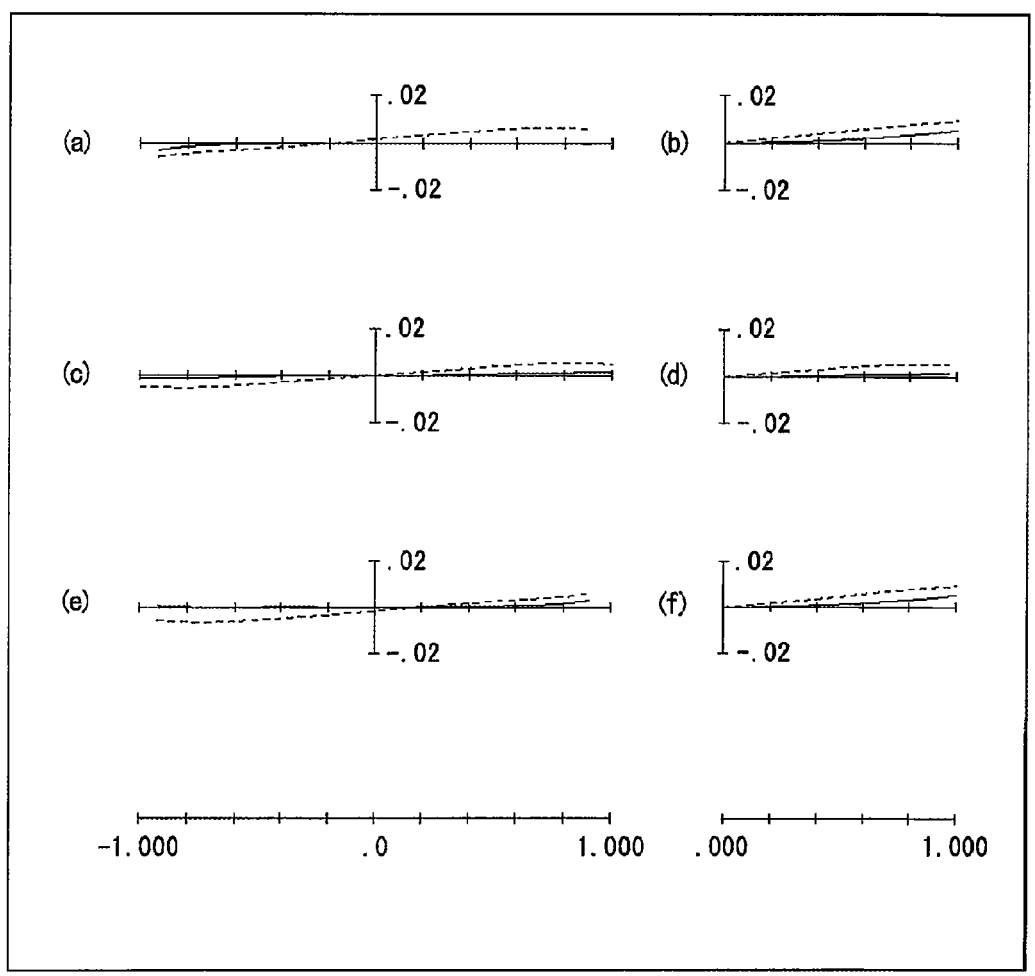
FIG. 36 is a lateral aberration diagram of a zoom lens system of Example 5 at an infinite object point at a telephoto limit in a normal state.
Figure 37:
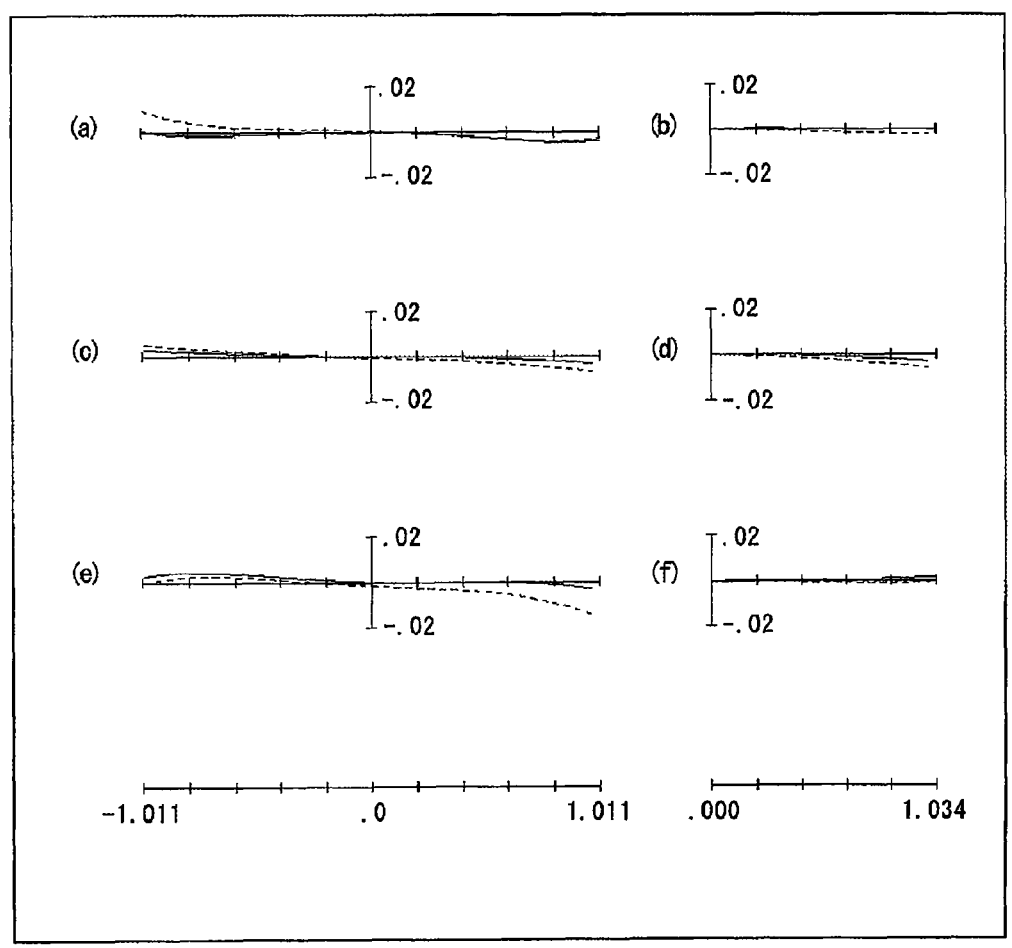
FIG. 37 is a lateral aberration diagram of a zoom lens system of Example 5 at an infinite object point at a wide-angle limit at the time of view-angle blur compensation of 0.6°.
Figure 38:
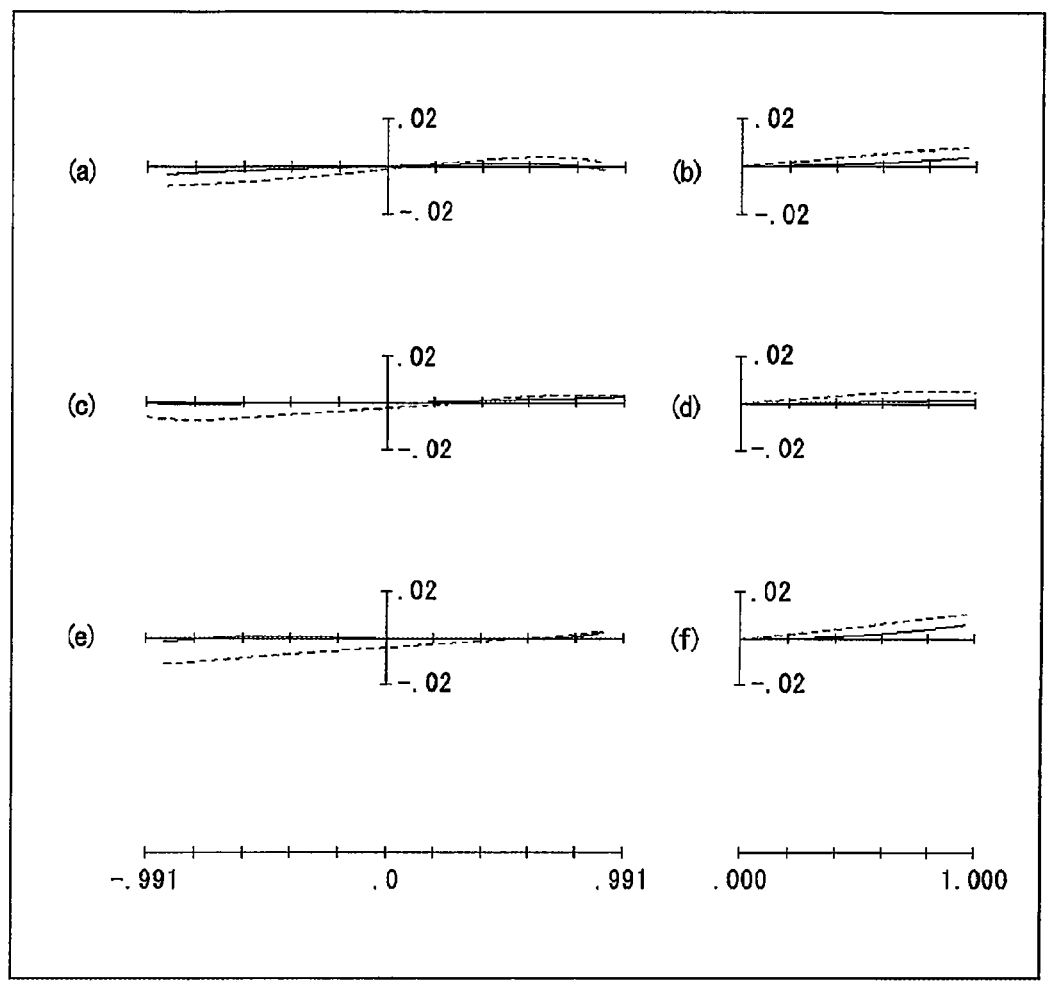
FIG. 38 is a lateral aberration diagram of a zoom lens system of Example 5 at an infinite object point at a telephoto limit at the time of view-angle blur compensation of 0.6°.

FIG. 35 is a lateral aberration diagram of a zoom lens system of Example 5 at an infinite object point at a wide-angle limit in a normal state. FIG. 36 is a lateral aberration diagram of a zoom lens system of Example 5 at an infinite object point at a telephoto limit in a normal state. FIG. 37 is a lateral aberration diagram of a zoom lens system of Example 5 at an infinite object point at a wide-angle limit at the time of view-angle blur compensation of 0.6°. FIG. 38 is a lateral aberration diagram of a zoom lens system of Example 5 at an infinite object point at a telephoto limit at the time of view-angle blur compensation of 0.6°.

Figure 41:
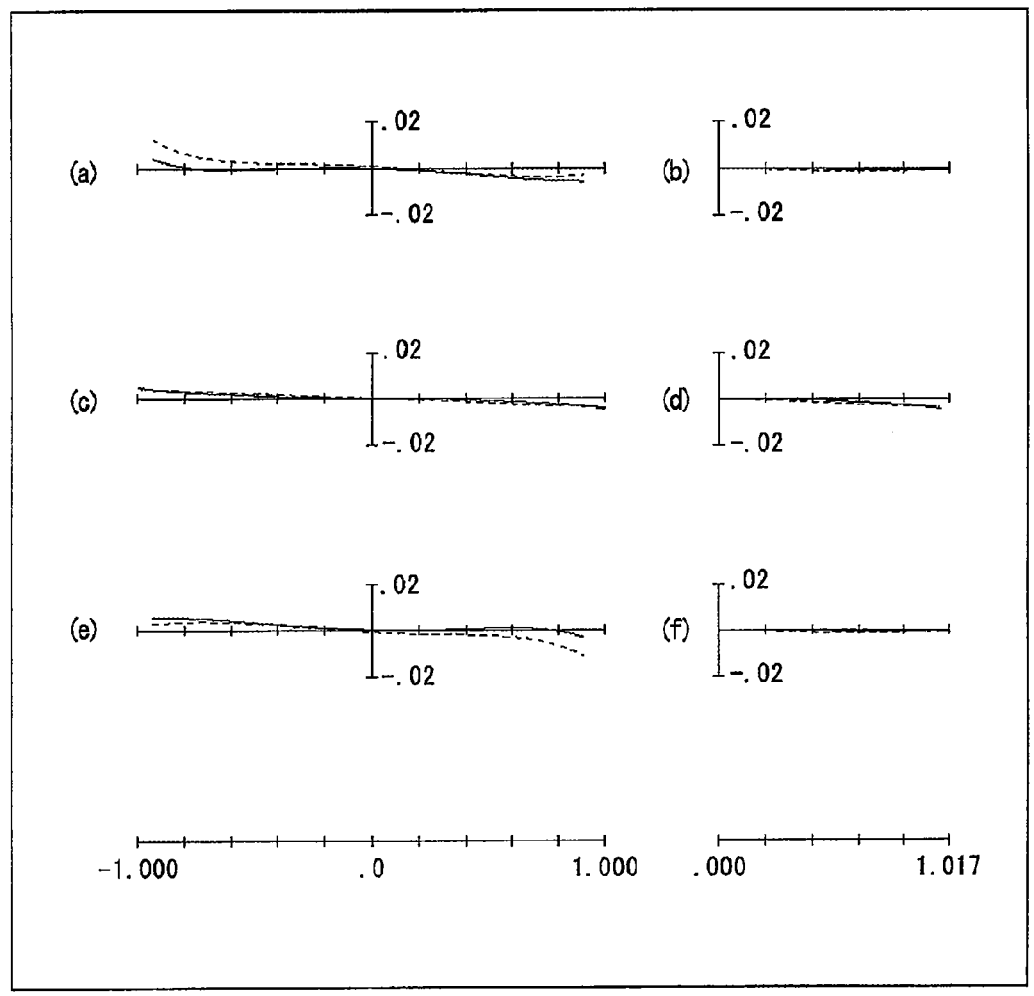
FIG. 41 is a lateral aberration diagram of a zoom lens system of Example 6 at an infinite object point at a wide-angle limit in a normal state.
Figure 42:
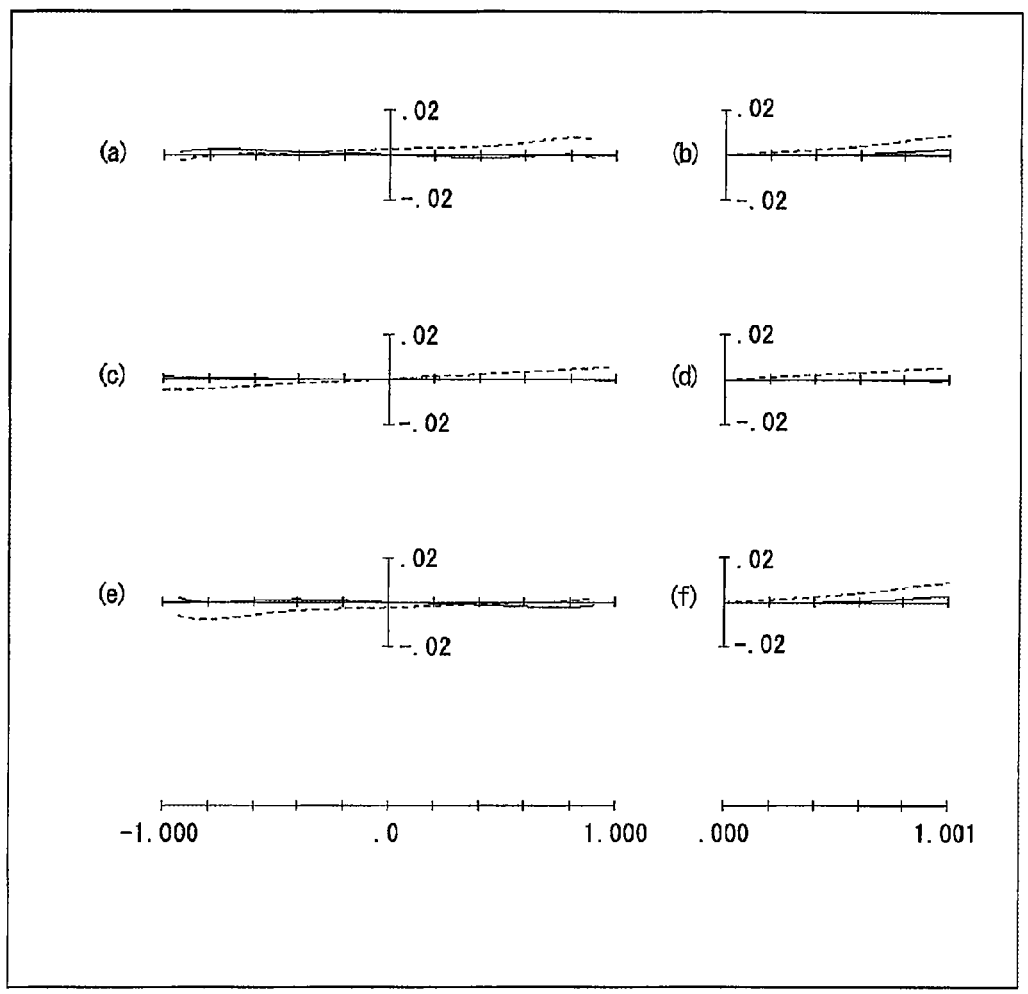
FIG. 42 is a lateral aberration diagram of a zoom lens system of Example 6 at an infinite object point at a telephoto limit in a normal state.
Figure 43:
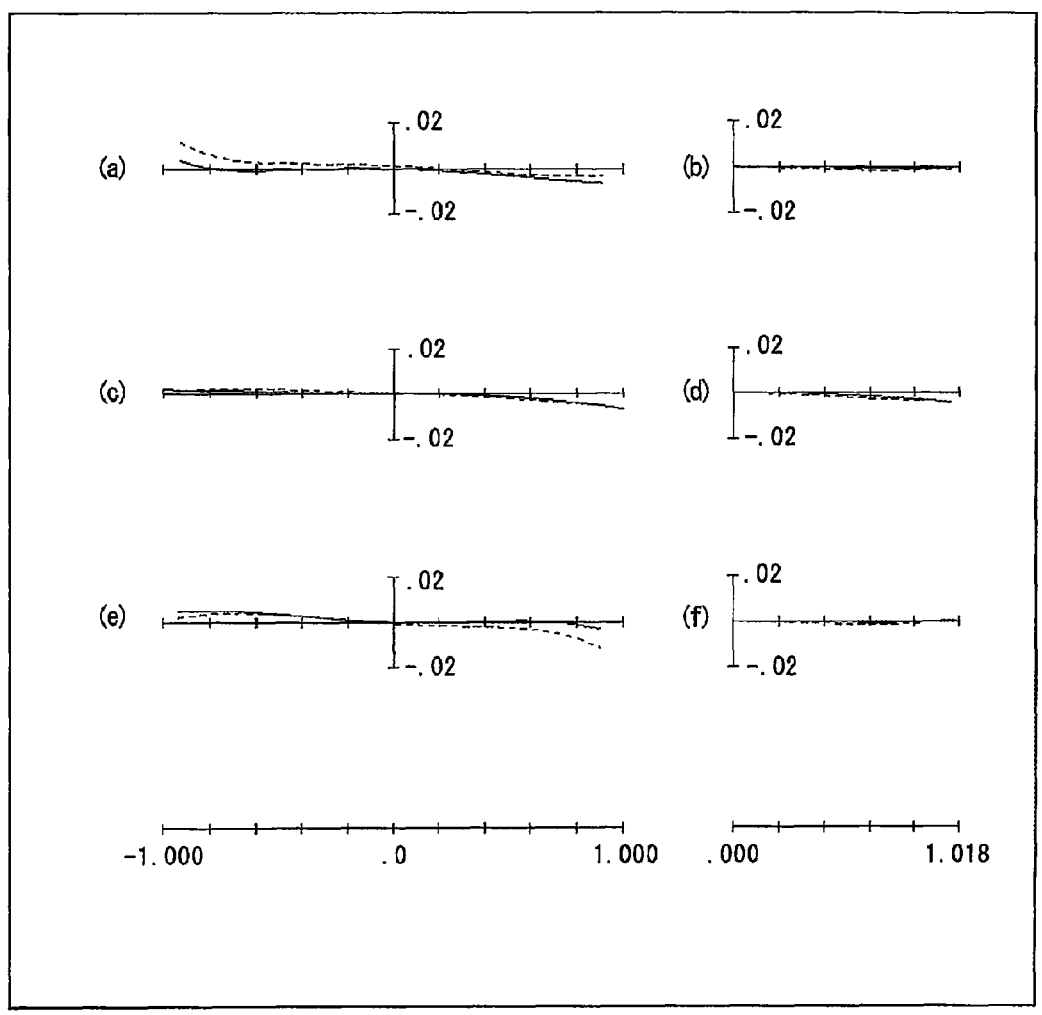
FIG. 43 is a lateral aberration diagram of a zoom lens system of Example 6 at an infinite object point at a wide-angle limit at the time of view-angle blur compensation of 0.6°.
Figure 44:
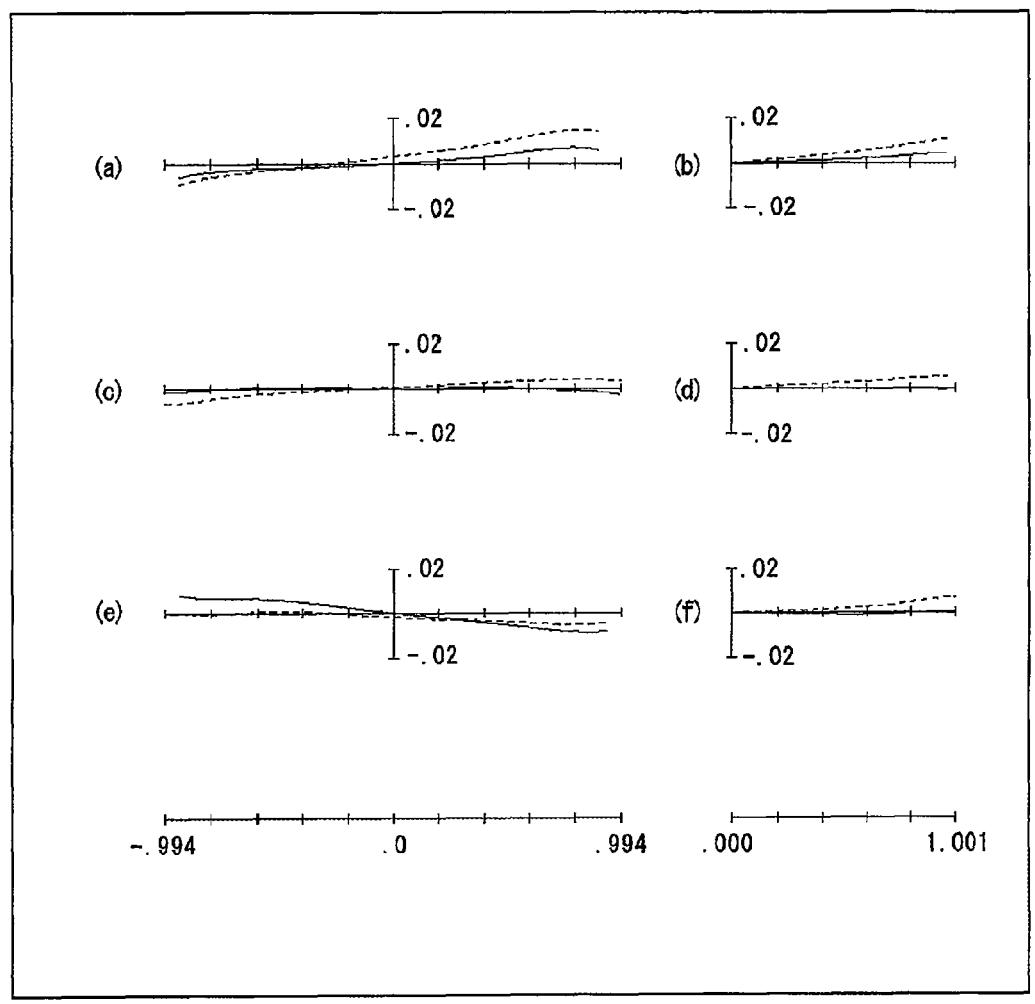
FIG. 44 is a lateral aberration diagram of a zoom lens system of Example 6 at an infinite object point at a telephoto limit at the time of view-angle blur compensation of 0.6°.

FIG. 41 is a lateral aberration diagram of a zoom lens system of Example 6 at an infinite object point at a wide-angle limit in a normal state. FIG. 42 is a lateral aberration diagram of a zoom lens system of Example 6 at an infinite object point at a telephoto limit in a normal state. FIG. 43 is a lateral aberration diagram of a zoom lens system of Example 6 at an infinite object point at a wide-angle limit at the time of view-angle blur compensation of 0.6°. FIG. 44 is a lateral aberration diagram of a zoom lens system of Example 6 at an infinite object point at a telephoto limit at the time of view-angle blur compensation of 0.6°.

In each lateral aberration diagram, parts (a) and (b) show the lateral aberration at a relative view angle of 0.75 in a case that the incident half view angle ω is normalized into unity. Parts (c) and (d) show the lateral aberration at a relative view angle of 0 in a case that the incident half view angle ω is normalized into unity. Parts (e) and (f) show the lateral aberration at a relative view angle of −0.75 in a case that the incident half view angle ω is normalized into unity. Further, in each lateral aberration diagram, parts (a), (c) and (e) show the characteristics in the meridional direction. Parts (b), (d) and (f) show the characteristics in the sagittal direction. Further, in each lateral aberration diagram, the solid line indicates the characteristics to the d-line, and the dashed line indicates the characteristics to the g-line.

The following Table 1 shows the amount of movement (the amount of decentering) in a direction perpendicular to the optical axis of the blur compensation lens unit (rear A lens unit) at the time of view-angle blur compensation in each Example.

TABLE 1

| Example | Amount of movement in direction perpendicular to optical axis (mm) | |
|---|---|---|
| | Wide-angle limit | Telephoto limit |
| 1 | 0.063 | 0.154 |
| 2 | 0.076 | 0.233 |
| 3 | 0.096 | 0.169 |
| 4 | 0.058 | 0.111 |
| 5 | 0.068 | 0.119 |
| 6 | 0.035 | 0.055 |

As seen from each longitudinal aberration diagram and each lateral aberration diagram, each of the zoom lens system of Examples 1 to 6 expresses high aberration performance at the time of normal state and blur compensation.

EXAMPLE 1

The zoom lens system of Example 1 corresponds to the zoom lens system according to Embodiment 1. Table 2 shows the lens data of the zoom lens system of Example 1. Table 3 shows the aspherical data. Table 4 shows the data of optical surface intervals that are variable during changing the magnification. In Table 3, "D+00", "D−02" and the like indicate "×10$^{+00}$", "×10$^{-02}$" and the like, respectively.

TABLE 2

| Lens unit | Lens element | Surface | CR | T | Nd | Vd |
|---|---|---|---|---|---|---|
| 1 | L1 | 1 | 74.133 | 1.00 | 1.84666 | 23.8 |
| | L2 | 2 | 29.817 | 4.22 | 1.83500 | 43.0 |
| | | 3 | 229.017 | 0.10 | 1.00000 | |
| | L3 | 4 | 32.722 | 2.41 | 1.80420 | 46.5 |
| | | 5 | 61.134 | (T1) | 1.00000 | |

TABLE 2-continued

| Lens unit | Lens element | Surface | CR | T | Nd | Vd |
|---|---|---|---|---|---|---|
| 2 | L4 | 6 | 34.860 | 0.80 | 1.83500 | 43.0 |
| | | 7 | 8.104 | 5.02 | 1.00000 | |
| | L5 | 8 | −18.566 | 1.10 | 1.66547 | 55.2 |
| | | 9 | *14.381 | 1.23 | 1.00000 | |
| | L6 | 10 | 21.164 | 2.30 | 1.80518 | 25.5 |
| | | 11 | −45.931 | (T2) | 1.00000 | |
| 3 | Aperture diaphragm 5 | 12 | ∞ | 0.50 | 1.00000 | |
| 7 | L7 | 13 | *7.842 | 1.50 | 1.75039 | 45.5 |
| | | 14 | 281.867 | 1.04 | 1.00000 | |
| | L8 | 15 | 10.224 | 1.09 | 1.88300 | 40.8 |
| | L9 | 16 | 23.717 | 0.50 | 1.84666 | 23.8 |
| | | 17 | 5.296 | (T3) | 1.00000 | |
| 8 | L10 | 18 | *18.281 | 2.20 | 1.66547 | 55.2 |
| | L11 | 19 | −10.291 | 0.50 | 1.67270 | 32.2 |
| | | 20 | −134.332 | (T4) | 1.00000 | |
| 4 | L12 | 21 | 12.907 | 1.70 | 1.49700 | 81.6 |
| | | 22 | 50.000 | 1.15 | 1.00000 | |
| Optical low-pass filter 6 | | 23 | ∞ | 2.30 | 1.51680 | 64.2 |
| | | 24 | ∞ | 0.00 | 1.00000 | |

TABLE 3

| Surface | K | A4 | A6 | A8 | A10 |
|---|---|---|---|---|---|
| 9 | 1.812D+00 | −1.899D−04 | 1.718D−07 | −1.882D−08 | 0.000D+00 |
| 13 | −1.929D−02 | −2.049D−04 | 8.077D−06 | −1.722D−06 | 1.352D−07 |
| 18 | 1.221D−01 | −3.496D−05 | 1.087D−06 | 2.139D−09 | 0.000D+00 |

TABLE 4

| | T1 | T2 | T3 | T4 |
|---|---|---|---|---|
| Wide-angle (infinity) | 0.50 | 18.90 | 4.55 | 5.65 |
| Middle (infinity) | 7.59 | 8.09 | 5.86 | 9.30 |
| Telephoto (infinity) | 17.60 | 2.00 | 5.79 | 12.71 |
| Wide-angle (proximity) | 0.50 | 18.90 | 4.38 | 5.81 |
| Middle (proximity) | 7.59 | 8.09 | 5.45 | 9.71 |
| Telephoto (proximity) | 17.60 | 2.00 | 4.64 | 13.85 |

Further, the focal length (mm), the F-number and the incident view angle (°) are as follows.
Focal length: 6.00 to 22.80
F-number: 2.9 to 3.9
Incident view angle: 76.0 to 22.1

EXAMPLE 2

The zoom lens system of Example 2 corresponds to the zoom lens system according to Embodiment 2. Table 5 shows the lens data of the zoom lens system of Example 2. Table 6 shows the aspherical data. Table 7 shows the data of optical surface intervals that are variable during changing the magnification. In Table 6, "D+00", "D−02" and the like indicate "×10$^{+00}$", "×10$^{-02}$" and the like, respectively.

TABLE 5

| Lens unit | Lens element | Surface | CR | T | Nd | Vd |
|---|---|---|---|---|---|---|
| 1 | L1 | 1 | 33.000 | 1.00 | 1.84666 | 23.8 |
| | L2 | 2 | 22.410 | 3.29 | 1.80420 | 46.5 |
| | | 3 | 79.339 | (T1) | 1.00000 | |
| 2 | L3 | 4 | 19.697 | 0.80 | 1.90366 | 31.3 |
| | | 5 | 7.966 | 4.36 | 1.00000 | |
| | L4 | 6 | −29.670 | 1.10 | 1.66547 | 55.2 |
| | | 7 | *13.458 | 2.87 | 1.00000 | |
| | L5 | 8 | 20.453 | 2.25 | 1.94595 | 18.0 |
| | | 9 | 83.129 | (T2) | 1.00000 | |
| 3 | Aperture diaphragm 5 | 10 | ∞ | 0.50 | 1.00000 | |
| 7 | L6 | 11 | *9.366 | 1.88 | 1.74993 | 45.4 |
| | | 12 | ∞ | 1.24 | 1.00000 | |
| | L7 | 13 | 9.403 | 1.54 | 1.80420 | 46.5 |
| | L8 | 14 | −58.100 | 0.50 | 1.80518 | 25.5 |
| | | 15 | 5.564 | (T3) | 1.00000 | |
| 8 | L9 | 16 | *23.171 | 1.63 | 1.51835 | 70.3 |
| | | 17 | −50.792 | (T4) | 1.00000 | |
| 4 | L10 | 18 | 15.883 | 1.96 | 1.49700 | 81.6 |
| | | 19 | −249.225 | 1.53 | 1.00000 | |
| Optical low-pass filter 6 | | 20 | ∞ | 0.90 | 1.51680 | 64.2 |
| | | 21 | ∞ | 0.00 | 1.00000 | |

TABLE 6

| Surface | K | A4 | A6 | A8 | A10 |
|---|---|---|---|---|---|
| 7 | −6.634D−01 | −4.296D−05 | 1.568D−06 | −8.500D−08 | 2.493D−09 |
| 11 | 1.617D−02 | −1.278D−04 | 9.519D−07 | −2.201D−07 | 1.243D−08 |
| 16 | −5.282D+00 | −8.687D−06 | 6.005D−07 | 1.145D−07 | −3.125D−09 |

TABLE 7

| | T1 | T2 | T3 | T4 |
|---|---|---|---|---|
| Wide-angle (infinity) | 0.50 | 18.70 | 3.86 | 8.67 |
| Middle (infinity) | 8.88 | 8.36 | 4.26 | 13.48 |
| Telephoto (infinity) | 18.96 | 2.44 | 6.00 | 19.33 |
| Wide-angle (proximity) | 0.50 | 18.70 | 3.50 | 9.04 |
| Middle (proximity) | 8.88 | 8.36 | 3.97 | 13.77 |
| Telephoto (proximity) | 18.96 | 2.44 | 5.03 | 20.30 |

Further, the focal length (mm), the F-number and the incident view angle (°) are as follows.

Focal length: 6.45 to 24.51
F-number: 2.9 to 4.3
Incident view angle: 76.6 to 22.2

EXAMPLE 3

The zoom lens system of Example 3 corresponds to the zoom lens system according to Embodiment 3. Table 8 shows the lens data of the zoom lens system of Example 3. Table 9 shows the aspherical data. Table 10 shows the data of optical surface intervals that are variable during changing the magnification. In Table 9, "D+00", "D−02" and the like indicate "×10$^{+00}$", "×10$^{-02}$" and the like, respectively.

TABLE 8

| Lens unit | Lens element | Surface | CR | T | Nd | Vd |
|---|---|---|---|---|---|---|
| 1 | L1 | 1 | 24.670 | 2.99 | 1.48749 | 70.4 |
| | | 2 | 107.610 | (T1) | 1.00000 | |
| 2 | L2 | 3 | 18.880 | 0.80 | 1.90366 | 31.3 |
| | | 4 | 7.864 | 3.79 | 1.00000 | |
| | L3 | 5 | −53.500 | 0.95 | 1.66547 | 55.2 |
| | | 6 | *11.254 | 2.65 | 1.00000 | |
| | L4 | 7 | 15.135 | 1.54 | 1.94595 | 18.0 |
| | | 8 | 34.200 | (T2) | 1.00000 | |
| 3 | Aperture diaphragm 5 | 9 | ∞ | 0.30 | 1.00000 | |
| 7 | L5 | 10 | *9.018 | 1.85 | 1.74993 | 45.4 |
| | | 11 | −78.250 | 0.84 | 1.00000 | |
| | L6 | 12 | 10.130 | 1.88 | 1.72916 | 54.7 |
| | L7 | 13 | −19.240 | 0.45 | 1.75520 | 27.5 |
| | | 14 | 5.360 | (T3) | 1.00000 | |
| 8 | L8 | 15 | *49.665 | 1.30 | 1.66547 | 55.2 |
| | | 16 | −60.700 | (T4) | 1.00000 | |
| 4 | L9 | 17 | 19.991 | 1.68 | 1.71300 | 53.9 |
| | | 18 | −190.000 | 1.92 | 1.00000 | |

TABLE 8-continued

| Lens unit | Lens element | Surface | CR | T | Nd | Vd |
|---|---|---|---|---|---|---|
| Optical low-pass filter 6 | | 19 | ∞ | 0.90 | 1.51680 | 64.2 |
| | | 20 | ∞ | 0.00 | 1.00000 | |

TABLE 9

| Surface | K | A4 | A6 | A8 | A10 |
|---|---|---|---|---|---|
| 6 | −2.573D−01 | −4.352D−05 | 1.712D−06 | −7.264D−08 | 1.616D−09 |
| 10 | −1.052D−01 | −1.421D−04 | −1.899D−06 | 2.249D−07 | −2.020D−08 |
| 15 | −9.796D−01 | −3.373D−05 | 7.035D−07 | 3.491D−08 | 0.000D+00 |

TABLE 10

| | T1 | T2 | T3 | T4 |
|---|---|---|---|---|
| Wide-angle (infinity) | 0.50 | 19.87 | 4.47 | 7.93 |
| Middle (infinity) | 7.57 | 8.67 | 4.89 | 14.20 |
| Telephoto (infinity) | 13.01 | 3.20 | 6.00 | 22.65 |
| Wide-angle (proximity) | 0.50 | 19.87 | 4.33 | 8.06 |
| Middle (proximity) | 7.57 | 8.67 | 4.47 | 14.62 |
| Telephoto (proximity) | 13.01 | 3.20 | 4.87 | 23.78 |

Further, the focal length (mm), the F-number and the incident view angle (°) are as follows.

Focal length: 6.45 to 24.50
F-number: 2.9 to 5.0
Incident view angle: 76.3 to 22.1

EXAMPLE 4

The zoom lens system of Example 4 corresponds to the zoom lens system according to Embodiment 4. Table 11 shows the lens data of the zoom lens system of Example 4. Table 12 shows the aspherical data. Table 13 shows the data of optical surface intervals that are variable during changing the magnification. In Table 12, "D+00", "D−02" and the like indicate "×10$^{+00}$", "×10$^{-02}$" and the like, respectively.

TABLE 11

| Lens unit | Lens element | Surface | CR | T | Nd | Vd |
|---|---|---|---|---|---|---|
| 2 | L1 | 1 | 50.000 | 0.70 | 1.69350 | 53.2 |
|   |    | 2 | *3.928 | 2.33 | 1.00000 |   |
|   | L2 | 3 | *12.804 | 1.29 | 1.58387 | 30.9 |
|   |    | 4 | *165.822 | (T1) | 1.00000 |   |
| 3 | Aperture diaphragm 5 | 5 | ∞ | 0.20 | 1.00000 |   |
| 7 | L3 | 6 | *5.325 | 1.39 | 1.74993 | 45.4 |
|   |    | 7 | −29.838 | 0.95 | 1.00000 |   |
|   | L4 | 8 | 7.483 | 1.00 | 1.48749 | 70.4 |
|   | L5 | 9 | 112.601 | 0.45 | 1.84666 | 23.8 |
|   |    | 10 | 3.559 | (T2) | 1.00000 |   |
| 8 | L6 | 11 | *18.898 | 1.27 | 1.74993 | 45.4 |
|   |    | 12 | −21.004 | (T3) | 1.00000 |   |
|   | Optical low-pass filter 6 | 13 | ∞ | 1.20 | 1.51680 | 64.2 |
|   |    | 14 | ∞ | 0.00 | 1.00000 |   |

TABLE 12

| Surface | K | A4 | A6 | A8 | A10 |
|---|---|---|---|---|---|
| 2 | 0.000D+00 | −1.814D−03 | −7.941D−05 | −4.322D−06 | 0.000D+00 |
| 3 | 0.000D+00 | −2.209D−03 | −1.771D−04 | −6.877D−06 | 1.253D−06 |
| 4 | 0.000D+00 | −2.093D−03 | −1.921D−04 | 1.016D−05 | 6.002D−08 |
| 6 | 0.000D+00 | −8.274D−04 | −2.888D−05 | 1.170D−06 | 0.000D+00 |
| 11 | 0.000D+00 | −2.839D−05 | 6.673D−06 | 0.000D−00 | 0.000D+00 |

TABLE 13

|  | T1 | T2 | T3 |
|---|---|---|---|
| Wide-angle (infinity) | 11.54 | 2.04 | 5.52 |
| Middle (infinity) | 5.79 | 2.52 | 8.23 |
| Telephoto (infinity) | 1.90 | 3.00 | 12.70 |
| Wide-angle (proximity) | 11.54 | 2.00 | 5.56 |
| Middle (proximity) | 5.79 | 2.43 | 8.31 |
| Telephoto (proximity) | 1.90 | 2.79 | 12.91 |

Further, the focal length (mm), the F-number and the incident view angle (°) are as follows.
Focal length: 5.32 to 12.75
F-number: 3.5 to 5.2
Incident view angle: 70.8 to 31.7

EXAMPLE 5

The zoom lens system of Example 5 corresponds to the zoom lens system according to Embodiment 5. Table 14 shows the lens data of the zoom lens system of Example 5. Table 15 shows the aspherical data. Table 16 shows the data of optical surface intervals that are variable during changing the magnification. In Table 15, "D+00", "D−02" and the like indicate "×10$^{+00}$", "×10$^{-02}$", and the like, respectively.

TABLE 14

| Lens unit | Lens element | Surface | CR | T | Nd | Vd |
|---|---|---|---|---|---|---|
| 2 | L1 | 1 | 50.000 | 0.70 | 1.69350 | 53.2 |
|   |    | 2 | *4.097 | 1.98 | 1.00000 |   |
|   | L2 | 3 | *10.919 | 1.40 | 1.58387 | 30.9 |
|   |    | 4 | *153.239 | (T1) | 1.00000 |   |
| 3 | Aperture diaphragm 5 | 5 | ∞ | 0.20 | 1.00000 |   |
| 7 | L3 | 6 | *6.243 | 1.18 | 1.74993 | 45.4 |
|   |    | 7 | 592.978 | 0.71 | 1.00000 |   |
|   | L4 | 8 | 5.191 | 0.98 | 1.48749 | 70.4 |
|   | L5 | 9 | 11.772 | 0.45 | 1.84666 | 23.8 |
|   |    | 10 | 3.783 | (T2) | 1.00000 |   |
| 8 | L6 | 11 | *6.617 | 1.74 | 1.52996 | 55.8 |
|   |    | 12 | *20.660 | (T3) | 1.00000 |   |
|   | Optical low-pass filter 6 | 13 | ∞ | 1.20 | 1.51680 | 64.2 |
|   |    | 14 | ∞ | 0.00 | 1.00000 |   |

TABLE 15

| Surface | K | A4 | A6 | A8 | A10 |
|---|---|---|---|---|---|
| 2 | 0.000D+00 | −1.140D−03 | −2.344D−05 | −3.825D−06 | 0.000D+00 |
| 3 | 0.000D+00 | −1.095D−03 | −7.784D−05 | 1.144D−06 | −5.410D−08 |
| 4 | 0.000D+00 | −1.266D−03 | −1.058D−04 | 6.353D−06 | −3.284D−07 |
| 6 | 0.000D+00 | −3.507D−04 | −1.092D−05 | 5.671D−07 | 0.000D+00 |
| 11 | 0.000D+00 | 1.666D−03 | 6.305D−05 | 0.000D+00 | 0.000D+00 |
| 12 | 0.000D+00 | 2.687D−03 | 1.024D−04 | 2.283D−06 | 0.000D+00 |

TABLE 16

|  | T1 | T2 | T3 |
|---|---|---|---|
| Wide-angle (infinity) | 11.94 | 2.05 | 6.72 |
| Middle (infinity) | 5.91 | 2.52 | 9.62 |
| Telephoto (infinity) | 1.90 | 3.00 | 14.32 |
| Wide-angle (proximity) | 11.94 | 2.00 | 6.78 |
| Middle (proximity) | 5.91 | 2.40 | 9.73 |
| Telephoto (proximity) | 1.90 | 2.72 | 14.59 |

Further, the focal length (mm), the F-number and the incident view angle (°) are as follows.
Focal length: 6.21 to 14.88
F-number: 4.2 to 6.3
Incident view angle: 62.7 to 27.2

EXAMPLE 6

The zoom lens system of Example 6 corresponds to the zoom lens system according to Embodiment 6. Table 17 shows the lens data of the zoom lens system of Example 6. Table 18 shows the aspherical data. Table 19 shows the data of optical surface intervals that are variable during changing the magnification. In Table 18, "D+00", "D−02" and the like indicate "×10$^{+00}$", "×10$^{-02}$" and the like, respectively.

TABLE 17

| Lens unit | Lens element | Surface | CR | T | Nd | Vd |
|---|---|---|---|---|---|---|
| 2 | L1 | 1 | 50.00 | 0.70 | 1.69350 | 53.2 |
|  |  | 2 | *3.808 | 1.97 | 1.00000 |  |
|  | L2 | 3 | *12.127 | 1.38 | 1.58387 | 30.9 |
|  |  | 4 | *−86.868 | (T1) | 1.00000 |  |
| 3 | Aperture diaphragm 5 | 5 | ∞ | 0.20 | 1.00000 |  |
| 7 | L3 | 6 | *9.444 | 2.00 | 1.74993 | 45.4 |
|  |  | 7 | −9.187 | 0.10 | 1.00000 |  |
|  | L4 | 8 | 93.454 | 1.01 | 1.48749 | 70.4 |
|  | L5 | 9 | −7.586 | 0.45 | 1.84666 | 23.8 |
|  |  | 10 | 256.419 | (T2) | 1.00000 |  |
| 8 | L6 | 11 | *−7.993 | 1.56 | 1.52996 | 55.8 |
|  |  | 12 | *−12.661 | (T3) | 1.00000 |  |
|  | Optical low-pass filter 6 | 13 | ∞ | 1.20 | 1.51680 | 64.2 |
|  |  | 14 | ∞ | 0.00 | 1.00000 |  |

TABLE 18

| Surface | K | A4 | A6 | A8 | A10 |
|---|---|---|---|---|---|
| 2 | 0.000D+00 | −1.504D−03 | 5.324D−06 | −9.869D−06 | 0.000D+00 |
| 3 | 0.000D+00 | −1.832D−03 | −8.133D−05 | −7.401D−07 | −2.106D−07 |
| 4 | 0.000D+00 | −1.924D−03 | −1.221D−04 | 7.994D−06 | −5.694D−07 |
| 6 | 0.000D+00 | −5.857D−04 | −2.289D−05 | 1.286D−06 | 0.000D+00 |
| 11 | 0.000D+00 | 6.079D−03 | 3.086D−05 | 0.000D+00 | 0.000D+00 |
| 12 | 0.000D+00 | 5.585D−03 | 1.392D−04 | 1.440D−06 | 0.000D+00 |

TABLE 19

|  | T1 | T2 | T3 |
|---|---|---|---|
| Wide-angle (infinity) | 11.33 | 2.71 | 6.64 |
| Middle (infinity) | 5.60 | 2.35 | 10.27 |
| Telephoto (infinity) | 1.90 | 1.95 | 15.77 |
| Wide-angle (proximity) | 11.33 | 2.80 | 6.55 |
| Middle (proximity) | 5.60 | 2.50 | 10.13 |
| Telephoto (proximity) | 1.90 | 2.20 | 15.52 |

Further, the focal length (mm), the F-number and the incident view angle (°) are as follows.
Focal length: 6.21 to 14.89
F-number: 4.2 to 6.5
Incident view angle: 62.7 to 27.1

The following Table 20 shows values corresponding to the condition (1).

TABLE 20

|  |  | Example | | | | | |
|---|---|---|---|---|---|---|---|
| Condition |  | 1 | 2 | 3 | 4 | 5 | 6 |
| (1) | φ21/φ2 | 0.885 | 0.759 | 0.810 | 0.773 | 0.706 | 1.139 |

INDUSTRIAL APPLICABILITY

The zoom lens system according to the present invention has a reduced number of lens elements and a simple construction so as to achieve size and weight reduction, and still has high image formation performance and a blur compensation function. Thus, this zoom lens system is useful, for example, for an imaging optical device such as a high-performance digital camera in which size and weight reduction is desired.

The invention claimed is:
1. A zoom lens system comprising a plurality of lens units including at least:
   a front lens unit having negative optical power; and
   a rear lens unit having positive optical power, arranged on an image side of the front lens unit, and composed of a plurality of lens elements; wherein
   magnification change is performed by changing an interval between the individual lens units, wherein
   the rear lens unit comprises: a rear A lens unit capable of moving in a direction perpendicular to an optical axis; and a rear B lens unit that is arranged on the image side of the rear A lens unit and that can move in an optical axis direction in such a manner that an interval relative to the rear A lens unit in the optical axis direction is changed, and wherein
   focusing adjustment during variation of the object distance is achieved by changing the interval between the rear A lens unit and the rear B lens unit.

2. The zoom lens system as claimed in claim 1, wherein the rear lens unit includes an aperture diaphragm for restricting an optical path.

3. The zoom lens system as claimed in claim 1, wherein the rear A lens unit includes: a lens element having positive optical power, that has an aspheric surface, and has a convex surface facing the object side; and a lens element having negative optical power, that is arranged on the image side relative to the lens element having positive optical power, and has a convex surface facing the object side.

4. The zoom lens system as claimed in claim 1, wherein the rear B lens unit includes a lens element having an aspheric surface.

5. The zoom lens system as claimed in claim 1, satisfying the following condition (1):

$$0.5 < \phi 21/1.5 \tag{1}$$

where;

$\phi 2$ is the optical power of the rear lens unit, and $\phi 21$ is the optical power of the rear A lens unit.

6. The zoom lens system as claimed in claim 1, further comprising a front additional lens unit having positive optical power and located on the object side relative to the front lens unit, wherein during changing the magnification from a wide-angle side to a telephoto side, the front additional lens unit moves in an optical axis direction in such a manner that an interval relative to the front lens unit is increased in the optical axis direction.

7. The zoom lens system as claimed in claim 1, further comprising a rear additional lens unit having positive optical power and located on the image side relative to the rear lens unit, wherein during changing the magnification from a wide-angle side to a telephoto side, the interval between the rear lens unit and the rear additional lens unit in an optical axis direction increases.

8. The zoom lens system as claimed in claim 7, wherein during changing the magnification from a wide-angle side to a telephoto side, the rear additional lens unit is fixed relative to an image surface.

9. An imaging optical device comprising:

an imaging optical system for forming an optical image of an object; and an image sensor for converting the optical image formed by the imaging optical system into an electric image signal; wherein the imaging optical system is a zoom lens system comprising a plurality of lens units including at least:

a front lens unit having negative optical power; and a rear lens unit having positive optical power, arranged on an image side of the front lens unit, and composed of a plurality of lens elements; wherein magnification change is performed by changing an interval between the individual lens units, wherein the rear lens unit comprises: a rear A lens unit capable of moving in a direction perpendicular to an optical axis; and a rear B lens unit that is arranged on the image side of the rear A lens unit and that can move in an optical axis direction in such a manner that an interval relative to the rear A lens unit in the optical axis direction is changed, and wherein focusing adjustment during variation of the object distance is achieved by changing the interval between the rear A lens unit and the rear B lens unit.

* * * * *